METHOD AND APPARATUS FOR SELECTING INTERFITTING PARTS FOR ASSEMBLY

Original Filed Sept. 30, 1968 43 Sheets-Sheet 1

INVENTORS
SEYMOUR BEDERMAN
LARRY G. LANKFORD
BY Lester W Clark
ATTORNEY

| FIG. 15a |
|---|
| FIG. 15b |

| FIG. 36a | FIG. 36b |
|---|---|

United States Patent Office

Re. 27,600
Reissued Mar. 13, 1973

27,600

METHOD AND APPARATUS FOR SELECTING INTERFITTING PARTS FOR ASSEMBLY

Seymour Bederman, Yorktown Heights, and Larry G. Lankford, Mahopac, N.Y., assignors to International Business Machines Corporation, Armonk, N.Y.

Original No. 3,538,590, dated Nov. 10, 1970, Ser. No. 775,223, Sept. 30, 1968. Application for reissue Feb. 1, 1971, Ser. No. 111,777
Int. Cl. B23p *19/04;* B23q *17/00*
U.S. Cl. 29—407 41 Claims

Matter enclosed in heavy brackets [ ] appears in the original patent but forms no part of this reissue specification; matter printed in italics indicates the additions made by reissue.

ABSTRACT OF THE DISCLOSURE

This method and apparatus for selective assembly of parts accepts parts of a first class from a manufacturing source not under the control of the apparatus and parts of a second class from a manufacturing source under the control of the apparatus. The parts are to be assembled in interfitting pairs, one part of the first class being assembled with a part of the second class. The selective assembly apparatus operates to maintain the clearance between the assembled parts of each pair within a clearance range which is substantially smaller than the manufacturing tolerance ranges for the parts of both the first and second classes.

The incoming parts of the first class have dimensions of their interfitting surfaces measured and are classified into one of a plurality of subclasses, depending upon that measurement. The measured parts are stored and information regarding location and classification of each part is supplied to a computing element.

The parts of the second class are similarly and separately treated as to measurement, classification and storage.

The apparatus for manufacturing the parts of the second class controls the dimension of the interfitting surfaces on those parts and is in turn under the control of the computing element. Batches of parts of the second class are periodically ordered by the computing element. As each batch is ordered, the mean dimension of the interfitting surfaces in the parts of that batch is specified by the computer. The selection of this mean dimension for each batch is determined in accordance with a figure of merit designed to minimize the number of parts in storage.

Provision is made to relieve the storage facilities when they are filled to capacity by selecting from the storage facilities parts of the subclass which is in least demand and transferring them to surplus storage.

Periodically, a part of the first class is selected for presentation to an assembly apparatus. In accordance with the classification of the selected part, a part of the second class is selected having the dimension of its interfitting surface classified so that the clearance between the interfitting surfaces of the two selected parts is within the required clearance range. The two selected parts may then be assembled.

BACKGROUND OF THE INVENTION

It has been suggested (for example, see the article on pages 66 to 73 of Automation for September 1966, entitled "Matching and Sorting Parts Automatically" by Julian E. Wilburn), that a running inventory be kept of one class of interfitting parts and used to determine the size of the interfitting surfaces of a batch of interfitting parts of a second class. Such systems do not take into account the probable variation in the dimensions of the interfitting surfaces as they arrive at the apparatus from the separate sources.

It has also been suggested (for example, see the U.S. patent to Maker, No. 2,897,639) to control a manufacturing process by taking into account the probable distribution of the products of that process with respect to a particular dimension or quality. However, the Maker patent is limited to one machine, while the invention disclosed herein is designed to control any number of machines. The Maker patent takes a part and makes it fit a specific gauge size, while the present invention contemplates fitting parts to other parts which originate from a source outside the control of the disclosed system. The Maker patent is limited to parts whose dimensions follow Gaussian distribution, while the system of the present invention can accommodate any distribution. The Maker patent does not provide correction for the "dead time" explained further in this specification and further does not take into account the production history of the parts, which the present invention does.

SUMMARY OF THE INVENTION

The invention is concerned with correlating and assembling parts.

The invention works with two classes of parts and with a parameter for each of the classes. The two parameters may represent the same variable or they may represent different variables. The parts of each class have the values of their parameters distributed over relatively wide tolerance ranges. However, the two parts which are to be assembled as a pair must have the values of their cooperating parameters correlated within a narrow tolerance range.

In essence, the values of the parameter of parts of each class are first determined. The parts of each class are then classified into pluralities of subclasses, each subclass consisting of parts with parameter values within a defined narrow range. The parts of at least one class may then be stored such that they can be selectively and individually retrieved. Information identifying the subclass and the storage location of each part is also stored. Updated information representing a number of quantities related to the need for parts of one of the classes is [retained] *kept.* On the basis of this updated information, periodic orders are issued for parts of a certain subclass of that one class. Also periodically, a part of each one of the two classes is selected from the storage such that the two selected parts are correlated to the desired tolerance of their cooperating parameters. This tolerance, or acceptance range of the cooperating parameters in the assembly may be much smaller than the tolerances for the individual parameters, being typically only a fraction of those individual tolerances. The two parts may then be assembled.

In the embodiment described in detail hereinunder, an example is given in which the two parameters are dimensions. The detailed description teaches how to control the supply of one of two classes of interfitting parts in accordance with the probable statistical distribution of the dimensions of the interfitting surfaces. The control objective is to minimize the number of parts which may be in storage and to produce pairs of interfitting parts wherein the clearance between the interfitting dimensions of the parts is within a tolerance range substantially narrower than the manufacturing tolerances permitted in the manufacture or selection of the two classes of parts.

It is understood, however, that the parameters may alternatively represent variables such as resistance, capacitance, etc., and that the two parameters may represent different variables.

DESCRIPTION OF PREFERRED EMBODIMENT

(A) General description

Figure 1:
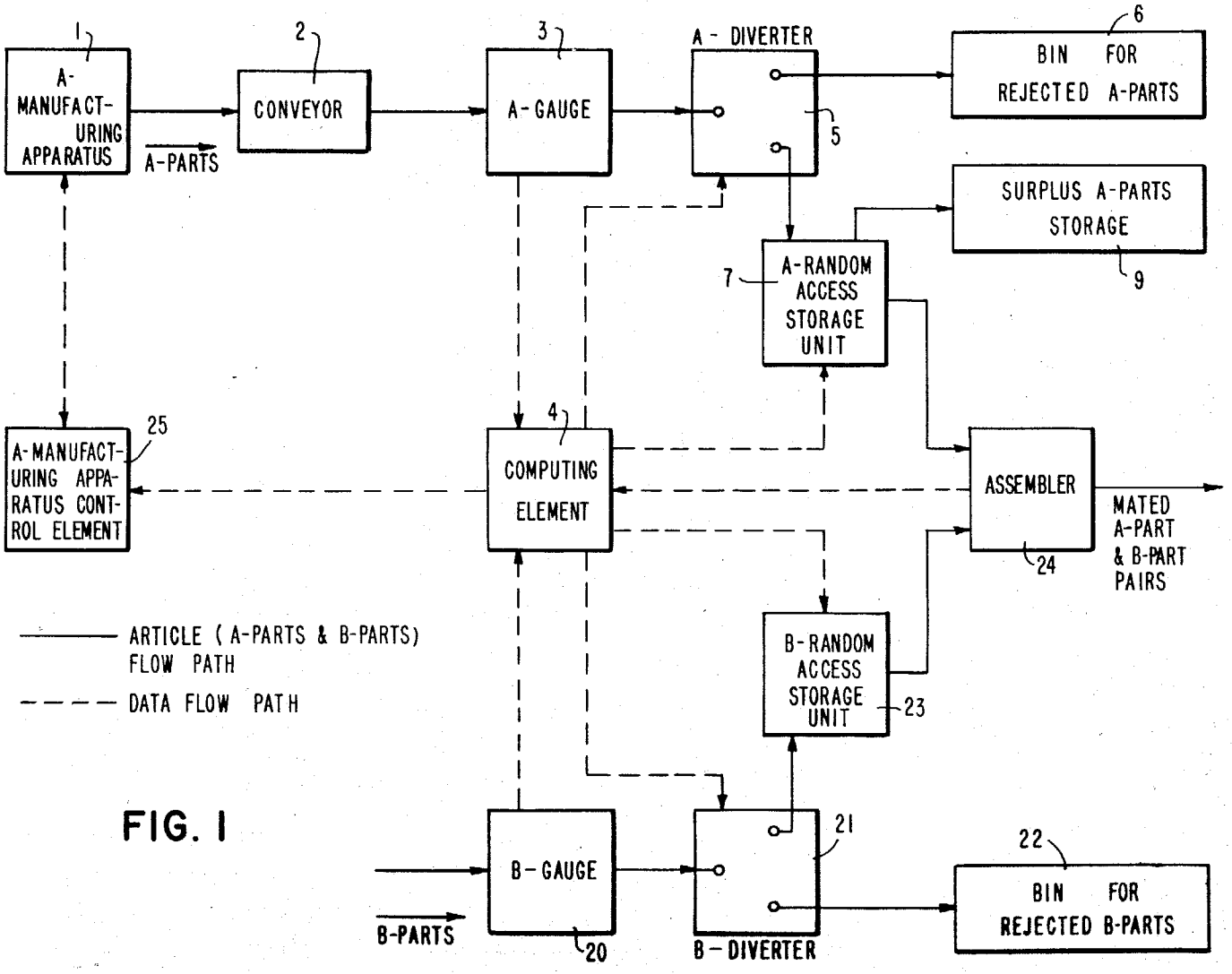
FIG. 1 is a block diagram of an apparatus embodying the invention.

The apparatus for assembling mated pairs of interfitting parts is generally and diagrammatically illustrated in FIGS. 1 through 4. The two parts in question are identified respectively as A-parts and B-parts. The manufacture of the A-parts is under the control of the apparatus illustrated, at least to the extent that the dimension of the surface which interfits with B-parts is controlled by that apparatus. The B-parts, sometimes referred to hereinafter as parts of the first class, are supplied from a source outside the apparatus. The dimension of the interfitting surfaces of the B-parts need not be under the control of the apparatus but the probable statistical distribution of that dimension among the B-parts should be known. For example, each B-part may be a cylinder such as that shown at B in FIGS. 3 and 4 and the corresponding A-parts may be the piston A which fits within that cylinder.

The A-parts are manufactured by a manufacturing apparatus capable of controlling at least the interfitting dimension of the A-parts. In the example chosen, the interfitting dimension is the diameter C of the piston A. Many apparatuses are known for manufacturing parts with a controlled dimension. A suitable apparatus is illustrated, for example, in our copending application, Ser. No. 756,091, filed Aug. 29, 1968, entitled Method and Apparatus for Precisely Contouring a Workpiece Imprecisely Positioned on a Supporting Fixture. Such an apparatus is illustrated generally in FIG. 1 by the reference numeral 1. The parts so manufactured proceed from the manufacturing apparatus along a conveyor 2 to an A-gauge 3. At the A-gauge the dimension of the interfitting surface is measured. Data describing the diameter C is transmitted to a Computing element 4 which is discussed in detail later in this specification. The measured parts pass from the A-gauge 3 to an A-diverter 5 which receives a control signal from the Computing element 4. Depending upon that signal, the diverter 5 sends the A-part either to a suitable repository for rejected A-parts, which may be a bin 6 or to an A-random access storage unit 7. If a part is sent to the storage unit 7, its location in the storage unit and its classification are stored in a suitable memory table in the Computing element 4, identified hereinafter as the A-location address table.

Figure 2:
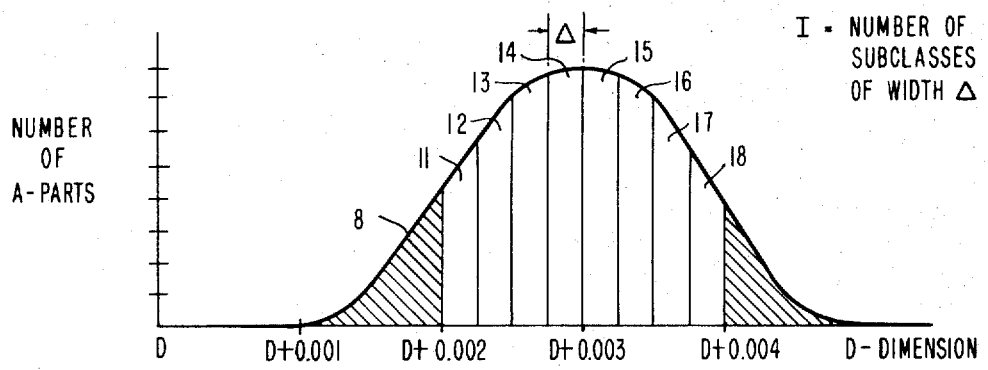
FIG. 2 is a graphical illustration of the probable distribution of incoming parts.

Referring to FIG. 2, there is shown a curve 8 illustrating by way of example, a possible statistical distribution of the A-parts passing through the A-gauge 3. The A-parts, hereinafter sometimes referred to as parts of the second class, are classified by the gauge 3 in one of eight subclasses i identified respectively by the numbers 11 to 18. The apparatus for manufacturing the A-parts is such that the parts reaching the gauge 3 have their diameters distributed statistically essentially in the manner illustrated by the curve 8 of FIG. 2. The designer of the apparatus may determine the limits within which an A-part will be acceptable as to its diameter. In the example illustrated, it is assumed that an A-part is acceptable if its diameter C lies between the values (D+0.002") and (D+0.004"). (D may be any number, expressed in units of length.) This region is divided into an arbitrarily selected number of subclasses i. In the example shown, there are eight subclasses, each 0.00025" wide. The total number of such acceptable subclasses is indicated hereinafter by the reference character I, any one of them is referred to as "subclass i," and the width of each subclass is indicated by the reference character Δ.

In the example given here for illustrative purposes only, any A-part whose diameter is below D+0.002" or above D+0.004" is rejected, and passes to the bin 6. The accepted A-parts are classified into one of the eight subclass 11 to 18. The accepted A-parts are stored in the storage unit 7 and the A-location address table in the computing element 4 is supplied with the address of the A-part in the storage unit and its classification.

Figure 3:
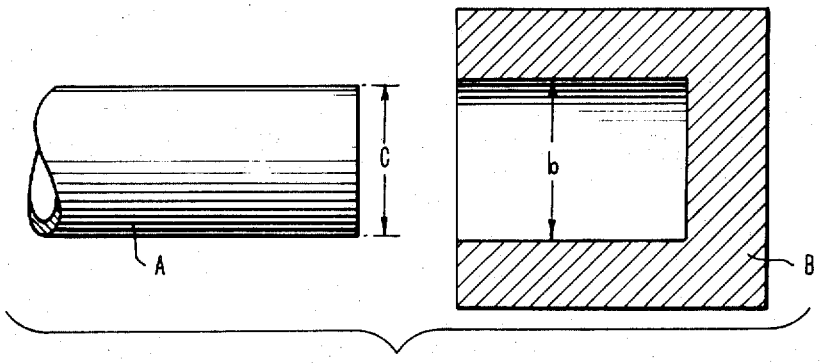
FIG. 3 is a view, partly in elevation and partly in cross-section, showing two exemplary parts which are to be interfitted in accordance with the invention.
Figure 4:
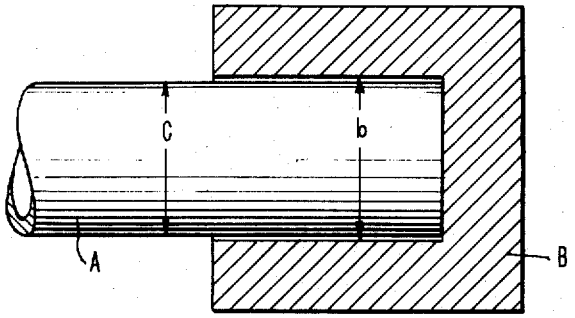
FIG. 4 shows the same two parts after they have been assembled.

The B-parts, hereinafter referred to as parts of the first class, come from a source outside the system of FIG. 1 and are transmitted to the B-gauge 20 where their internal diameter, indicated at b in FIGS. 3 and 4, is measured. The B-part diameter is transmitted to the computing element 4 which in turn transmits a control signal to the B-diverter 21. The control signal is effective to send the rejected B-parts to a reject bin 22 or to transmit the accepted B-parts to a B-random access storage unit 23. In the latter case, the address and classification of the B-part are sent to the Computing element 4.

The B-parts are classified in a manner similar to that illustrated for the A-parts in FIG. 2. Typically, the number of the B-part subclasses will be the same as for the A-parts, although it need not necessarily be the same. Since the B-parts have an internal recess which must receive the A-parts, a certain clearance is required between them. Hence, the inside diameter b of the B-parts must be slightly greater than outside diameter C of the A-parts. For example, the minimum dimension for the diameter b might be 0.0022" and the maximum dimension might be 0.0042". In the example illustrated, it would be desirable to match each B-part which falls into the lowest order subclass with an A-part in the lowest order subclass, i.e., the subclass 11 in FIG. 3. The clearance between such a matched pair, or (b–C) would be 0.0002". It is usually desirable to have an equal number I of subclasses of A-parts and of B-parts.

After the apparatus [have] *has* A-parts in storage unit 7 and B-parts in storage unit 23, it periodically calls for the disbursement of a B-part of a certain classification from storage unit 23 to an assembler 24. It also calls for a disbursement of an A-part which will fit that B-part with the desired clearance so that the two parts reach the assembler 24 concurrently, where they may be assembled and from which they may be discharged as a mated pair.

Figure 6:
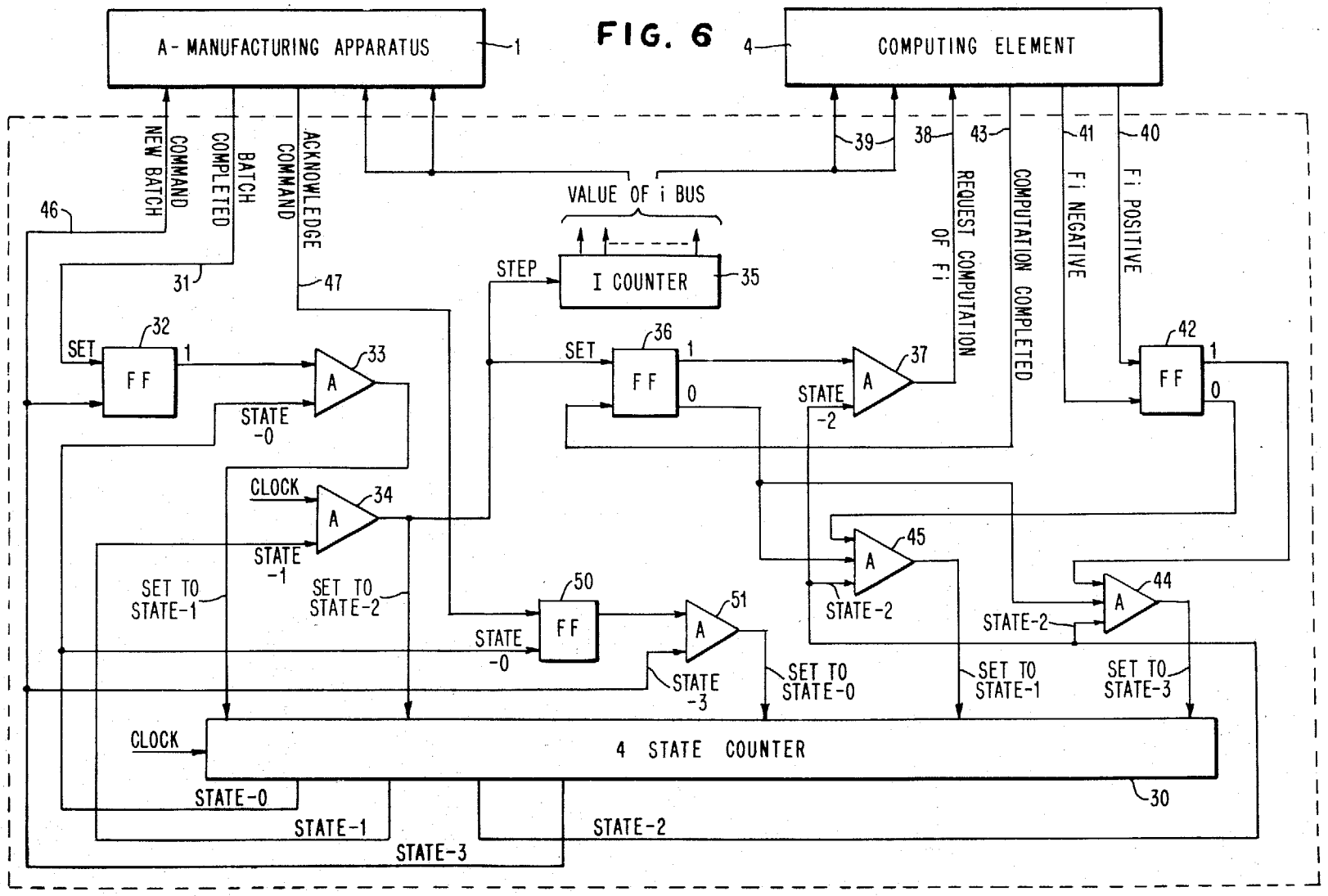
FIG. 6 is a block diagram illustrating the A-manufacturing apparatus control element and its interconnections.

The Computing element 4 is connected with an A-manufacturing apparatus control element 25 which is illustrated in greater detail in FIG. 6 and which controls the A-manufacturing apparatus 1.

Figure 5:
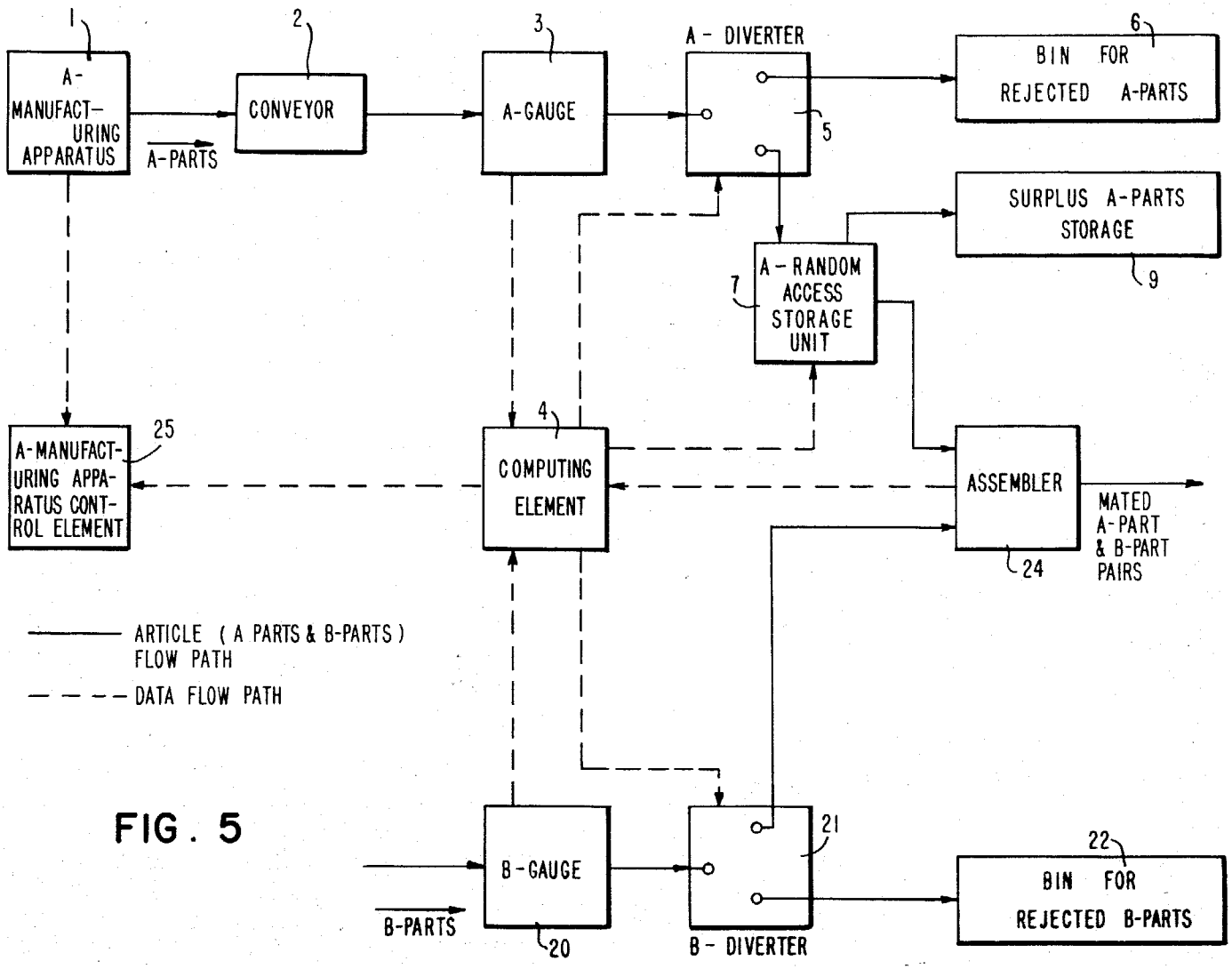
FIG. 5 is a view similar to FIG. 1 and showing a modified form of an apparatus embodying the invention.

A modification of the apparatus of FIG. 1, in which the random access storage unit 23 for B-parts is eliminated, is shown in FIG. 5. In such an arrangement, the Computing element must match each B-part, as it moves from the diverter 21 to the assembler 24, with an A-part which will fit the B-part with the desired clearance.

Such an arrangement may be used, for example, where the B-parts are large and/or expensive as compared to the A-parts, and it is desired to keep the inventory of the B-parts at a minimum.

While the A-parts and B-parts are identified herein as individual parts, it is alternatively possible to carry out the invention in a situation where each A-part is a complex subassembly of parts, the B-parts being either individual parts or other complex subassemblies. In such subassemblies, the tolerance range mentioned above would be the cumulative tolerance range built up by the algebraic addition of the individual tolerance ranges as the subassemblies are put together.

The algebraic sum of the two cumulative tolerance ranges of the assemblies must then fall within an acceptance range comparable to one of the subclasses mentioned above, and substantially smaller than either of the two cumulative tolerance ranges from which it is derived.

(B) Detailed description of the preferred embodiment (1) Introduction.—The preferred embodiment of the invention is implemented in a structure controlled by a computing element.

The operation of the computing element and its interconnections with the structure for handling the A-parts and the B-parts are described in detail under headings 2 through 16 below. It is noted at this time that the invented combination disclosed herein utilizes a number of conventional elements which, for the sake of brevity, have not been described in detail. Thus, the disclosure below mentions flip-flops, AND-gates, OR-gates, counters, an accumulator, multivibrators, etc., without giving their specific physical construction. It is to be understood that the elements whose structure is not described explicitly are of the types known in the art and that their interconnection is the conventional interconnection employed in the art. Specific references from the prior art describing the conventional elements referred to above and their interconnection in structures such as the invented structure are: Arithmetic Operations in Digital Computers, by R. K. Richards, Van Nostrand, 1955; Digital Computer Components and Circuits, by R. K. Richards, Van Nostrand, 1957; and The Logic Design of Transistor Digital Computers, by Gerald A. Maley and John Earle, Prentice Hall, 1963. Also, no specific components are disclosed for the structure for transporting parts and storing parts, it being understood that conventional transporting and storing means are used.

Certain design considerations for the operation of the invented system are developed later in this specification in terms of mathematical expressions. Chart 1 below gives the definitions of the symbols used throughout the mathematical derivations and in the description thereof further in this specification.

CHART 1

| Symbol | Definition |
|---|---|
| $A_o$ | In a batch of A-parts ordered in the ith subclass, the ratio between the number of parts actually manufactured in the ith subclass and the total number of A-parts in the batch. |
| $A_k$ | In a batch of A-parts ordered in the ith subclass, the ratio between the number of parts actually manufactured in the (i+k)-th subclass and the total number of A-parts in the batch. |
| $A_{LIM}$ | A number equal to 1 plus the number of storage locations in the A-random access storage unit. |
| $B_{LIM}$ | A number equal to 1 plus the number of storage locations in the B-random access storage unit. |
| c | An integer greater than 0. |
| e | The natural logarithmic base. |
| $F_i$ | A figure of merit expressing the desirability of ordering a batch of A-parts with target dimension in the ith subclass. |
| $G_i$ | The number of A-parts of the ith subclass which are expected to reach the A-guage as a result of commands delivered to the A-manufacturing apparatus since the most recent completion of the "update Z-table" routine. |
| $H_i$ | The number of A-parts of the ith subclass which have passed through the A-gauge since the most recent completion of the "update Z-table" routine. |
| I | The number of subclasses within the acceptable band. |
| i | A positive integer, used as an index to denote each individual subclass within the acceptable band and ranging in value between 1 and I. When used as a subscript, denotes that the quantity associated with the subscript refers to the ith subclass. |
| j | A positive integer, used as an index and ranging in value between 1 and I. |
| k | An integer ranging in value between zero and (I–1), and also equal to the absolute magnitude of (i-j). |
| L | A constant determining the threshold at which a command to manufacture a batch of A-parts will be issued. Typically, L is set to equal m. |
| m | The number of A-parts in a batch. m is an integer equal to or greater than 1. |
| $m_{R_b}$ | Approximate average time between commands for batches of A-parts. |
| $N_a$ | Target value denoting the number by which the number of parts in the A-random access storage unit exceeds the number of parts in the B-random access storage unit. |
| $N_o$ | The average number of B-parts which will pass through B-gauge during the "dead-time," that is, between the time an order for A-parts is issued and the time the first part of the ordered batch is received at A-gauge. Note that $N_o$ is approximately equal to the number of A-parts that have been ordered, but have not yet been delivered to the A-gauge. |
| $N_i$ | The expected number of parts of subclass i present in the A-random access storage unit. |
| $P_i$ | The probability associated with the ith subclass that the next B-part to arrive at the B-gauge will be classified in the ith subclass. |
| $P_m$ | The desired upper limit for the probability that a B-part arriving at the B-gauge will not find an available A-part present in the A-random access storage unit with which it can be mated. |
| $Q_i$ | The quantity is set to be equal to 1 if the last B-part which passed through B-gauge was classified in subclass i. Otherwise, $Q_i$ is set to be equal to zero. |
| $R_a$ | The rate of arrival of A-parts at A-gauge, in parts per unit time, applicable to the time when A-parts are moving in a steady stream. $R_a$ is assumed to be equal to or greater than $R_b$. |
| $R_b$ | Average rate of arrival of B-parts at the B-gauge, in parts per unit time. |

CHART 1—Continued

| Symbol | Definition |
|---|---|
| s | The code addressing the individual registers of the A-location address table and the B-location address table. The "s-code" also identifies individual part storage locations in the A- and B-random access storage units. |
| S | The maximum number of storage locations in the larger one of the A- and B-random access storage units. |
| $U_i$ | A number expressing the need for A-parts of the ith subclass during the time defined as the period between [curren] (*current* time+dead-time) and (current time+dead-time+ $m \div R_b$ |
| $V_i$ | The net number of available A-parts of the ith subclass which are forecast to be present in the A-random access storage unit at the future time which is "dead-time" time units later than the current time. |
| $W_i$ | The number of B-parts of the ith subclass which are forecast to be received in the B-random access storage unit during the period between current time and the future time defined as (current time+"dead-time" time units). |
| $X_i$ | The known number of current A-parts of the ith subclass present in the A-random access storage unit. |
| $Y_i$ | The known number of B-parts of the ith subclass present in the B-random access storage unit. |
| $Z_i$ | An estimate of the number of A-parts which have been ordered and which are expected to fall into the ith subclass when manufactured. |
| $\alpha$ | A parameter ranging in value between 0 and 1, denoting the weight given to the classification of the most recent A-part that has passed through the A-guage. |
| $\beta$ | A constant ranging in value between 0 and 1 whose value is chosen depending on the expected stability of the distribution of the measured dimension of the B-parts. If the value of the measured dimension of the successive B-parts is expected to fluctuate over a wide range, then $\beta$ is chosen to be very much smaller than 1. If the B-parts are expected to be consistent in their measured dimension, and subject to relatively slow drifting, then B is chosen to be approximately 1. |
| $\Delta$ | The width of a subclass. |
| $\sigma$ | Standared deviation expressed in the same units as $\Delta$. |

(2) A-manufacturing apparatus control element.—The A-manufacturing apparatus control element, shown generally as block 25 in FIG. 1, is illustrated in more detail in FIG. 6. The control element 25 responds to a signal from the A-manufacturing apparatus 1 that a batch has been completed. It selects, with the aid of Computing element 4, the target subclass for the next batch of A-parts to be manufactured, and commands the A-manufacturing apparatus 1 to manufacture a batch with dimensions in the target subclass. It communicates directly with the A-manufacturing apparatus 1 and with Computing element 4.

Several different modes of selection of the target subclass may be employed. One particular mode of selection calls for a successive sweep across the several subclasses i in numerical order. When the A-manufacturing apparatus 1 signals that it can accept a new order for a batch of A-parts, the A-manufacturing apparatus control element 25 of FIG. 6 initiates a sweep of the subclasses. With the aid of Computing element 4, the value of a figure of merit $F_i$ is determined for each subclass i of A-parts. The figure of merit is an indication of whether there is a need for manufacturing parts in the ith subclass. The figure of merit is determined according to the following expression, the terms of which are defined in Chart 1 above:

$$F_i = -L + \sum_{j=1}^{j=I} A_k[(N_a+N_c)P_j - X_j + Y_j \quad ] \tag{e-1}$$

The above expression for the figure of merit is derived as the result of system analysis of the problem involved in the matching of A- and B-parts to tolerances closer than the manufacturing tolerances of the parts themselves. The analysis and the derivation of the expression for the $F_i$ will be shown first, and then a physical embodiment of the system will be disclosed.

The rate of arrival of B-parts at B-gauge, $R_b$, is not controlled by the system and will thus be a constant which the system has to accommodate. The rate of manufacture of A-parts, and thus the rate of arrival of A-parts at A-gauge, $R_a$, is chosen to be greater than $R_b$. The A-manufacturing apparatus will thus have to operate intermittently, by producing a batch of A-parts and then going into an idle condition called "dead-time" before commencing the manufacture of the next batch.

Under steady state conditions, the average rate of arrival of A-parts at A-gauge should be approximately equal to the average rate of arrival of B-parts at B-gauge.

The average number of A-parts which have been ordered but have not yet appeared at A-gauge is approximately equal to $N_o$, where $$N_o = R_b \cdot (\text{dead time}) \tag{e-2}$$

If m is the number of A-parts per batch, then the A-manufacturing apparatus will commence the manufacture of a batch of A-parts on the average every $$\frac{(m)}{(R_b)}$$

Generally, the number of A-parts in the A-random access storage unit 7 must be greater than the number of B-parts in the B-random access storage unit 23, so that the likelihood of a B-part from the B-random access storage unit not finding a matching A-part present in the A-random access storage unit would be small. The target number by which the A-parts that are currently in the A-random access storage unit are to exceed the B-parts in the B-random access storage unit is labelled $N_a$. It is desirable to choose $N_a$ to be a large figure, so that the chance of a B-part not finding a matching A-part would be small. On the other hand, it is also desirable to keep $N_a$ low, so as not to incur excessive inventory expenses and storage problems.

In analyzing the problem, it is first assumed that the A-manufacturing apparatus is controlled in such a manner as to cause $N_i$, the expected number of A-parts of subclass i in the A-random access storage unit, to be equal to the product, $(P_i \cdot N_a)$ [$P_j \cdot N_a$], or, $$N_i = P_i \cdot N_a \tag{e-3}$$

where $P_i$[$P_j$] is the probability that the next B-part to arrive at B-gauge will be in the ith subclass.

The number of A-parts in subclass i that are currently present in the A-random access storage unit is labelled $X_i$. The probability that $X_i$ will have a specific integer value c, the probability being labelled $P(X_i=c)$, is assumed to be approximately given by the standard Poisson *Distribution* [Distribution]. Thus:

$$P(x_i=c) = \frac{e^{-N_i} \cdot N_i^c}{c!} \tag{e-4}$$

The probability that there will be no A-part of the ith subclass in the A-random acces storage unit will be given by solving (e-4) for the case of c=0. Thus:

$$P(X_i=O) = e^{-N_i} = e^{-P_i N_a} \tag{e-5}$$

The probability that there will be no match between the next B-part to arrive at the B-gauge and an A-part currently present in the A-random access storage unit is then given by.

$$P_m = \sum_{i=1}^{i=I} P_i \cdot e^{-P_i N_a} \tag{e-6}$$

In the case where the B-parts are uniformuly distributed over the acceptance band of B-parts:

$$P_i = \frac{1}{I} \tag{e-7}$$

Then:

$$P_m = \sum_{i=1}^{i=I} \frac{1}{I} e^{\frac{-N_a}{I}} = \frac{1}{I} I e^{\frac{-N_a}{I}} = e^{\frac{-N_a}{I}} \tag{e-8}$$

And:

$$[N_a = -\text{Log}_e P_m] \; N_a = -I \; \text{Log}_e \; P_m \tag{e-9}$$

The expression for $N_a$, the target value by which the number of A-parts currently in storage is to exceed the number of B-parts in storage, as given in Equation e–9, was derived on the basis of certain assumptions. In order for the relationship to be true, it is necessary that m, the number of A-parts in a batch, be small compared to $N_1$.

Equation e–9 will be sufficiently accurate provided that:

$$m \leq -\frac{\mathrm{Log}_e P_m}{4A_o} \qquad \text{(e–10)}$$

$A_o$ is a coefficient based on the value of $\sigma$, the standard deviation of manufactured A-parts from the dimension ordered, and on the value of $\Delta$, the width of the subclass i of A-parts ordered and manufactured. $A_o$ denotes the fraction representing the ratio of the number of A-parts actually manufactured in the ith subclass to the number of A-parts ordered in the ith subclass. In this discussion it is a probability figure. It is computed by starting with the assumption that the A-manufacturing apparatus is such that the A-parts of any manufactured batch have dimensional distribution following the Gaussian curve; also, that the parts have a standard deviation $\sigma$, and a mean $\mu$ which is centrally located with respect to the ordered dimensional subclass i. The value of $A_o$ is then computed by reference to a standard distribution table, and by using the chosen values for $\sigma$ and $\Delta$. Chart 2, below, gives a partial listing of values for $A_o$. Note that $A_o$ is the probability that an A-part ordered in subclass i will actually be in subclass i when manufactured; $A_1$ is the probability that an A-part ordered in subclass i will be in subclass i+1 when manufactured, etc.

CHART 2

| $\sigma/\Delta$ | $A_{-5}$ | $A_{-4}$ | $A_{-3}$ | $A_{-2}$ | $A_{-1}$ | $A_0$ | $A_{+1}$ | $A_{+2}$ | $A_{+3}$ | $A_{+4}$ | $A_{+5}$ |
|---|---|---|---|---|---|---|---|---|---|---|---|
| 0.25 | | | | | .0227 | .9546 | .0227 | | | | |
| 0.50 | | | | .0013 | .1574 | .6826 | .1574 | .0013 | | | |
| 0.75 | | | | .0223 | .2287 | .4972 | .2287 | .0223 | | | |
| 1.0 | | | .0062 | .0606 | .2417 | .3830 | .2417 | .0606 | .0062 | | |
| 1.25 | | .0024 | .0201 | .0924 | .2295 | .3108 | .2295 | .0924 | .0201 | .0024 | |
| 1.50 | .0012 | .0083 | .0379 | .1112 | .2110 | .2606 | .2110 | .1112 | .0379 | .0083 | .0012 |
| 1.75 | .0043 | .0176 | .0537 | .1196 | .1918 | .2244 | .1918 | .1196 | .0537 | .0176 | .0043 |

If a manufacturing apparatus is such that m must have a higher value than the value determined by Equation e–10, then either $P_m$, or $\Delta$, or both should be decreased. Note, however, that a decrease in those quantities will also result in a higher value for $N_a$.

In arriving at the figure of merit $F_i$, expressing the desirability of ordering a new batch of A-parts with dimensions in the ith subclass, it is of interest to know what is the present need for this subclass of A-parts. if $U_i$ is to designate a measure of the need for A-parts of the ith subclass, and $V_i$ is to designate the net available A-parts of the ith subclass that are forecast to be present in the A-random access storage unit at the future time which is "dead-time" time units later than the present time, then $U_i$ can be expressed as:

$$U_i = N_a P_i(t) - V_i \qquad \text{(e–11)}$$

$U_i$ was defined as a measure of the present need for A-parts of the ith subclass. Referring to Equation e–11, it is noted that an above average need for A-parts of the ith subclass is indicated when $U_i$ is a positive number, and a below average need for A-parts is indicated when $U_i$ is a negative number.

Additionally, if the known number of A-parts of the ith subclass now present in the A-random access storage unit is labelled $X_i$; the known number of B-parts of the ith subclass now present in the B-random access storage unit is labelled $Y_i$; the number of A-parts of the ith subclass which are expected to arrive at A-gauge as a result of previous orders to the A-manufacturing apparatus is labelled $Z_i$; and the number of B-parts of the ith subclass which are forecast to be received in the B-random access storage unit during the period between now and "dead-time" time units later is labelled $W_i$, then:

$$V_i = X_i + Z_i - W_i - Y_i \qquad \text{(e–12)}$$

Assuming a small reject rate for B-parts, then:

$$N_o \cong \sum_{i=1}^{i=I} W_i \qquad \text{(e–13)}$$

$$W_i = P_i N_o \qquad \text{(e–14)}$$

$$U_i = N_a P_i - X_i + Y_i - Z_i + Y_i \qquad \text{(e–15)}$$

$$U_i = N_a P_i - X_i + Y_i - Z_i + N_o P_i \qquad \text{(e–16)}$$

$$U_i = (N_a + N_o) P_i - X_i + Y_i - Z_i \qquad \text{(e–17)}$$

Assuming that there will be no substantial variation in the future distribution of B-parts arriving at B-gauge over the present distribution, and assuming that the most favorable distribution of A-parts in storage is one that resembles the steady state distribution of B-parts arriving at B-gauge, a figure of merit $F_i$ can be expressed as:

$$F_i = \sum_{k=i-I}^{k=i-1} A_{i-k} U_{i-k} - L \qquad \text{(e–18)}$$

All quantities in the above equation, except L, have been previously defined. L is a constant which is to control the threshold of need at which an order for a new batch is to be placed. Typically, L is set to be equal to m, the number of A-parts in a batch.

Substituting Equation e–17 into equation e–10 and using subscripe $(i-k) \equiv j$ to denote a particular subclass within the acceptance band:

$$F_i = L + \sum_{j=1}^{j=I} A_k[(N_a + N_o)P_j - X_j + Y_j - Z_j] \qquad \text{(e–19)}$$

The function of ordering new batches of A-parts from the A-manufacturing apparatus is carried out directly by the A-manufacturing apparatus control element 25 which operates in conjunction with the Computing element 4. The A-manufacturing apparatus control element is shown as block 25 in FIG. 1, and is illustrated in greater detail in FIG. 6. Referring now to FIG. 6, it is seen that control element 25 communicates directly with A-manufacturing apparatus 1 to send to it orders for new batches of A-parts and to specify the desired subclass i of the ordered batch, as well as to receive "acknowledge command" and "batch-completed" signals. Control element 25 also communicates directly with Computing element 4 to request from it computation of the figure of merit $F_i$ for a particular subclass i and to receive indications of whether the computed figure of merit is positive or negative, and that Computing element 4 has completed the requested computation.

In operation, element 25 is cycled through four states by Counter 30. Counter 30 may be a ring counter, or it may be a modulo counter of conventional design.

Assume that Counter 30 is initially in state 0. Assume further that a "batch completed" pulse signal is received from the A-manufacturing apparatus 1 over line 31. This signal is transmitted to flip-flop 32 and sets it to its 1 state. The signal then goes through AND-gate 33 to Counter 30, causing the counter to step to state 1 at the next clock pulse.

With the Counter 30 in state 1, the next clock pulse will cause a signal to pass through AND-gate 34 and effect the following three events:

(a) the I-counter 35 (which again may be a ring or a modulo counter, cycling sequentially from state 1 through state I) steps to its next state;
(b) flip-flop 36 switches to its 1 state; and
(c) Counter 30 is stepped to state 2 by the output pulse from AND-gate 34.

With Counter 30 in state 2, a signal is sent via AND-gate 37 to line 38 leading to Computing element 4. This line, having a signal on it, requests computation of $F_i$ for the particular value of i shown by I-counter 35 over the value-of-i bus 39. The Computing element 4 performs the necessary computation, as described in detail later in this specification under the heading Computing element, and subsequently delivers a signal either on line 40, indicating that $F_i$ is positive, or on line 41, indicating that $F_i$ is negative. These signals will cause a flip-flop 42 to be switched to either a 1 or a 0 state. Thereafter, the Computing element 4 will deliver a signal on the computation-completed line 43, causing flip-flop 36 to be re-set to its 0 state. The next clock pulse either causes Counter 30 to step to state 1, if flip-flop 42 is in the 0 state, or to step to state 3 (if flip-flop 42 is in the 1 state). That is to say, if flip-flop 42 is in the 1 state, the signal from flip-flop 42 passes through AND-gate 44 concurrently with the state 2 signal from Counter 30 and the 0 state signal from the flip-flop 36, thus causing AND-gate 44 to pass a pulse which steps Counter 30 to state 3. On the other hand, if flip-flop 42 is in its 0 state, then AND-gate 45 becomes effective to switch Counter 30 to state 1.

If Counter 30 is switched to state 1, then it goes again through the sequence described above.

If Counter 30 is stepped to state 3, a signal is generated on the "state 3" output line which re-sets flip-flop 32 to its 0 state. The signal is also sent over line 46 to the A-manufacturing apparatus 1 where it is effective to command the production of a new batch of A-parts. The same signal is sent to AND-gate 51 to energize one of its inputs. The code specifying the target value of i is sent to the A-manufacturing apparatus 1 simultaneously from Counter 35 over the value-of-i bus 39. At a subsequent time, the A-manufacturing apparatus generates an acknowledge-command signal on line 47 which sets flip-flop 50 to its 1 state. This causes a signal to pass via AND-gate 51 to Counter 30 and Counter 30 is set to state 0. This in turn re-sets flip-flop 50 to its 0 state.

Thus, there has been described one complete cycle of the steps of the A-manufacturing apparatus control element 25. At each cycle, figure of merit for new value of i is checked to see whether a new batch of parts should be ordered with that dimension. If Computing element 4 sends back an indication of a negative value for $F_i$, that means that no new batch should be ordered in the ith subclass. Then control element 25 moves along to the next numeric value of i, and causes a check to be made there. It proceeds along the sequence in numerical order of the subclasses i, until it finds that Computing element 4 indicates, on the basis of the considerations going into the expression for the figure of merit, that a new batch of A-parts is needed, by a signal over line 40. After the manufacture of a new batch of A-parts, A-manufacturing apparatus control element 25 picks up the sequence of i subclasses at the value of i which is one integer higher than the value of i for the cycle of Counter 30 at which a new batch of A-parts was ordered, and runs through more cycles of Counter 30 until a new positive figure of merit is determined by Computing element 4.

(3) Computing element.—Computing element 4 assists in the essential functions of classifying A and B parts on the basis of information from the A and B gauges, keeping track of present and future inventories of parts, and advising the A-manufacturing apparatus control element 25 as to desirability of ordering a batch of new A-parts.

Figure 7:
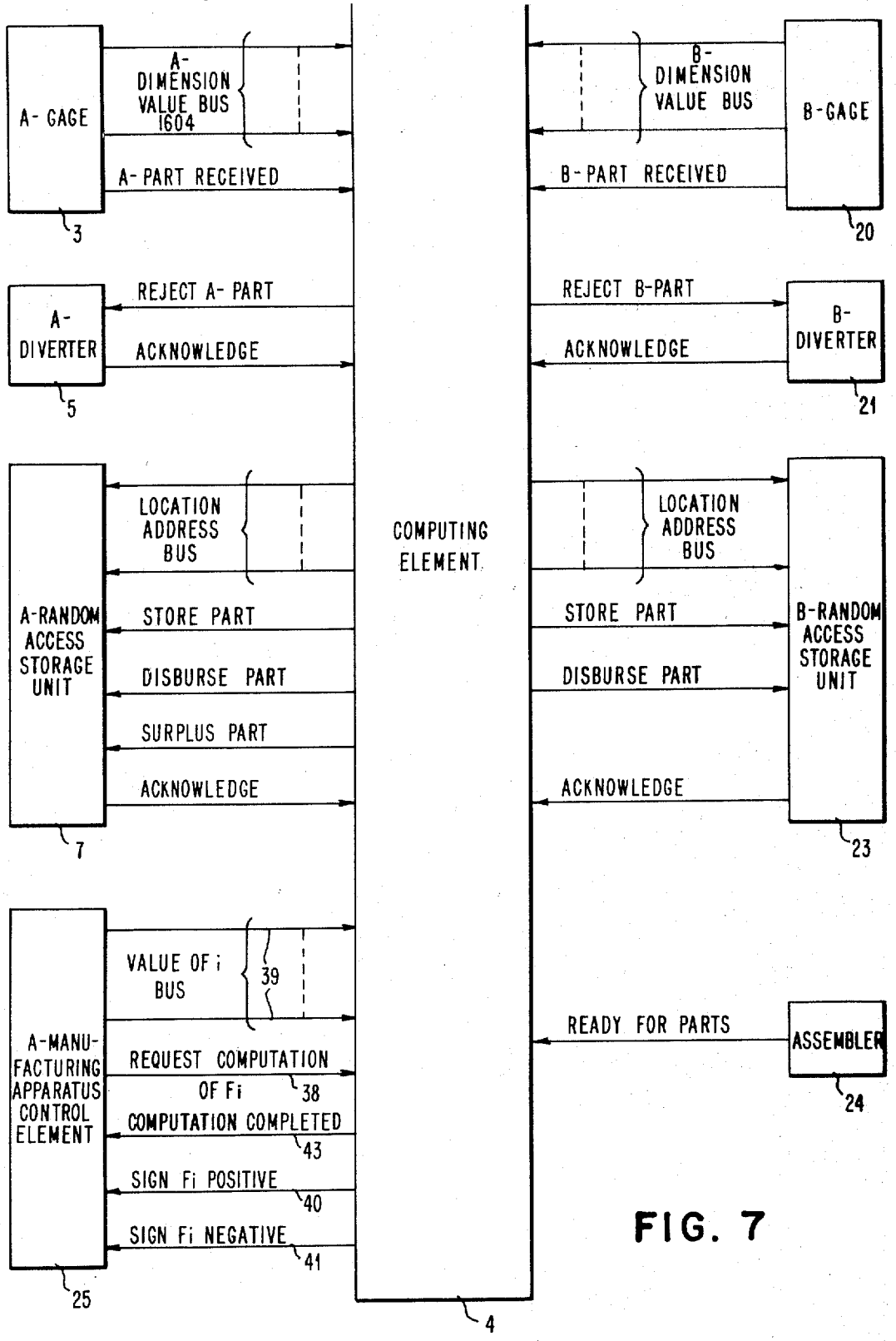
FIG. 7 illustrates the information signals exchanged between the Computing element and the other elements of the apparatus.

The Computing element is shown generally as block 4 in FIG. 1, and its interconnections with other elements of the system of FIG. 1 are shown in more detail in FIG. 7.

Referring to FIG. 7, it can be seen that Computing element 4 communicates with A-gauge 3 and with B-gauge 20 to receive from each an indication of the size of the measured dimension of the A and B parts. Computing element 4 also receives indications from the A and B gauges that a part has been received at the gauge.

Computing element 4 communicates with the A-diverter 5 and with the B-diverter 21 to signal to them to reject a particular A or B part and also to receive from them an acknowledgement signal indicating that the command of the Computing element has been carried out.

Computing element 4 communicates with the A and B random excess storage units 7 and 23 to give each a location address, over the location address bus carrying the "s-code," indicating the location of a particular part in the storage units, and gives commands to each of the storage units to store a part, or to disburse a part. The A-random excess storage unit 7 may further receive a command that a particular part, identified by a location address, is to be diverted to the surplus part storage unit 9. Both storage units send to Computing element 4 acknowledgement signals indicating that a command has been carried out.

Computing element 4 is also directly connected with A-manufacturing apparatus control element 25 to assist it in ordering new batch of A-parts. Control element 25 supplies Computing element 4 with an identification of the i subclass of interest over value-of-i bus 39, and requests computation of the figure of merit by a signal over line 38. Computing element 4 responds by sending to Control element 25 signals indicating whether the figure of merit is positive, over line 40, or negative, over line 41, and also supplies a computation-completed signal over line 43.

Computing element 4 also receives indications from Assembler 24 that the Assembler is ready for a new pair of parts that are to be mated.

Computing element 4 stores in its memory a number of tables and maintains the table information up to date. The tables are stored in several sets of registers, each set comprising a number of individual registers. In the case of six of the tables stored in Computing element 4, the number of individual registers for each table is I, I again being the number of subclasses i within the acceptance band for A and B parts. The six tables are the X, Y, Z, G, H and P tables. They contain the values of X, Y, Z, G, H and P for each of the total of I subclasses i. The six symbols are defined in Chart 1 and the logic for keeping each table up-to-date is discussed in detail further in this specification.

Figure 9:
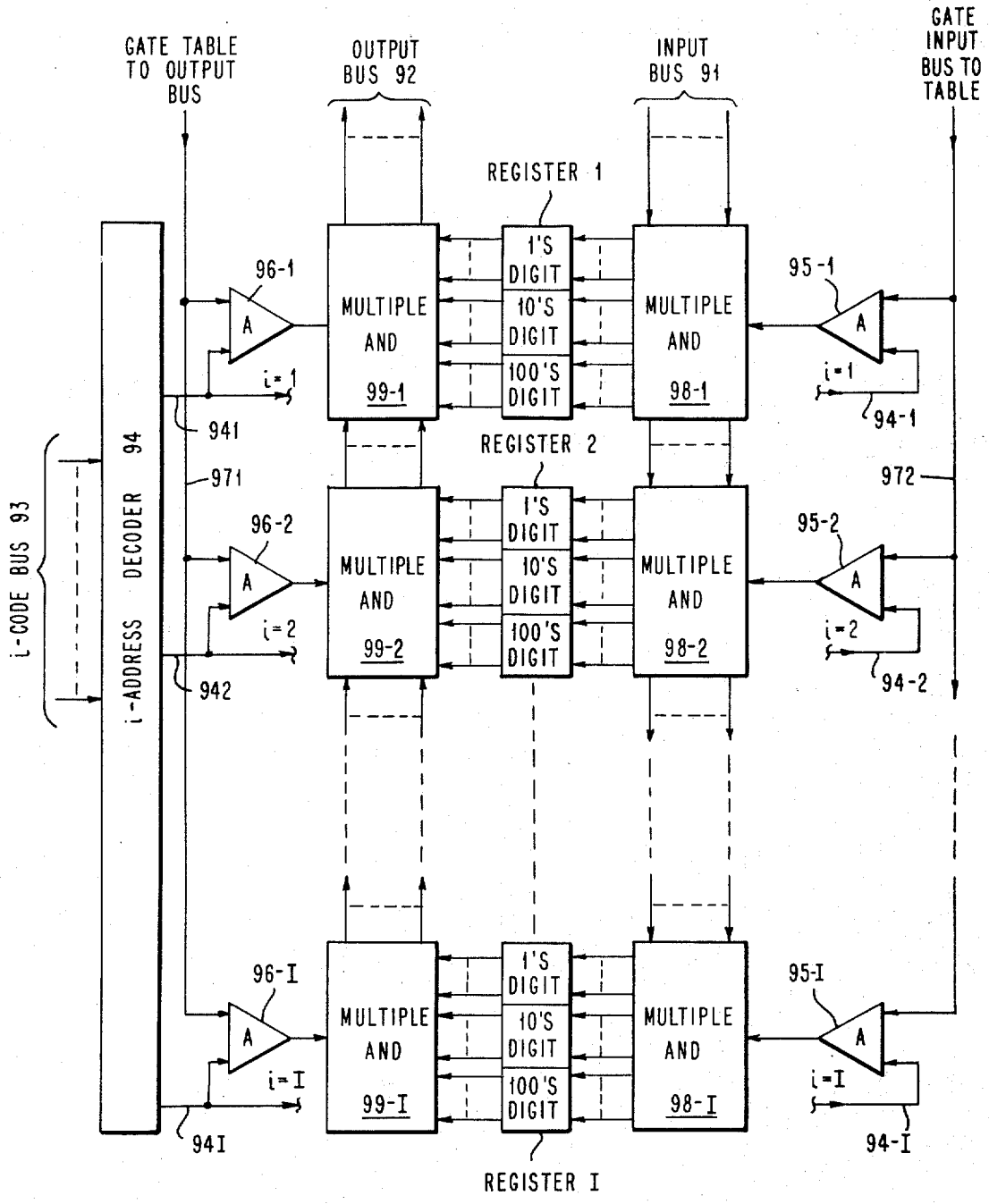
FIG. 9 illustrates in some detail a typical set of registers that are to be employed in the tables of FIG. 10.

The six tables are stored in sets of registers such as the ones shown in FIG. 9. There are I registers, of which only registers 1, 2 and I are shown. Each register contains the value of X, Y, etc., for a single subclass i, the value being expressed in the equivalent of a 3-digit decimal number. It is noted that decimal numbers are used in this specfiication for convenience of description only, but that this system may actually employ, in different implementations of the invention, codes such as binary, bcd, weighted bcd, etc. Registers 1 through I of FIG. 9 can be loaded with information carried by input bus 91, and their contents are read out on output bus 92. Each of the two buses comprises a set of individual leads whose number is at least equal to the number of bits in the encoded equivalent of a 3-digit decimal number. Additional leads may be used for error detection and correction purposes.

No particular physical embodiment of the registers is specified. In practice a random access core memory of sufficient capacity may be used. Any other suitable storage, such as film memory, or shift registers, can also be used.

Individual registers are addressed by the "i-code" bus 93. Since each register is associated with a particular subclass a, "i-code" bus 93 carries the encoded representation of the subclass associated with the register to be addressed. The value carried by the "i-code" bus 93 is decoded by Decoder 94 with the result that a single one of leads 94–1 through 94–I is energized. As an example, if it is desired to load register 2, "i-code" bus 93 will carry the equivalent of i equal to decimal 2, Decoder 94 will energize lead 94–2, lead 94–2 will supply one of the inputs to AND-gate 95–2, gating lead 972 which carries the command to load, will supply the other input to AND-gate 95–2, the output of AND-gate 95–2 will supply the gating signal to multiple AND-network 98–2, and the information carried by input bus 91 will be gated into register 2. If, on the other hand, it is desired to read out register 2, gating lead 971 will be energized instead of gating lead 972, then AND-gate 96–2, will open multiple AND network 99–2, and the contents of register 2 will appear on output bus 92.

Figure 10:
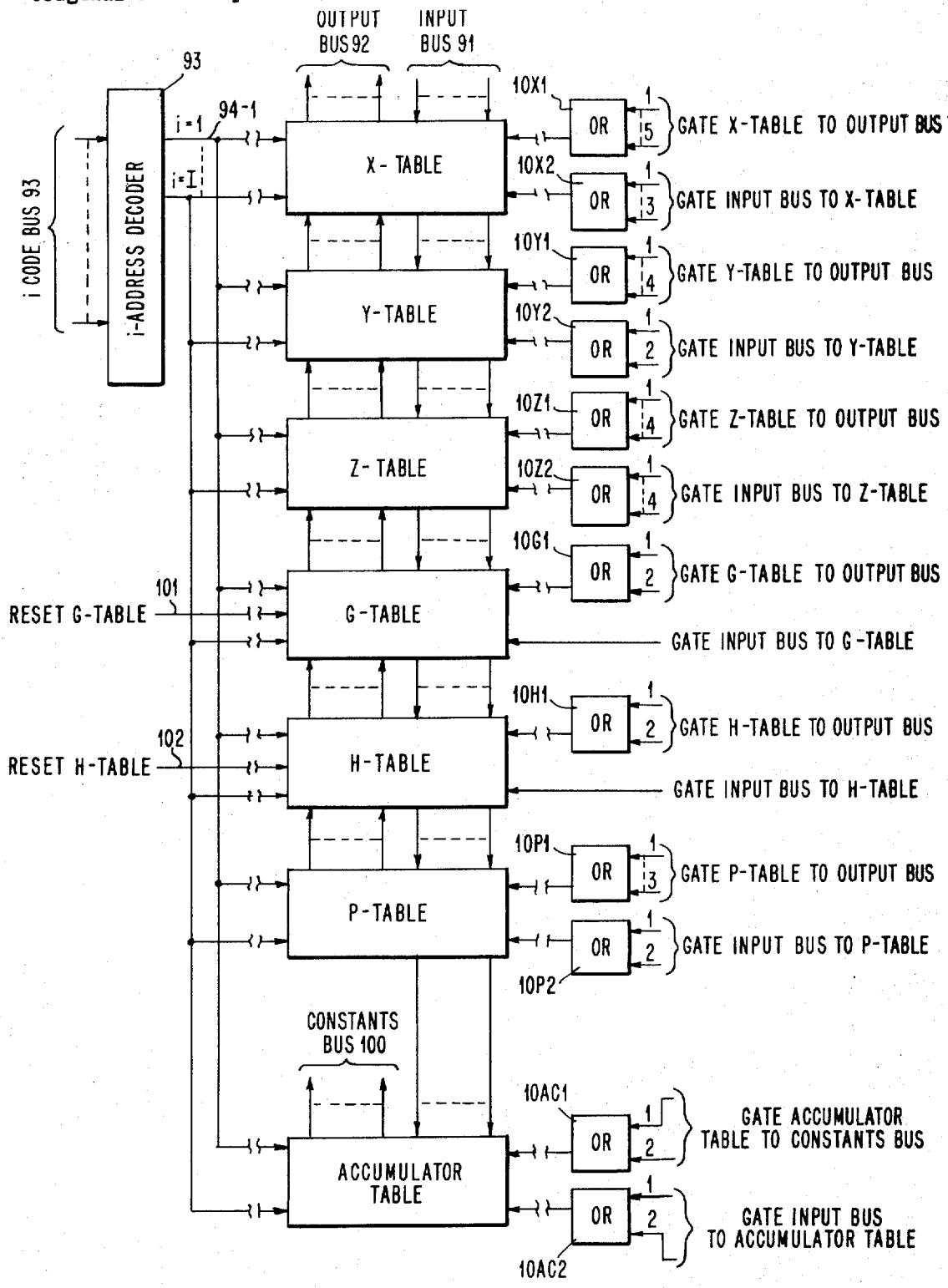
FIG. 10 illustrates in block form a series of tables.

The six tables listed above are interconnected as shown in FIG. 10. FIG. 10 also shows an Accumulator table which will be discussed later. It is noted again, that "i-code" bus 93 carries the number of the subclass whose associated register is to be accessed. Decoder 94 decodes the encoded number carried by "i-code" bus 93 and energizes a single one of its I output leads. The energized lead coming out of decoder 94 will be directed to a particular one of tables X through P by the output of one of the OR-gates or by one of the gate input leads shown to the right of the tables of FIG. 10. It is to be understood that multiple AND-networks and additional gating networks, such as shown in FIG. 9, are employed in accessing individual registers of tables X through P of FIG. 10.

As an example of the operation of the structure shown in FIG. 10, suppose that it is desired to read out the contents of that register of the Y-table which is associated with subclass 1. Decoder 94 will energize output lead 94–1. The output of OR-gate 10Y1 will identify the Y-table. The Y-table gating network of the type illustrated in FIG. 9 will then gate the contents of the first register of the Y-table to output bus 92.

If it is desired to read the information carried by input bus 91 into the first register of the Y-table the output of OR-gate 10Y2 will be energized. The inputs to the OR-gates of FIG. 10 will be described later. It is noted here that the G and H tables have inputs 101 and 102 respectively which, when energized, set all registers of their respective tables to zero.

In addition to the above-mentioned six tables, FIG. 10 shows an Accumulator table which is not connected to the output bus 92, but to a Constants bus 100. This table also has a total of I registers. The connection is through a multiple AND-network similar to the ones of FIG. 9, but not shown here. When the output of OR-gate 10AC1 is energized, the information carried by the input bus 91 is gated to a register of Accumulator table identified by the "i-code" bus 93 and stored there. When the output of OR-gate 10AC2 is energized, the contents of a register of the Accumulator tables are gated to constants bus 100. The inputs to OR-gates 10AC1 and 10AC2 will be described later.

Figure 11:
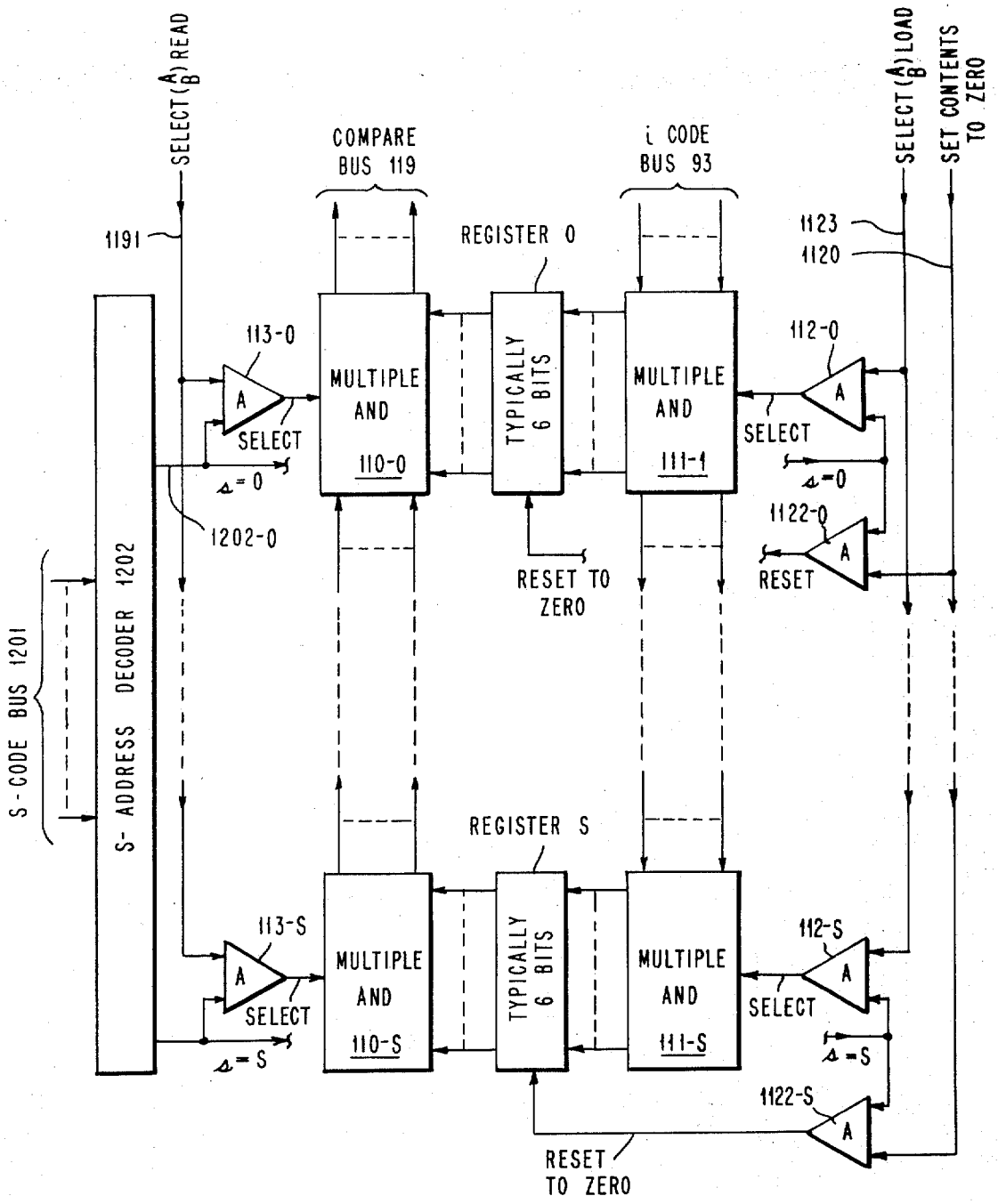
FIG. 11 illustrates a typical logic that is to be used in location address tables.
Figure 12:
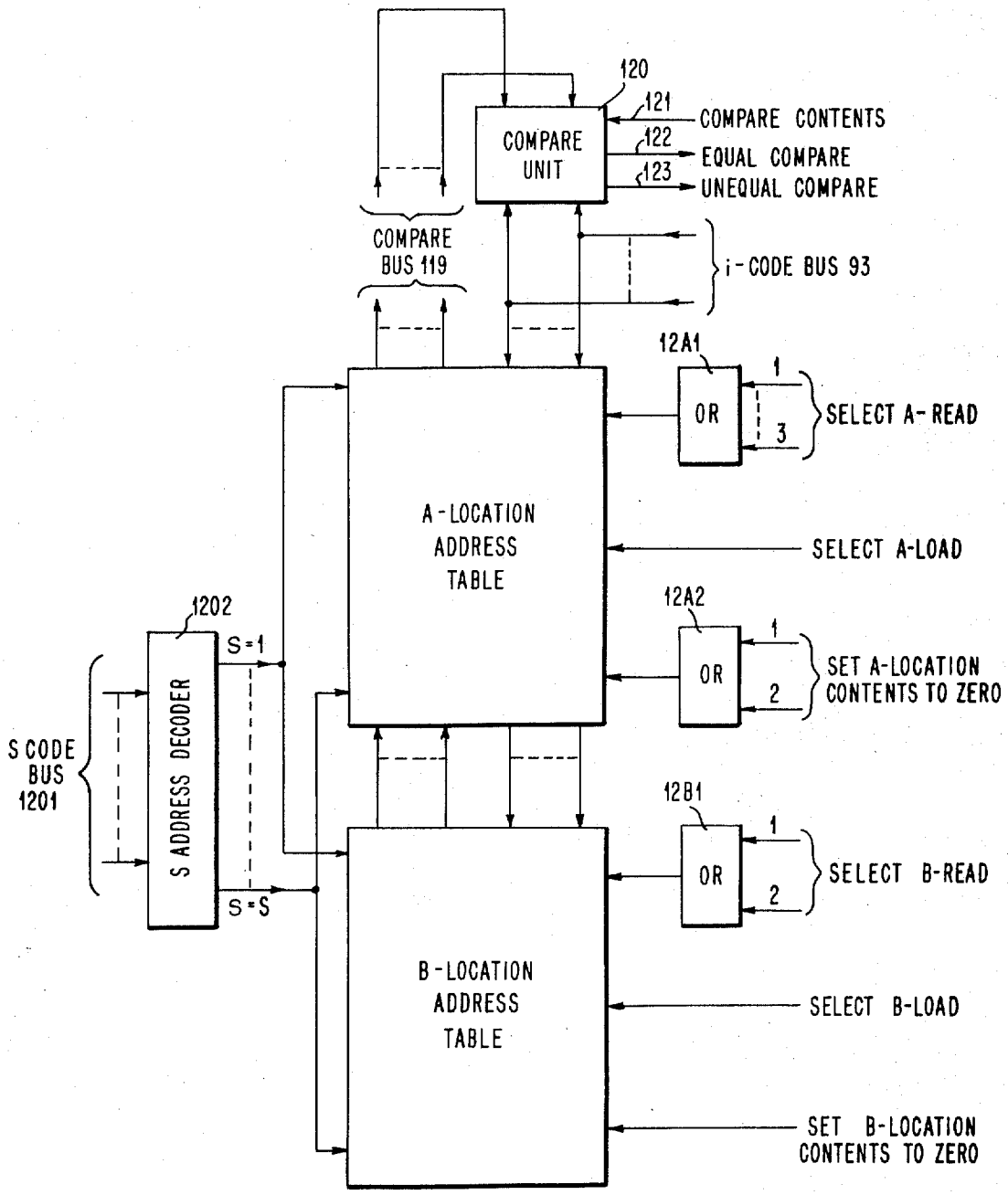
FIG. 12 shows the A and B location address tables and associated components.

The computing element also contains two tables known as the A-location address table and the B-location address table, FIGS. 11 and 12. The A-location address table contains a number of individual registers equal to the number of physical storage locations for parts in the A-random access storage unit. Similarly, the B-location address table contains a number of individual registers equal to the number of storage locations for parts in the B-random access storage unit. FIG. 12 illustrates schematically the interconnections of the A- and B-location address tables with other elements of the Computing element 4. The "s-code" bus 1201 carries an encoded number identifying a storage location for an individual part in the storage units 7 and 23. The s-code is decoded by s-address decoder 1202, with the result that an individual one of output lines sl through sS is energized. S represents the maximum number of physical part locations in the larger one of the A and B storage units. A- and B-location address tables employ structures as illustrated in FIG. 11.

Referring to FIG. 11, the location address tables comprise registers O through S, each register typically comprising 6 binary bit stages. The contents of any one of registers O through S, as selected by the output decoder 1202, can be set to zero by a signal on the lines labeled "reset to zero." Registers O through S can be loaded with a coded number carried by the "i-code" bus 93 when gating line 1123 is energized. Multiple AND-networks 111–O through 111–S direct the information carried by the i-code bus 93 to registers O through S. The contents of registers O through S are read out on compare bus 119 when select-read line 1191 is energized. The read-out signal on line 1191 is gated through AND-gates 113–1 through 113–S to multiple AND-networks 110–O through 110–S to connect the stages of the register selected by the output of decoder 1202 to compare bus 119.

As an example, if register O of FIG. 11 is to be switched to 0 state, a signal would appear on line 1120 as an input to AND-gate 1122–O. The other input of AND-gate 1122–O would be supplied by the output of decoder 1202 labeled 1202–O.

If the information carried by the i-code bus is to be read into register O, an enabling signal will appear on line 1123 as one of the inputs of AND-gate 112–O. The output of AND-gate 112–O would be the enabling input of multiple AND-network 111–O, thus gating the i-code bus to the register O. If the contents of register O are to be read out, a signal will appear on select read line 1191, enabling AND-gate 113–O. The output of AND-gate 113–O opens multiple AND-network 110–O and the contents of register O appear on compare bus 119.

Compare bus 119 is directed to compare unit 120, FIG. 12, which has as its other information input the "i-code" bus 93. When the compare unit has simultaneous inputs from buses 93 and 119 and from compare-contents line 121, a comparison operation is performed. If the two buses carry the same number, equal compare line 122 is energized. If the information carried by the two buses is not identical unequal compare line 123 is energized.

Computing element 4 also contains a Constants table which carries so-called "fixed" information. The Constants table is illustrated in some detail in FIG. 13. Each constant is contained in a separate register which has the capacity of three decimal digits, but may actually carry information in codes such as binary, bcd, weighted bcd, etc. No loading inputs to the registers are shown, but it is understood that any of a number of conventional loading networks can be utilized. Individual registers are read out on the constants bus 100, one at a time when one of the inputs 1301 through 1309 is energized. An additional register of the Constants table labeled "m-register" is read out over the output bus 92 rather than over the constants bus 100, and the read-out is caused by a signal on lead 13091 labeled "select m."

Figure 14:
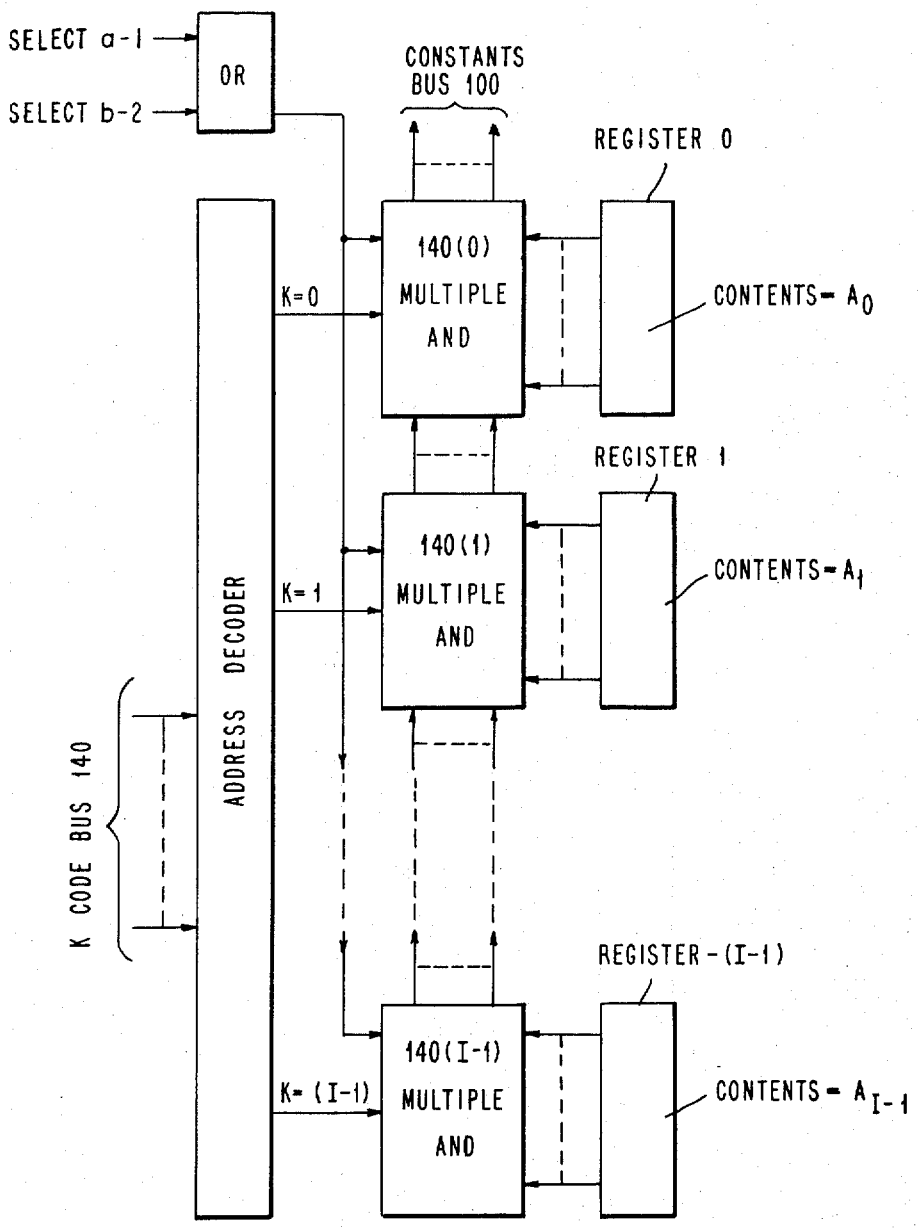
FIG. 14 is a block diagram of the A-table.

Still another table contained in Computing element 4 is the A-table illustrated in FIG. 14. The A-table stores data from a single line of the matrix given in Chart 2, supra. The stored data corresponds to a particular value of $\sigma/\Delta$. By symmetry $A_{+1}$ and $A_{-1}$ are equal, and thus only a single register is provided to share those numbers. The A-table has a total of I registers, each storing a value of $A_K$ given by a column of the matrix Chart 2. Particular registers are selected by the information carried by K-code bus 140, and gated to the constants bus 100 by the use of a series of multiple AND-networks 140(O) through 140(I–1). Again, no loading network is shown—it being understood that the loading of registers O through I–1 is done by conventional methods.

In describing the operation of the structures listed above, the sequence of logical steps by which the contents of a given table are altered will be referred to as a "routine." Each routine is triggered off by an "initiating signal." At the end of a routine, a "completion signal" is produced which in turn may serve as the initiating signal for another routine. A group of routines which are arranged sequentially will be termed a "string." Once the execution of the first routine of a given string is started, the logical control of Computing element 4 is devoted to carrying out the steps of this string until one of several possible signals labelled "terminating signals" and associated with this particular string is generated.

At any given time, the Computing element is either in a mode of operation termed "idle mode," or else it is engaged in executing one of the four strings listed in Chart 3 below:

CHART 3

| Name of 1st routine of string | Priority | Initiating signal | Terminating signal |
|---|---|---|---|
| Classification of B-part | 1 | B-part received (from B-gauge) | Z-table 5th stage completed, or reject B-part. |
| Classification of A-part | 2 | A-part received (from A-gauge) | H-table update completed or reject A-part. |
| Disburse A and B Pair | 3 | Ready for parts (from assembler) | Disburse pair—5th stage completed or no pair available. |
| Compute $F_i$ | 4 | Request Computation of $F_i$ (from A-Manufacturing process control element). | G-table update completed, or sign $F_i$ negative. |

A detailed description of the steps of each routine and of each string will be given later in the specification.

Figures 15, 15A:
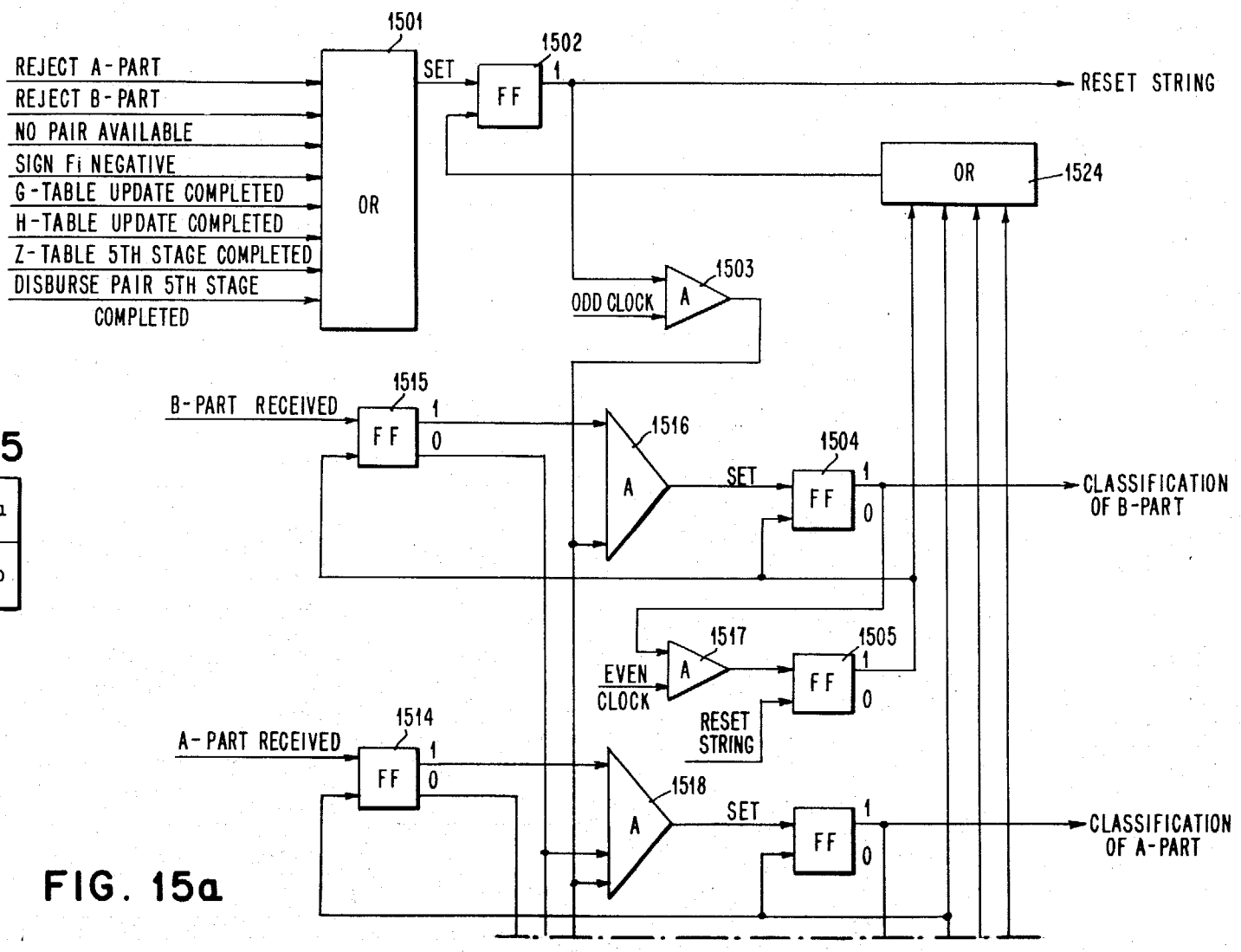
FIG. 15, consisting of FIGS. 15a and 15b, shows in detail the priority logic determining priority of routines.
Figure 15B:
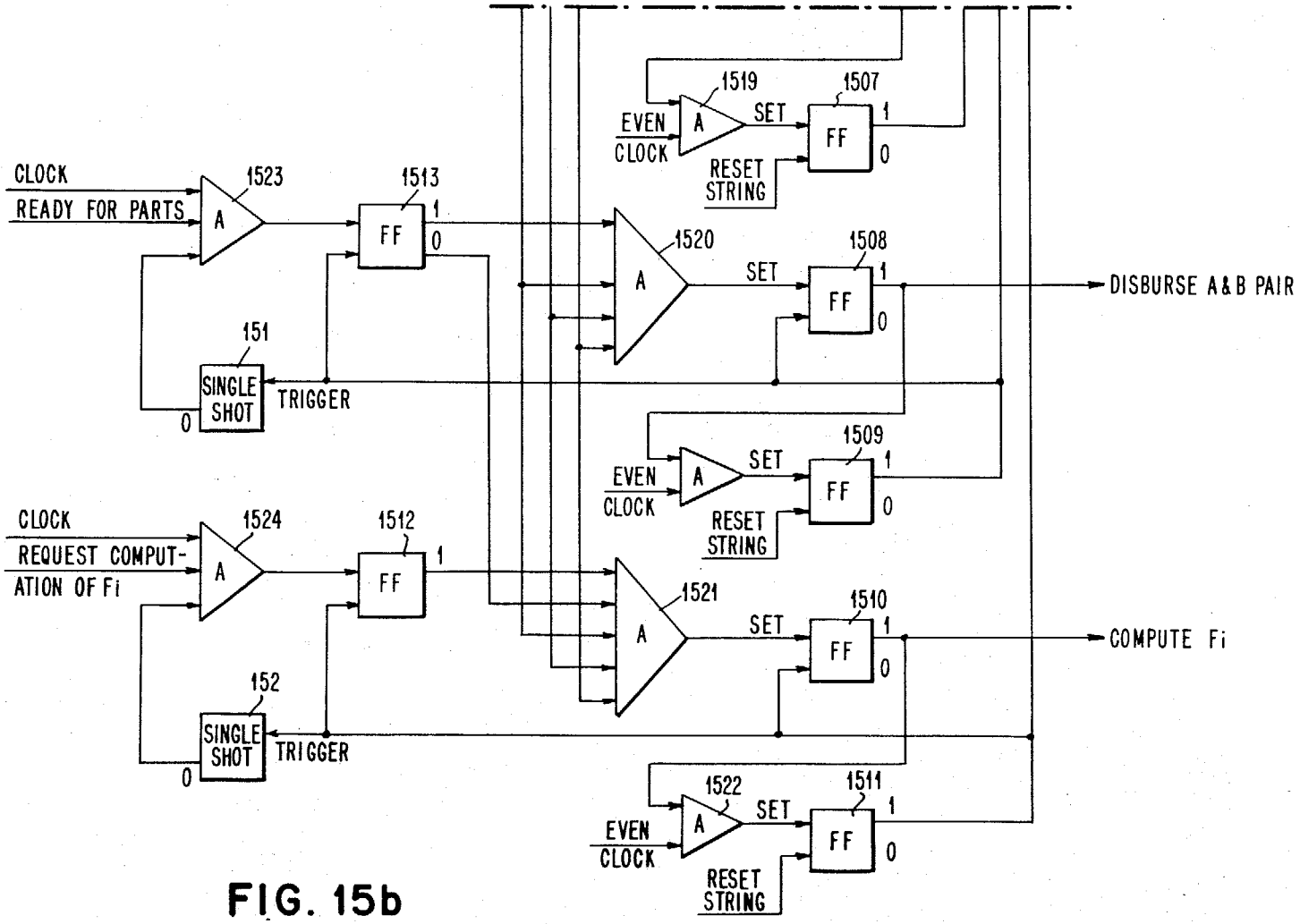

Computing element 4 contains priority logic, illustrated in FIGS. 15a and 15b, which records the arrival of each initiating signal when the current string being executed is terminated. The priority logic initiates the execution of the highest priority string for which an initiating signal has been received according to the priority assignments for the four strings indicated in Chart 3 supra. Note that the strings with assigned priorities 3 and 4 may result in an unsatisfactory terminating signal. In other words, the execution of the "Disburse A and B pair" string may indicate as a final result that there is no pair of matching A and B parts available, and the "Compute $F_i$" string may result in a signal indicating that the computed figure of merit is negative. The unsatisfactory terminating signals would indicate a request for immediate commencement of another execution of the respective string. In order to permit control to be turned over to higher priority strings while a request is being made for rerun to strings with priorities 3 and 4, single shot [multibrators] *multivibrators* 151 and 152 as shown in FIG. 15 are provided. The multivibrators prevent the opening of AND-gates 1523 and 1524 respectively and thus cause the priority logic to ignore requests for re-runs of the strings with assigned priorities 3 and 4 in favor of strings with priorities 1 and 2.

FIGS. 15a and 15b show the priority logic structure designed to carry out the assigned priorities of Chart 3. The terminating signals listed in Chart 3 appear as inputs to OR-gate network 1501. Assume, as an example, that a B-part has been received at B-gauge. A signal will be initiated at B-gauge and carried by the line labelled "B-part received" to the set input of flip-flop 1515 setting it to its 1 state. When the routine presently being executed is over and a terminating signal appears at OR-gate 1501, the output of the OR-gate sets flip-flop 1502 to its 1 state. The line labelled "reset string" carries the signal from flip-flop 1502 and resets flip-flops 1505, 1507, 1509 and 1511 to their 0 state. The output of flip-flop 1502, as gated through AND-gate 1503 by the next odd clock pulse, appears as one of the inputs of AND-gate 1516. The output of gate 1516 sets flip-flop 1504 to its 1 state, thus ordering the initiation of a "Classification of B-part" routine.

Assume now that there is no "B-part received" signal present at the set input of flip-flop 1515, but that an A-part has been received at A-gauge. Now flip-flop 1514 is set to its 1 state, thus enabling AND-gate 1518 and resulting in a signal on the line labelled "Classification of A-part," thus initiating a routine classifying the received A-part.

Next in priority is the gating network for the initiating signal of the routines for disbursing A- and B-parts. AND-gate 1520 can be enabled only when there are no inputs to the set lines of flip-flops 1515 and 1514.

AND-gate 1521 in turn cannot be enabled when there is a 1 output from any one of flip-flops 1515, 1514 or 1513.

Single shot multivibrators 152 and 151 provide 0 outputs, thus disabling respectively AND-gates 1524 and 1523 for short intervals following the initiation of the "Compute $F_i$" and "disburse A and B pair" signals respectively.

(4) Summary of operational routines and table of routines.—Computing element 4 of FIG. 1 is, at any given time, either in the idle mode, or engaged in performing one of the previously listed four strings of routines. The four strings comprise a total of 16 routines. The 16 routines are described in detail under headings 5 through 16 below. Since there are four pairs of routines which are essentially similar, each of these pairs is described under a single heading. A summary of the function of each routine, with reference to FIG. 1, will be given under this heading.

During the routine for classification of A-parts, the A-gauge 3 signals the computing element 4 that an A-part has been received from the A-manufacturing apparatus 1 over conveyor 2. The A-gauge also supplies the Computing element 4 with information disclosing the measured dimension of the A-part. Computing element 4 compares the measured dimension as supplied by A-gauge 3 with a list of dimensions stored in its memory and as a result of the comparison classifies the A-part in a particular subclass. If the A-part that has just been measured by the [A-guage] *A-gauge* 3 falls outside the acceptance band for A-parts, Computing element 4 signals the A-diverter 5 to reject the part and to send it to the bin for rejected A-parts 6. If the Computing element 4 has found that the A-part is within the acceptance band, the A-part is classified within a particular subclass and the classification information is supplied by the Computing element 4 to the A-random access storage unit 7. The routine for classifying A-parts is completed when one of the following two alternate events occurs: Computing element 4 has classified the A-part in a particular subclass and has sent the classification information to the A-random access storage unit 7, or, Computing element 4 has signaled A-diverter 5 to direct the A-part to the bin for rejected A-parts 6.

After the routine is over, the A-part will be sent from the A-diverter 5 to the bin for rejected A-parts 6, if Computing element 4 has so ordered. If the A-part was classified in a subclass within the acceptance band, then the A-random access storage unit 7 will store the part received from the A-diverter in a particular storage location as identified by the information supplied by Computing element 4.

The routine for classifying B-parts follows along similar lines, except that information is supplied to Computing element 4 from the B-gauge 20, and information is sent from Computing element 4 to the B-random access storage unit 23 and to the B-diverter 21.

For each of the physical storage locations in the A-random access storage unit, there is a register in the A-location address table. When the physical storage location is empty, its corresponding register contains 0's. When there is an A-part in the physical location, then its corresponding register in the A-location address table contains a number representing its subclass, the number being termed "i-code" of the part.

Thus, when an A-part has been classified and is about to be stored in the A-random access storage unit, a routine called "locate vacancy in A-location address table" is carried out. In essence, the registers of the A-location address table are examined in sequence and the A-part that has been classified is directed to the storage location of the A-random access storage unit that corresponds to the first register of the A-location address table that was found to contain all 0's.

When a vacant location is found by the above procedure, the system goes through another routine called "update A-location table," the purpose of which is to store, in the register found to be vacant (that is, to contain all zeros) the "i-code" of the A-part that is to be transferred to the corresponding physical location of the A-random access storage unit.

There are two similar routines for updating the B-[location] *location* address table.

For each subclass i of A-parts, there is a register in the X-table which stores the number of A-parts of that subclass that are available at the present time in the A-random access storage unit. Each time an A-part is added to the A-random access storage unit, the register of the X-table that corresponds to its subclass must be incremented. The incrementation is done according to a routine called "update X-table."

Similar considerations are applicable to the Y-table. The appropriate routine is called "update Y-table."

For each subclass i of B-parts there is a register in the P-table storing a number that expresses the probability of the next B-part arriving at B-gauge being in that subclass i. Each time a B-part passes through B-gauge and is classified in a subclass i, the probability associated with that subclass changes. The change in the contents of the affected register of the P-table is accomplished through a routine termed "update P-table."

For each subclass i of A-parts, there is also a register in the Z-table which defines an estimate of the number of A-parts which have been ordered and which are expected to fall into the ith subclass when manufactured. With each change of the register for the same ith subclass of the P-table discussed above, the Z-table register corresponding to the same subclass must also be changed. The change is accomplished according to a routine named "update Z-table."

When the A-manufacturing apparatus control element 25 is about to order a new batch of A-parts, it requests from Computing element 4 an indication of the next desirable subclass i. Computing element 4 calculates a figure of merit indicating whether a particular subclass is a desirable one. A computation is carried out according to a routine named "compute $F_i$" which carries out the computation of the quantity defined by Equation e–1 above.

For each subclass i, there is also a register in the G-table which stores the number of A-parts which are expected to reach the A-gauge as a result of commands delivered to the A-manufacturing apparatus since the most recent completion of the "update Z-table" routine. With each issuance of a new command to the A-manufacturing apparatus for a particular subclass, the register in the G-table corresponding to this subclass is updated according to a routine named "update G-table."

For each subclass i, there is also a register in the H-table which indicates the number of A-parts of that subclass which have passed through the A-gauge since the most recent completion of the "update Z-table" routine. The H-table is also updated with each passing of an A-part through A-gauge, according to a routine named "update H-table."

When Assembler 24 indicates to Computing element 4 [the] *that* it is ready to receive a pair of parts, a routine called "disburse A and B pair" is put into operation. During that routine computing element 4 determines if there is a matching pair of parts in the A and B random access storage units and if so, directs the storage units to send the parts to Assembler 24.

When the A Random Access storage unit is filled to capacity, the least desirable subclass of A-parts must be found, and an A-part from that subclass directed to the surplus A-parts storage 9. This is carried out according to a routine called "locate surplus A-subclass."

The actual transportation of the surplus A-part, as determined by the preceding routine is carried out according to another routine called "disburse surplus A-parts."

The above routines are described in detail under headings 5–16 below. Chart 3d, which follows directly, lists the names of the routines as well as the initiating and completion signals for each routine and each stage of the routines.

CHART 3a

| Name of Routine | Initiating Signal | Completion Signal |
|---|---|---|
| Classification of B-part | B-part received | B classification completed, or reject B-part. |
| Locate vacancy in B-location, address table | B classification completed | B vacant location found, or reject B-part. |
| Update B-location, address table | B-vacant location found | B-table update completed. |
| Add to the Y-table | B-table update completed | Y-table update completed. |
| Update the P-table: | | |
| First stage | Y-table update completed | P-table 1st stage completed. |
| Second stage | P-table 1st stage completed | P-table 2d stage completed. |
| Update the Z-table; | | |
| First stage | P-table 2d stage completed | Z-table 1st stage completed. |
| Second stage | Z-table 1st stage completed | Z-table 2d stage completed. |
| Third stage | Z-table 2d stage completed | Z-table 3d stage completed. |
| Fourth stage | Z-table 3d stage completed | Z-table 4th stage completed. |
| Fifth stage | Z-table 4th stage completed | Z-table 5th stage completed. |
| Compute $F_i$ | Request computation of $F_i$ and (no higher priority request). | Sign $F_i$ positive or sign $F_i$ negative. |

CHART 3a—Continued

| Name of Routine | Initiating Signal | Completion Signal |
|---|---|---|
| Update G-table | Sign $F_i$ positive | G-table update completed. |
| Classification of A-part | A-part received and (no higher priority request). | A classification completed or reject A-part. |
| Locate vacancy in A-location, address table | A classification completed | A-vacant location found or no A vacancy. |
| Locate surplus A subclass | No A vacancy | Surplus subclass found. |
| Disburse surplus A-part: | | |
| First stage | Surplus subclass found | Disburse surplus—1st state completed. |
| Second stage | Disburse surplus—1st stage completed. | A-vacant location found. |
| Update A-location, address table | A-vacant location found | A-table update completed. |
| Add to the X-table | A-table update completed | X-table update completed. |
| Update the H-table | X-table update completed | H-table update completed. |
| Disburse A and B pair: | | |
| First stage | Ready for parts and (no higher priority request). | Disburse pair—1st stage completed or no pair available. |
| Second stage | Disburse pair—1st stage completed. | Disburse pair—2d stage completed. |
| Third stage | Disburse pair—2d stage completed. | Disburse pair—3d stage completed. |
| Fourth stage | Disburse pair—3d stage completed. | Disburse pair—4th stage completed. |
| Fifth stage | Disburse pair—4th stage completed. | Disburse pair—5th stage completed. |

(5) Classification of A-parts.—The routines for classification of A-parts and for classification of B-parts are so similar that it is considered expedient to describe only the logic for classification of A-parts.

Figure 16:
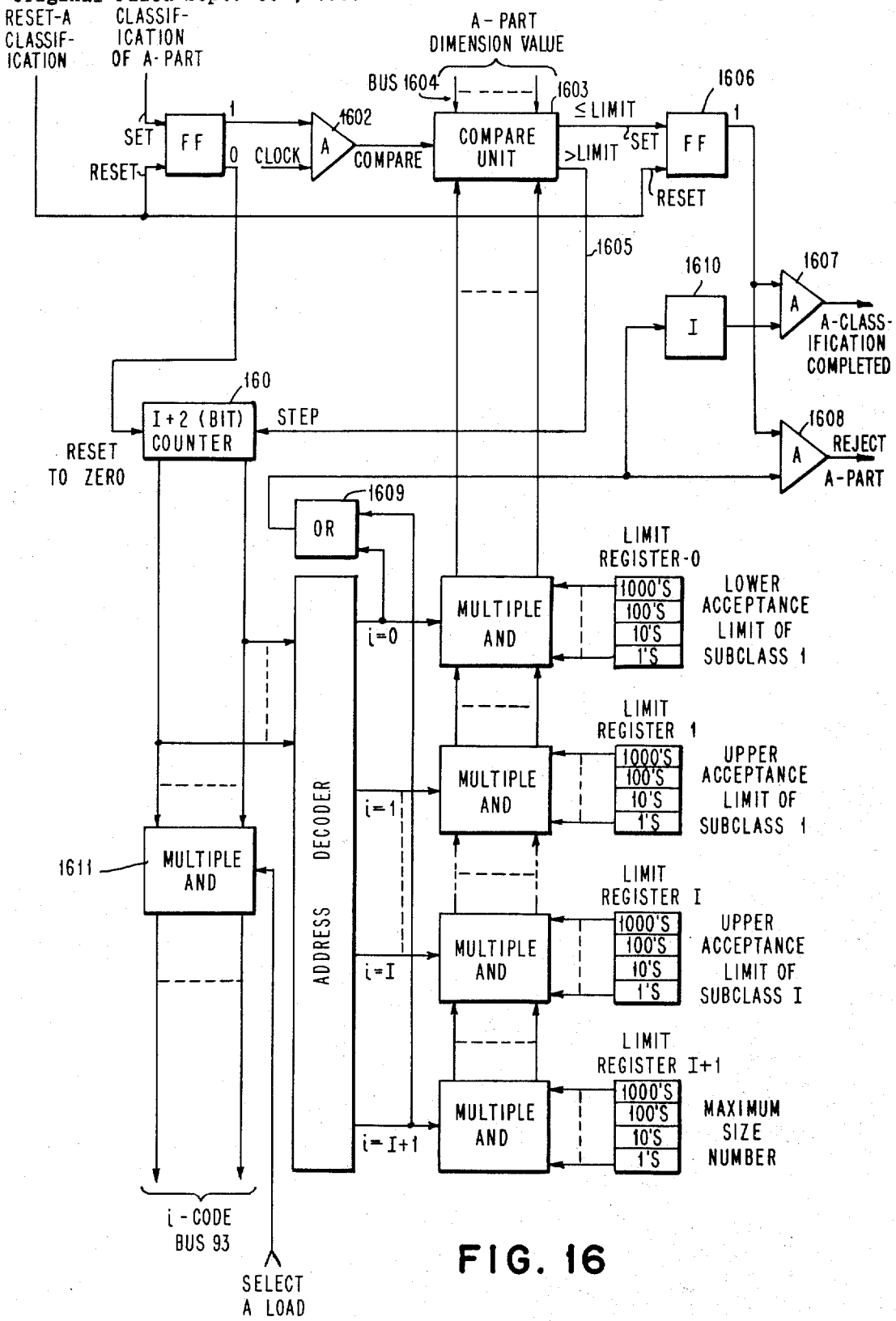
FIG. 16 is a logic diagram of structure for classifying A-parts.

The apparatus for carrying out the routine is illustrated in FIG. 16.

The routine is initiated by the appearance of a "classification of A-part" signal supplied by the Priority logic of FIG. 15 and indicating that an A-part which is to be measured has been received. The Classification logic structure of FIG. 16 compares the measurement data as received from the A-gauge against a set of stored limit values and then either classifies the part as belonging to the reject category or else it classifies it as belonging to a particular one of the I acceptable subclasses "i." Referring now to FIG. 16, the Counter 160 labelled "I plus 2 counter" can assume any one of the states between zero and I+1. When a "classification of A-part" signal is received from the Priority logic of FIG. 15 discussed previously, flip-flop 1601 is set to its "one" state. The next clock pulse then enables AND-gate 1602 and a signal is applied over the lead labelled "compare" to the Compare unit 1603. One of the data inputs to Compare unit 1603 is the A-part dimension value bus 1604 coming from the A-gauge 3 and carrying information as to the size of the measured dimension of the A-part. The other data input to Compare unit 1603 comes from one of Limit registers O through (I+1). Limit registers O through I+1, which are here illustrated as storing a four digit decimal number, may actually store the decimal number equivalent in another code. The information stored in the limit registers defines the boundaries of the subclasses. As an example, with reference to FIGS. 2 and 16, Limit register O may store the lower boundary of subclass 11, D+0.002″, and Limit register 1 may store the upper boundary of the same subclass. As long as the dimension of the A-part supplied over bus 1604 to compare unit 1603 exceeds the value stored in the Limit register being connected to Compare unit 1603 at the time, output 1605 of the Compare unit is energized, and the I+2 Counter 160 is set to its next state. When a Limit register is reached which has contents exceeding the dimension supplied over bus 1604, then the advance of the I+2 Counter is halted and flip-flop 1606 is set to its 1 state. Its "one" output then appears as one of the inputs of AND-gates 1607 and 1608. The other input of AND-gates 1607 and 1608 originates from the address decoder. If the signal setting flip-flop 1606 to its 1 state has resulted from a comparison involving limit registers O or (I+1), then the A-part that has just been measured by A-gauge must be outside the acceptable band. When either of these two limit registers is selected, the selection signals are also supplied to OR-gate 1609 and the output of gate 1609 is in turn applied directly to AND-gate 1608. Gate 1608 is opened signifying that the A-part is to be rejected as being outside the acceptance band. The signal from OR-gate 1609 is also applied through an inverter 1610 to the input of AND-gate 1607, thus closing gate 1607.

Subsequent to the time the output of AND-gate 1607 is energized, a signal appears on the lead labeled "select-A-load", thus opening multiple AND-network 1611 and applying the contents of the I+2 Counter 160 to "i-code" bus 93 for further use.

If the A-part is classified as belonging to the reject category, in other words, if the I+2 Counter 160 has been halted either in state 0 or in state I+1, then a "reject A-part" signal is sent from AND-gate 1608 to the A-diverter 5. This will cause the particular A-part not to be sent to the A-random access storage unit, but rather to a Bin for rejected A-parts which is illustrated as block 6 in FIG. 1.

On the other hand, if the A-part is classified as falling into one of the subclasses of the acceptance band, then the "Select A-load" signal will gate the A-part subclass information via the "i-code" bus 93 to the Address decoder of FIG. 10.

At this point the "classification of A-part" routine is completed and has resulted in one of the following two completion signals: (a) reject A-part, or (b) A classification completed.

(6) Locate vacancy in B-location address table.—The routine for locating vacancies in the B-location address table is essentially similar to the routine for locating vacancies in the A-location address table. Therefore, only the logic for the B-parts will be described in detail below.

The B-location address table, as shown in FIG. 12, contains a number of registers, such as those of FIG. 11, each register capable of storing a six binary bit number, and each corresponds to one of the physical locations in the B-random access storage unit. Each of the registers either contains a zero, if the physical location in the B-random access storage unit 23 associated with it is empty, or contains the "i-code" of the B-part which is stored in the physical location corresponding to the register.

Figure 18:
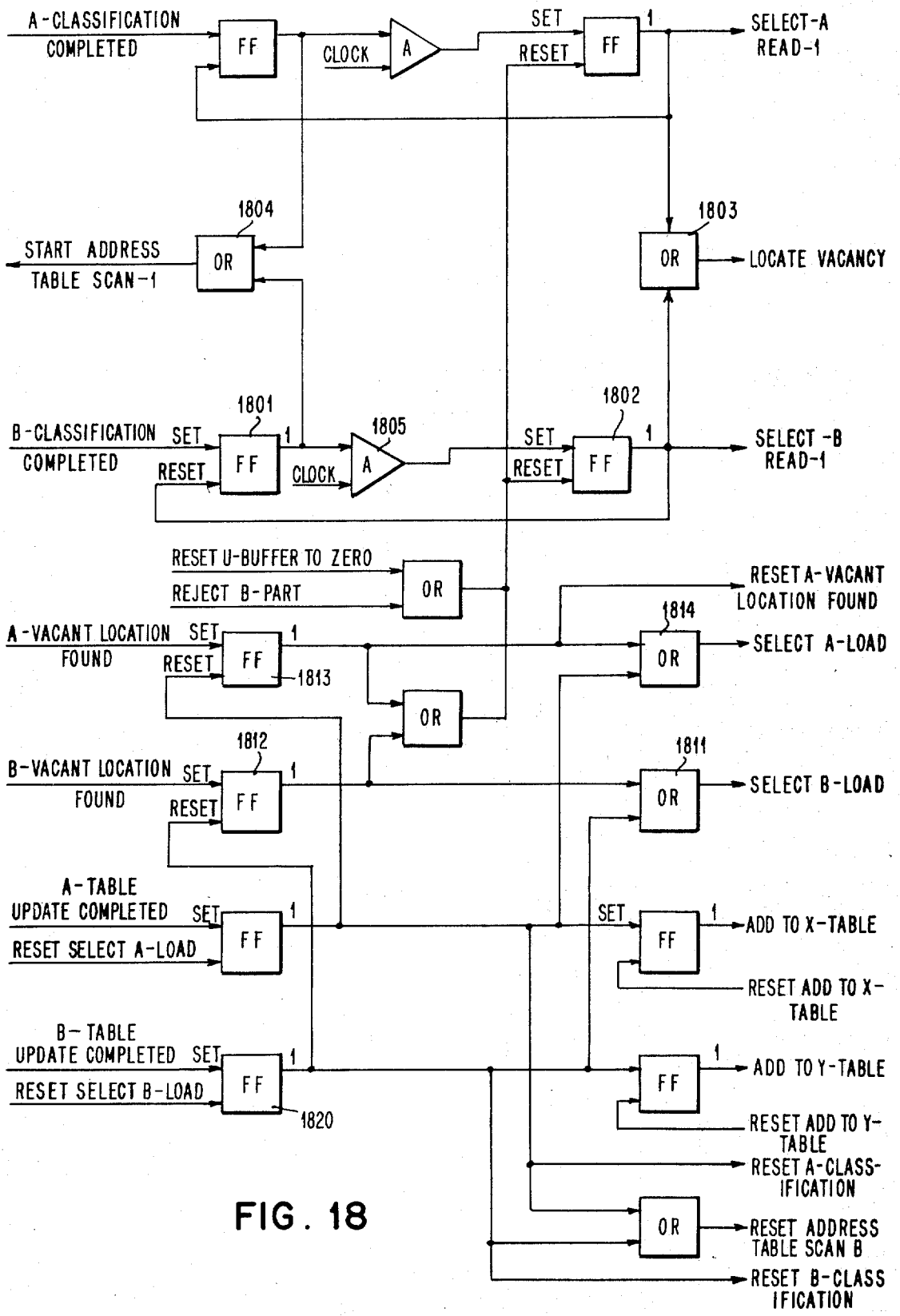
FIG. 18 shows the sequence control logic for finding vacancies in the A-location address table and in the B-location address table.

The routine is initiated by the "B-classification completed" signal. Referring to FIG. 18, which illustrates the sequence control logic for this routine, the appearance of a "B-classification completed" signal at the set input of flip-flop 1801 and the next clock pulse enabling AND-gate 1805, cause flip-flop 1802 to be set to its 1 state, thus producing a "select-B-read-1" signal. The set output of flip-flop 1802 is also applied to OR-gate 1803 thus producing a "locate vacancy" signal on the lead so labelled. The set output of flip-flop 1802 is also used to reset flip-flop 1801, the set output of flip-flop 1801 having already been used to produce, through OR-gate 1804, a "start address table scan-1" signal on the lead so labelled.

Figure 19:
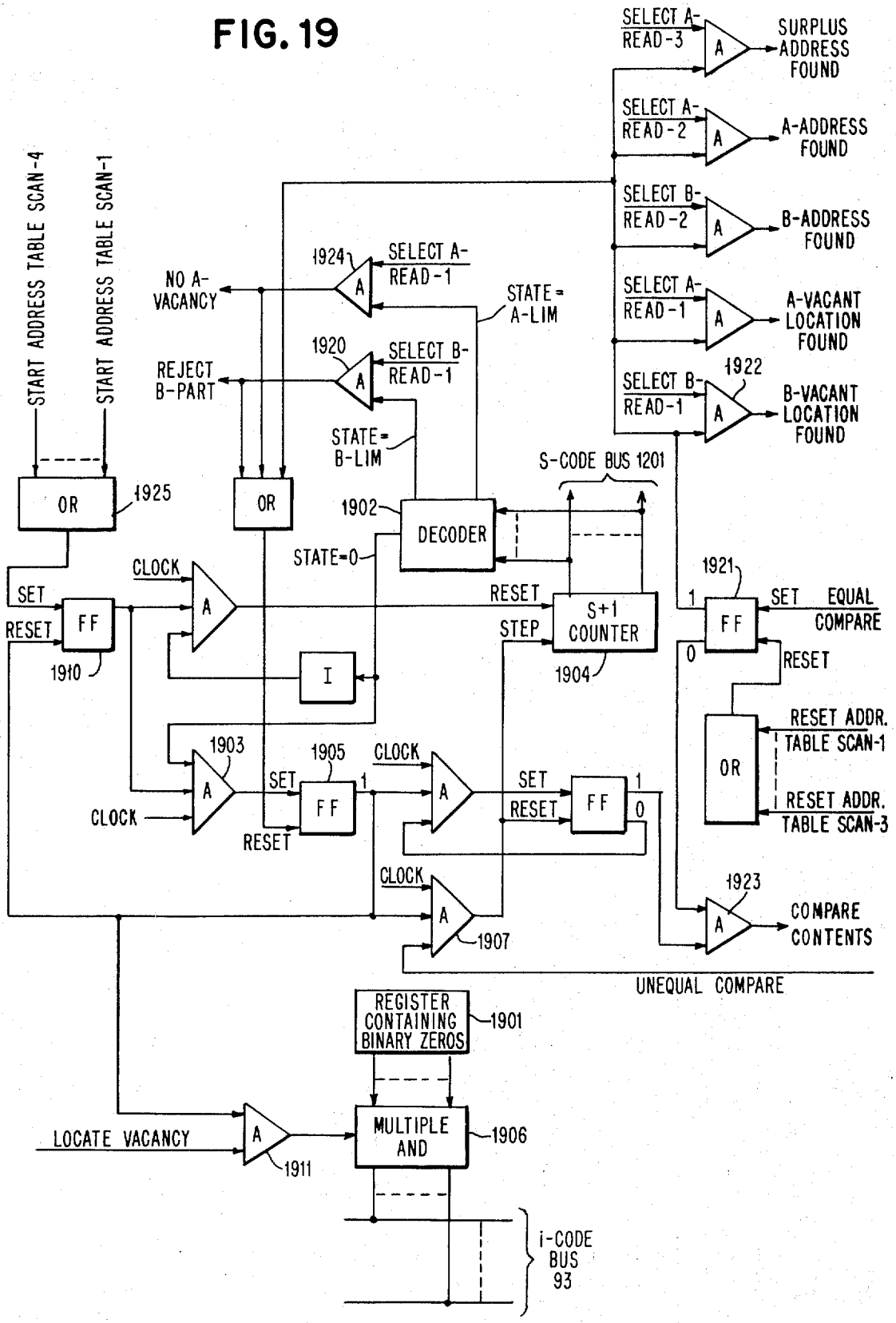
FIG. 19 is a detailed diagram of the logic for scanning the tables addressed by the s-code.

The "start address table scan-1" signal initiates the operation of the structure illustrated in FIG. 19. Referring now to FIG. 19, the S+1 counter 1904 is initially in its 0 state. Since Counter 1904 is in a 0 state, its output signal directed to decoder 1902 results in a zero state output from the decoder. This zero output from the decoder goes through AND-gate 1903, which is enabled by the set output of flip-flop 1904 and a clock pulse, to set flip-flop 1905 to its 1 state and thus to enable AND-gate 1931. The other input to AND-gate 1931 is a lead labelled "locate vacancy." This lead comes from OR-gate 1803 of FIG. 18 and carries a signal at this time. The output of gate 1931 enables multiple AND-network 1906 and thus a set of zero bits appears on "i-code" bus 93 as supplied by register 1901.

At this time the lead of FIG. 12 labelled "select B-read" and going into OR-gate 12B1 is energized and the register of the B-location-address table of FIG. 12 labelled "Register O" (FIG. 11) as selected by the contents of the Counter 1904 of FIG. 19, said contents carried over s-code bus 1201, is read out on compare bus 119 at FIG. 12. Compare unit 120, of FIG. 12, performs the comparison, and if the two quantities are not equal, i.e., if the first register of the B-location-address table does not contain all zeroes, the "unequal compare" lead 123 is energized. This causes a signal to be applied to AND-gate 1907 of FIG. 19 and the output of the AND-gate causes Counter 1904 to be stepped up to its next state. Now the next consecutively numbered register of the B-location-address table is selected by the value over the s-code bus 1201 and its contents are compared against the zero still present on the i-code bus 93.

The process is repeated through the values of the Counter 1904 up to its capacity. If no register of the B-location-address table has been found with contents of zero by the time Counter 1904 has reached the state $B_{limit}$ AND-gate 1920 is energized and a signal appears on the lead of FIG. 19 labelled "Reject B-part." If however a register is found in the B-location address table whose contents are zero, a signal appears on the line of FIG. 12 labelled "equal compare." This signal is applied to flip-flop 1921 of FIG. 19, energizing in turn the output of AND-gate 1922 labelled "B-vacant location found." The same signal resets flip-flop 1905. AND-gate 1923 is turned off, dropping the signal on the line labelled "compare contents."

Note that in the case of the "Locate vacancy in the A-location address table" routine, this signal appears on the lead labelled "No A-vacancy."

The "B-vacant location found" signal sets flip-flop 1812 of FIG. 18. This in turn resets flip-flop 1802, causing the signal on the lines labelled "select B-read-1" and "locate vacancy" to be withdrawn. The setting of flip-flop 1812 also feeds a signal via OR-gate 1811 to cause a signal to appear on the line labelled "select B-load."

At this point the routine is completed.

(7) Update A-location address table.—The rules for updating the A and B location address tables are essentially similar. Therefore, only the routine for A-parts will be described in detail.

The routine is initiated by the appearance of a signal on the lead labelled "A-vacant location found" which results from the execution of the "locate vacancy in the A-location address table" routine in a manner similar to the previously described routine. Referring to FIG. 18; this signal triggers flip-flop 1813 and sets it to its 1 state, thus producing an output at OR-gate 1814. The output of OR-gate 1814 in turn opens multiple AND network 1611 of FIG. 16, thus causing the "i-code" of the classified A-part to appear on "i-code" bus 93.

At this time counter 1904, FIG. 19, is applying the "s-code" of a vacant register in the A-location address table to the s-address decoder 1202 of FIG. 12.

Figure 20:
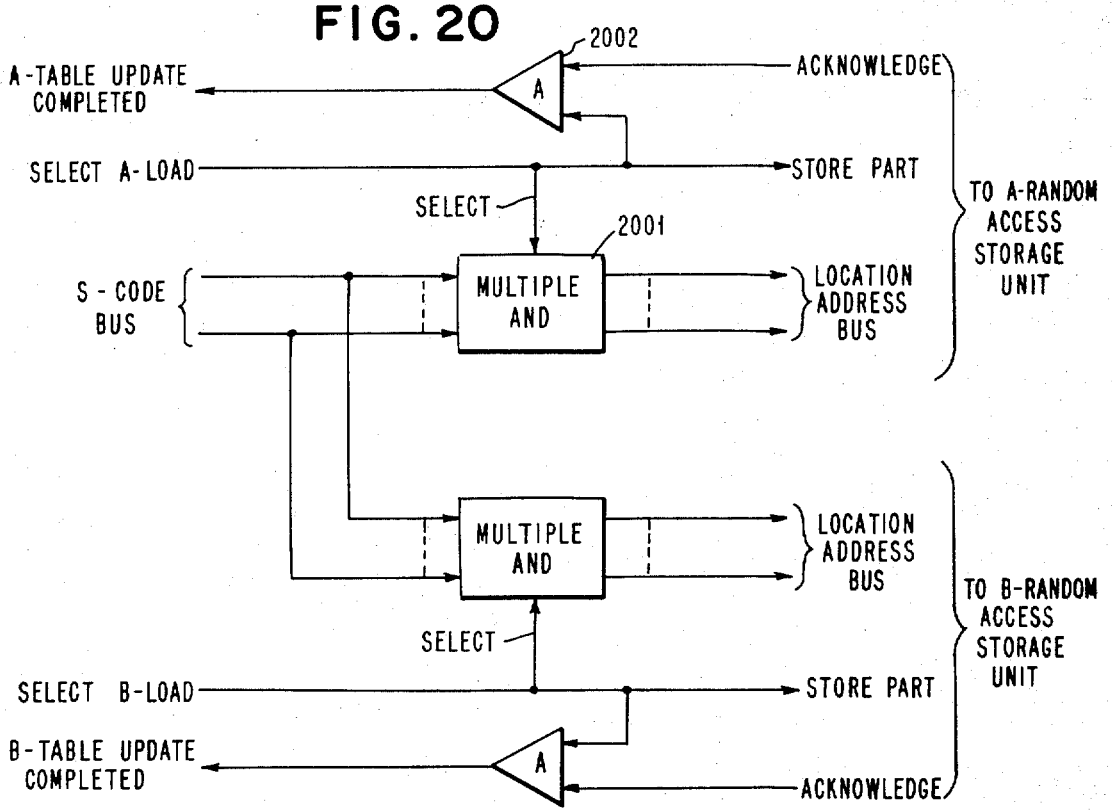
FIG. 20 illustrates the interface between the tables addressed by the s-code and the A and B random access storage units.

The signal on the lead labelled "Select A-load" appears on the lead so labelled in FIG. 11, opens one of the AND-gates 112–O through 112–S and causes the number carried by "i-code" bus 93 to be written into the register of FIG. 11 selected by decoder 1202. The "Select A-load" signal also appears on the lead so labelled in FIG. 20, opens multiple AND network 2001, and thus transfers the information carried by the "s-code" bus to the location address-bus illustrated in FIG. 7. When the A-random access storage unit has processed the information carried by the location address bus, the storage unit replies with a signal on the lead labelled "Acknowledge" and also shown in FIG. 7, as well as in FIG. 20. This opens AND-gate 2002, and thus causes a signal to appear on the lead labelled "A-table update completed." This signal signifies the end of the routine.

Figure 46:
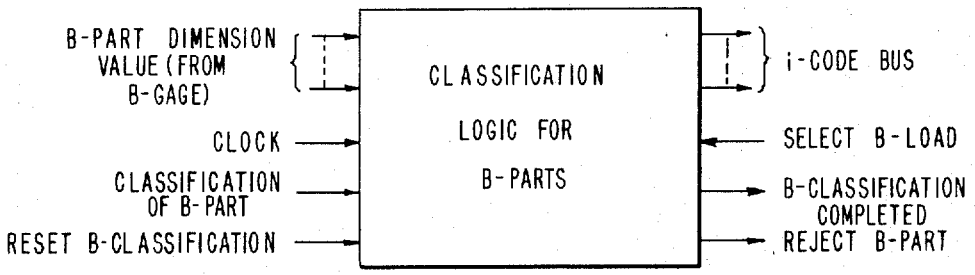
FIG. 46 shows the interconnections of the logic structure for classifying B-parts.
Figure 47:
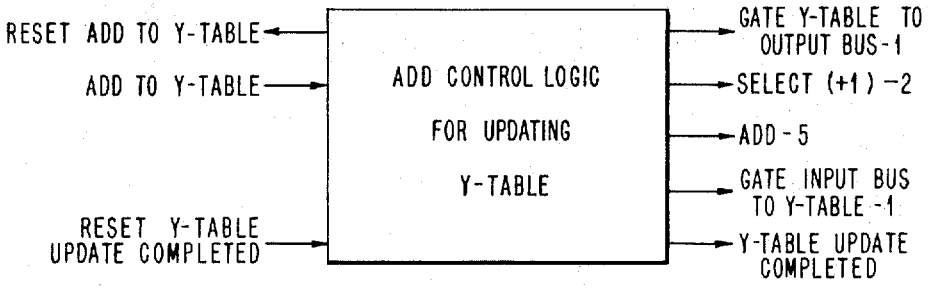
FIG. 47 shows the interconnections of the logic structure for updating the Y-table.

The routine for updating the B-location address table employs a logic structure similar to that shown in FIG. 16, except that the corresponding leads have the labels shown in FIG. 46.

(8) Add to the X-table.—The routines named "Add to the X-table" and "Add to the Y-table" are similar. Therefore, only the routine relating to the X-table will be detailed here.

As listed in Chart 1, X refers to the number of A-parts currently present in the A-random access storage unit. Each register of the X-table stores a value $X_i$, where $X_i$ defines the current number of A-parts of subclass i present in the A-random access storage unit 7.

FIG. 10 shows the connections of the X-table to input bus 91 and output bus 92. The figure also shows that individual registers of the X-table are addressed by i-code bus 93 through decoder 94.

Figure 21:
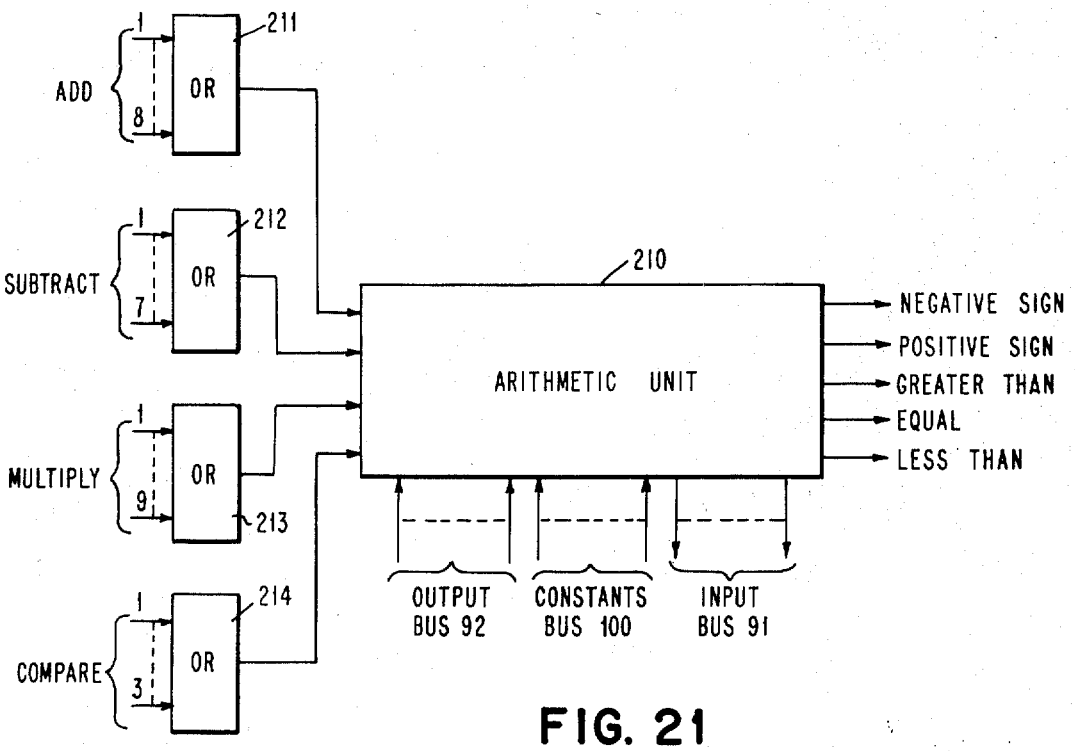
FIG. 21 is a block diagram showing the arithmetic units and its inputs and outputs.

FIG. 21 is a simplified block diagram showing the interconnections of Arithmetic unit 210. Unit 210 receives information over output bus 92 and constants bus 100, processes the information and sends the results out over input bus 91. Arithmetic unit 210 is of conventional design and is controlled by the output of OR-gates 211 through 214.

Figure 13:
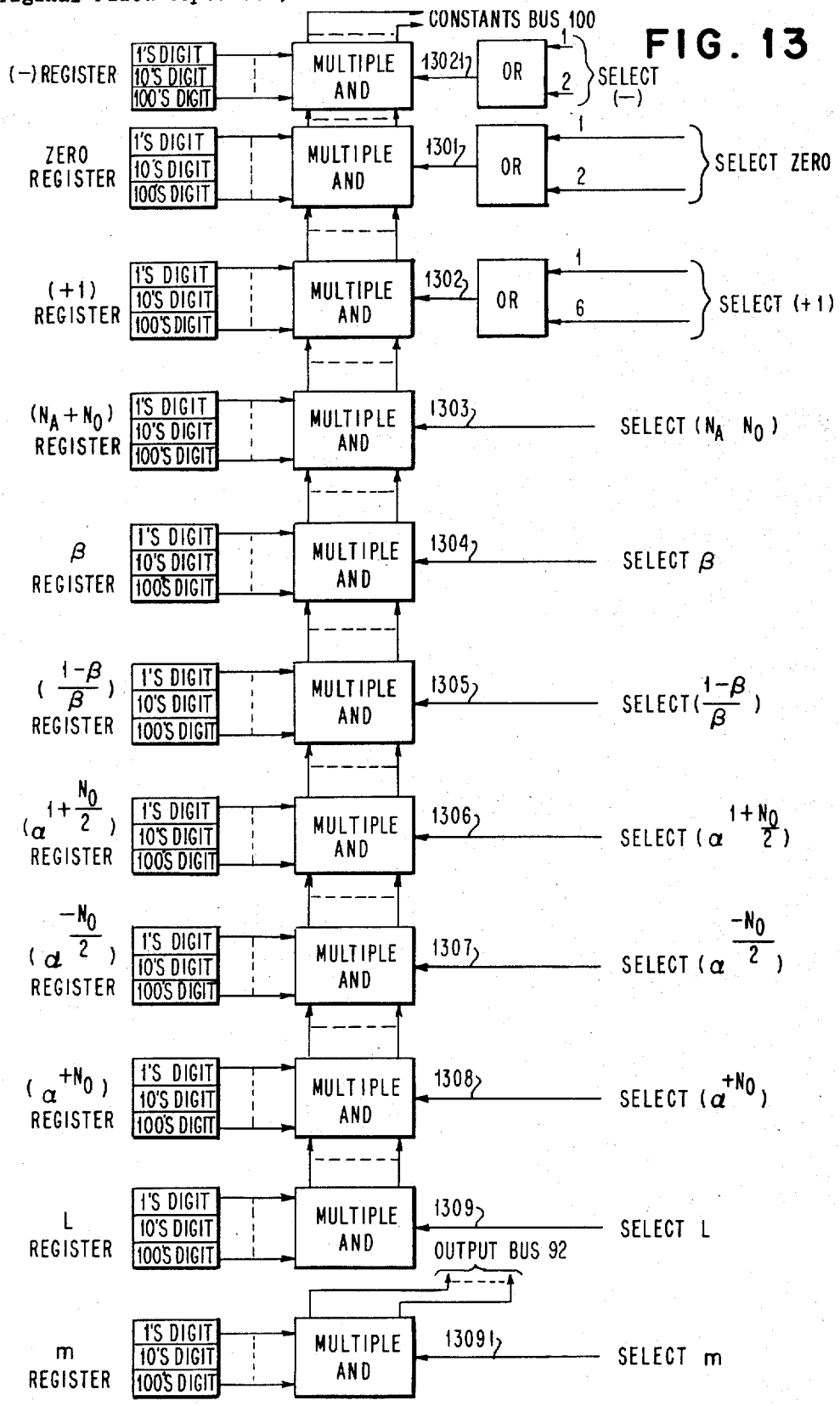
FIG. 13 illustrates the Constants table.

FIG. 13 illustrates the Constants table made up of a group of eleven registers, each containing a different data constant. Ten of the registers are connected to constants bus 100 through multiple AND networks. Their contents are gated out to the constants bus 100 by signals at the leads shown on the right hand side of the registers of FIG. 13 and appropriately labelled. Thus, a signal on the lead labelled "Select (+1)," for example, would cause the number 1 to appear on the constants bus 100. The eleventh register, labelled "m Register" is connected to output bus 92. The registers are read out non-destructively.

Figure 22:
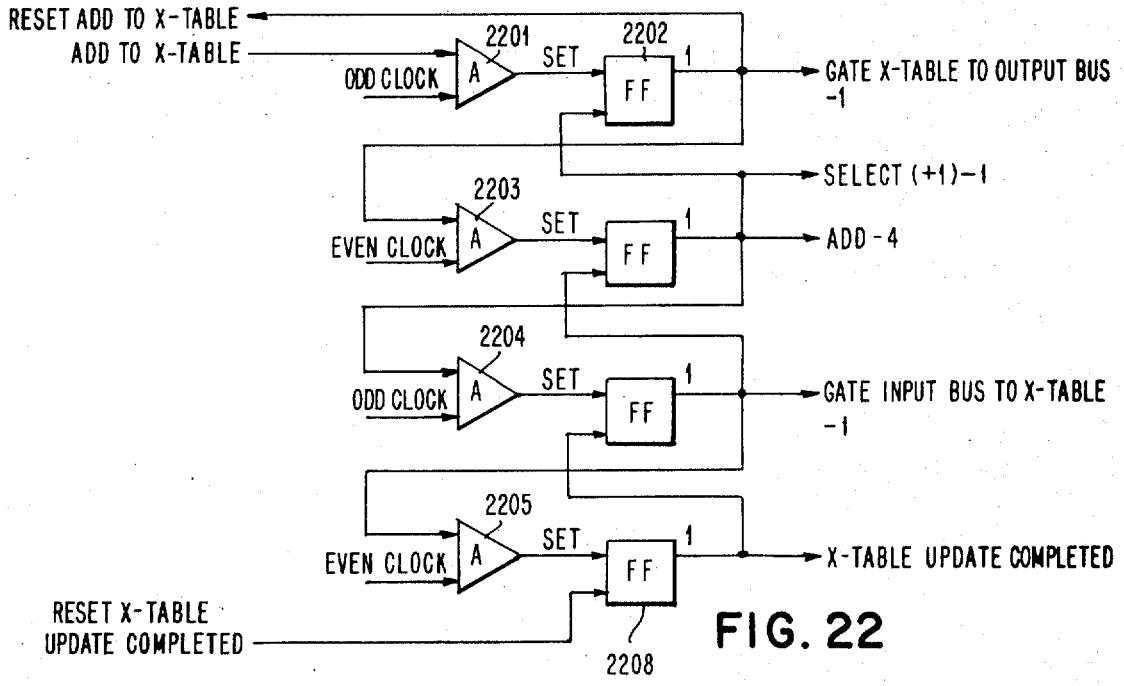
FIG. 22 shows the sequence control logic for incrementing the contents of selected registers of the X-table and Y-table.

FIG. 22 illustrates the logic structure for generating control signals during the execution of this routine. The "Add to X-table" signal causes AND-gate 2201 to open at the odd clock pulse and to set flip-flop 2202 to its 1 state. The 1 state of flip-flop 2202 causes signals to appear on the leads labelled "Gate X-table to output bus −1" and "Reset add to X-table." The information contained in the register of the X-table selected by the value placed on the ["i-code"] "*i-code*" bus 93 as a result of a previous operation is now transmitted to the Accumulator register of Arithmetic unit 210 of FIG. 21 over output bus 92. At the next even clock pulse, AND-gate 2203 is opened and signals appear on the leads of FIG. 22 labelled "Add −4" and "Select (+1) −1." This causes the quantity 1 to be read out of the appropriate register of the Constants table of FIG. 13 and added to the contents of the Accumulator register of Arithmetic unit 210 of FIG. 21. At the next odd clock pulse AND-gate 2204 is opened and a signal appears on the lead labelled "Gate input bus to X-table −1", thus causing the incremented data from the Accumulator register of the Arithmetic unit of FIG. 21 to be transmitted back to the originally selected register of the X-table. Finally, at the next clock pulse, AND-gate 2205 is opened, and a signal appears on the lead labelled "X-table update completed," thus indicating that the routine is over.

Figure 17:
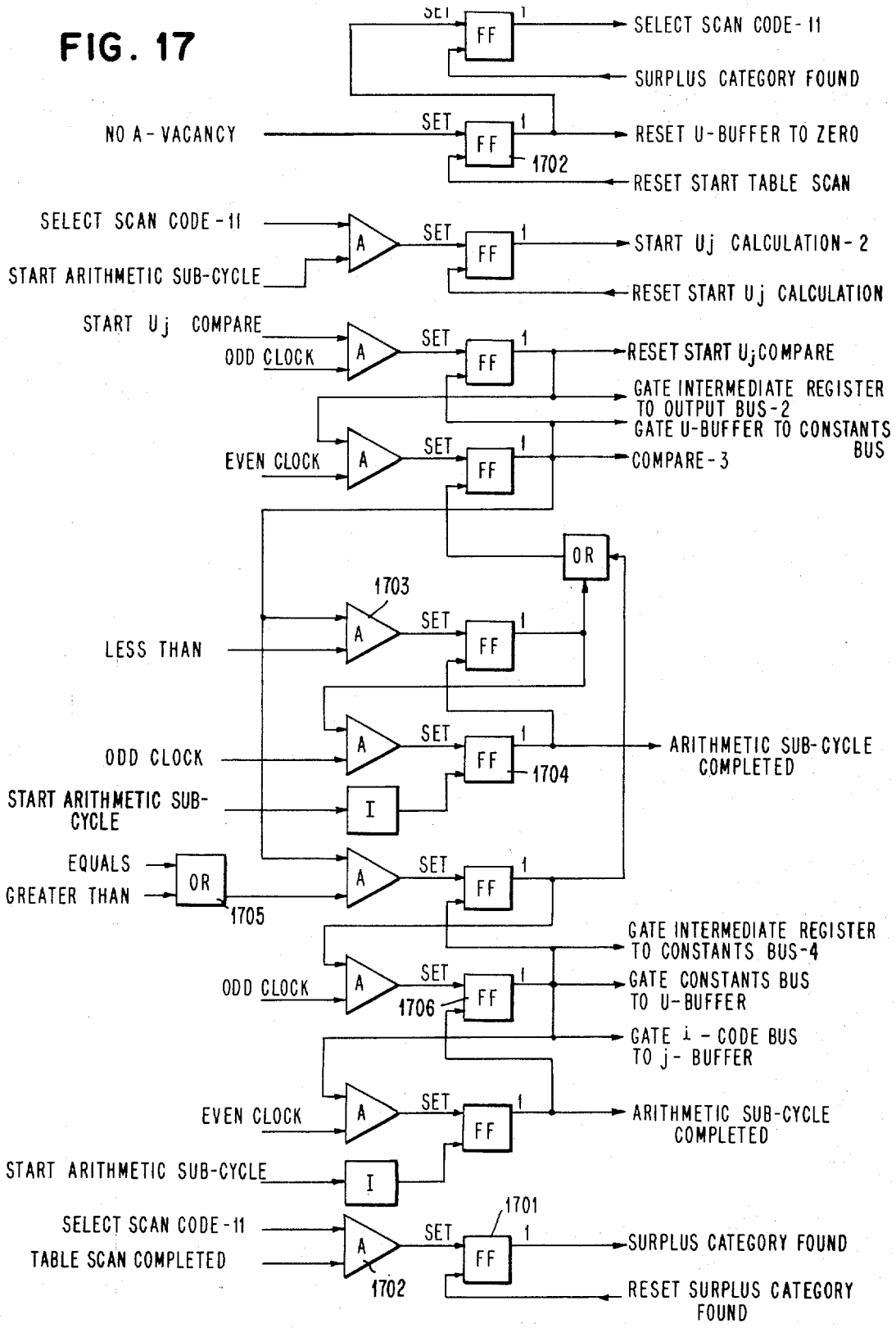
FIG. 17 shows the sequence control logic for finding surplus A-parts.

The routine for "Add to the Y-table" employs a logic structure which is similar to that shown in FIG. 22, except that the corresponding leads are labelled as in FIG. 17.

(9) Update P-table.—As indicated in Chart 1, $P_i$ refers to the probability that the next B-part to arrive at B-gauge will be classified in subclass i. The P-table has a total of I registers each containing the value of P for a subclass i.

The following expression summarizes the updating of the P-table:

$$\text{new } P_i = \beta\left[(\text{old } P_i) + Q_i\left(\frac{1-\beta}{\beta}\right)\right] \qquad \text{(e-20)}$$

$Q_i$ is 1 if the last B-part which passed through B-gauge was classified in subclass i. Otherwise $Q_i$ is 0, $\beta$ is a parameter in the range of 0 to 1 controlling the weight which the above algorithm for updating the P-table gives to the information about the subclass of the most recent B-part that has passed through [B-guage] *B-gauge*. If $\beta$ is chosen such that it approaches 1, a low weighting effect is given to the classification of the last B-part. If $\beta$ is chosen such that it approaches 0, then high weighting effect is given the classification of the most recently measured B-part. In this embodiment of the invention, the value of $\beta$ is initially specified by taking into account the anticipated statistical distribution of B-parts and then the loading values of $\beta$ and of $$\left(\frac{1-\beta}{\beta}\right)$$

into the appropriate constants registers of the structure of FIG. 13. If the B-part distribution is anticipated to undergo rapid drifting, $\beta$ is chosen to be approximately 0.5. If it is anticipated that the B-part distribution would drift relatively slowly, a value of $\beta$ of approximately 0.95 is chosen.

It is contemplated that the present method of providing a fixed value for $\beta$ may be substituted by structure implementing an adaptive control algorithm. The function of the adaptive control would be to attempt an automatic adjustment of the value of $\beta$ so as to achieve an improved degree of tracking between the forecast probability distribution of B-parts and the actual distribution. In the description below, however, $\beta$ is a fixed quantiy.

The updating of the P-table is performed in two stages.

Figure 23:
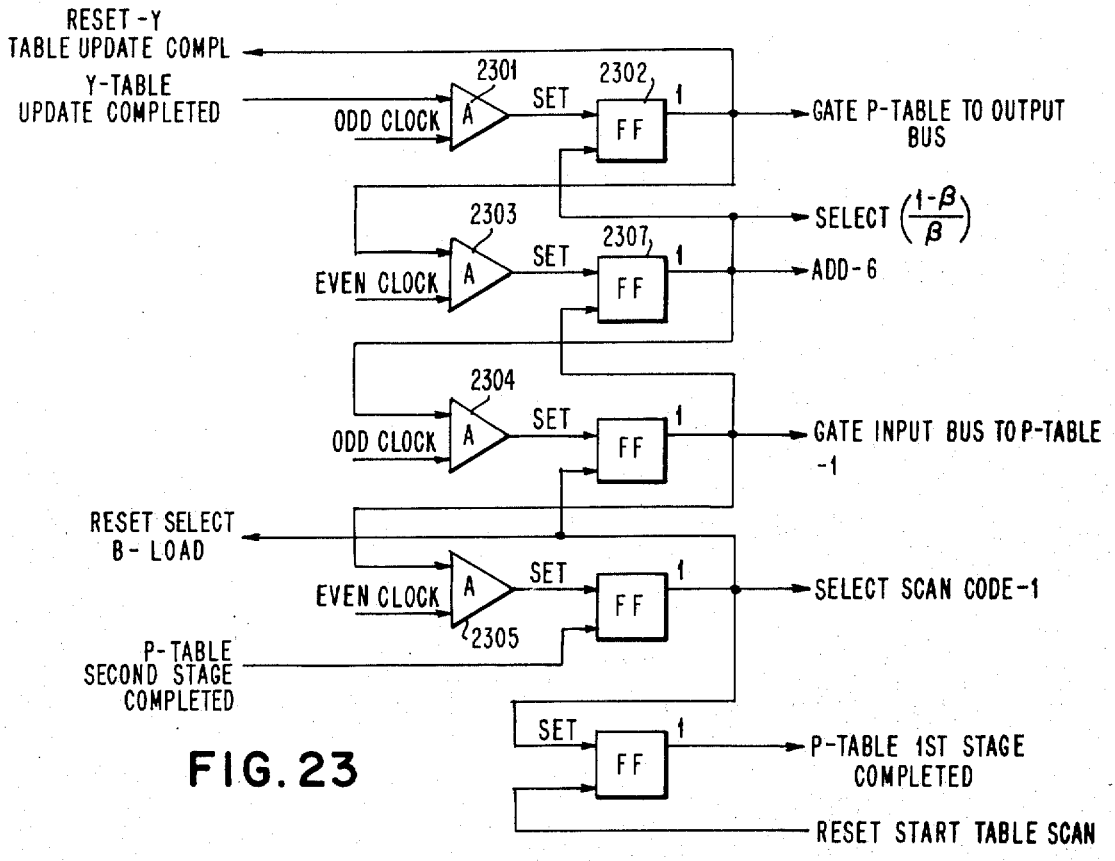
FIG. 23 shows the sequence control logic used in updating the P-table.

The "Update P-table: first stage" operation is initiated by the appearance of a signal on the lead labelled "Y-table update completed," FIG. 23. This signal results from the execution of the "Update the Y-table," similar to the routine for updating the X-table which was described previously. This signal causes AND-gate 2301 to open at the next odd clock pulse and flip-flop 2302 to be set. At this time a signal appears on the lines labelled "Gate P-table to output bus −1" and "Reset Y-table completed." The same "B-table update completed" signal is also applied to flip-flop 1820 of FIG. 18, and causes energization of the output of OR-gate 1811 labelled "Select B load." This output is a signal which, when applied to the multiple-AND network 1611 of FIG. 16, causes the "i-code" bus 93 to carry the "i-code" of the classified B-part, said code being the contents of Counter 160. The signal on the line labelled "Gate P-table to output bus," when applied to OR-gate 10P1 of FIG. 10, causes the contents of the selected register of the P-table illustrated in FIG. 10 to be transferred to output bus 92 and thus to the Accumulator of Arithmetic unit 210 of FIG. 21.

The signal on the lead labelled "Select $$\left(\frac{1-\beta}{\beta}\right)"$$

of FIG. 23 causes the predetermined value stored in the appropriate constants register of FIG. 13 to appear on the constants bus 100. As controlled by the even clock pulse opening AND-gate 2303, a signal also appears on the lead labelled "Add −6" causing the Arithmetic unit 210 to add the value $$\left(\frac{1-\beta}{\beta}\right)$$

to the contents of the Accumulator. The Arithmetic unit applies the result to input bus 91.

At the next odd clock pulse, as controlled by AND-gate 2304 of FIG. 23, a signal appears on the lead labelled "Gate input bus to P-table −1" and is applied to OR-gate 10P2 of FIG. 10 causing a transfer of the data contained in the Accumulator of Arithmetic unit 210 back into the originally selected register of the P-table over input bus 91. The next even clock pulse opens AND-gate 2305 of FIG. 23 and causes signals to appear on the leads labelled "Select scan code −1" and "P-table first stage completed." At this time the first of the two operations making up the "Update P-table" routine is completed.

Figure 24:
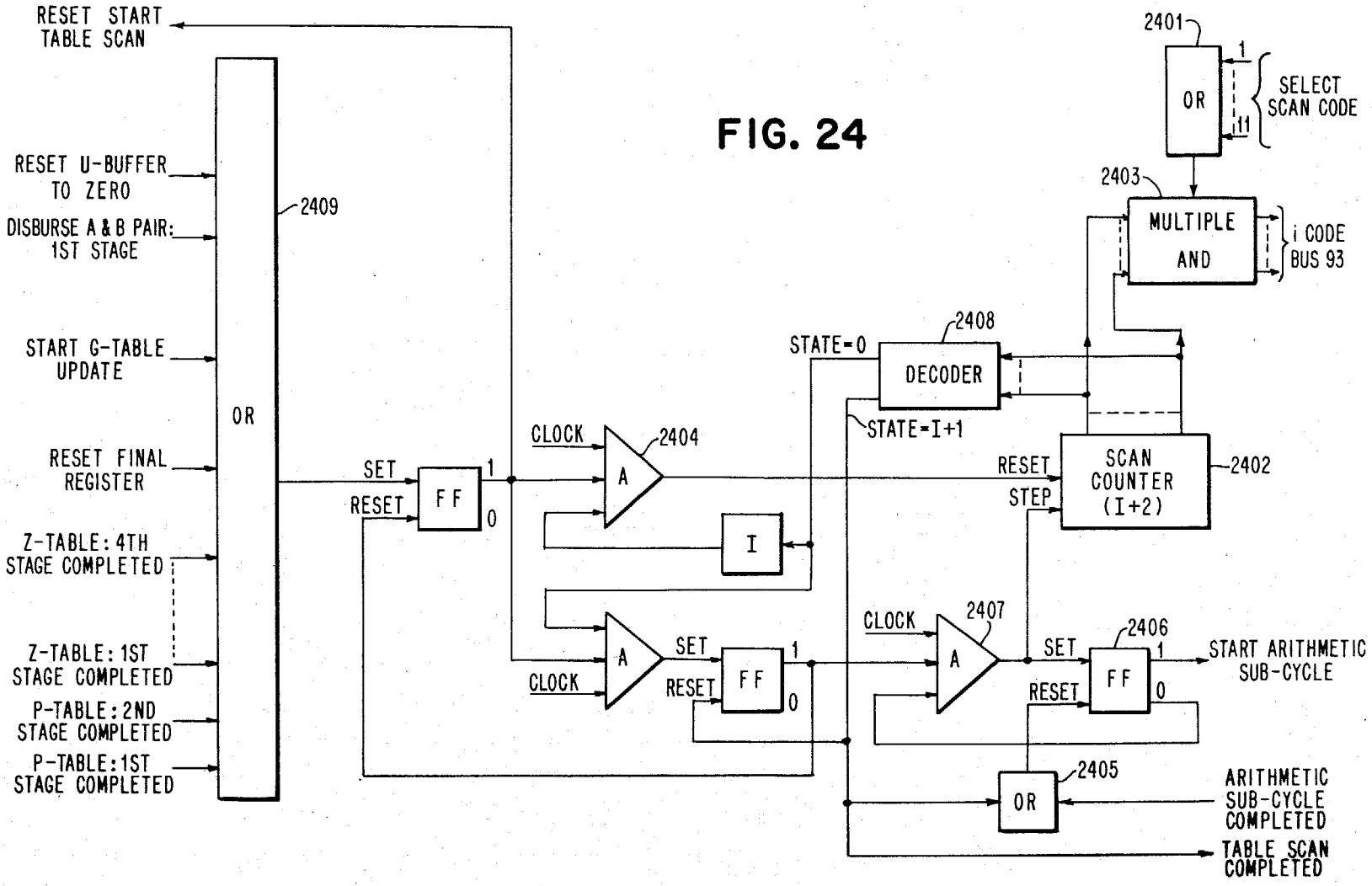
FIG. 24 illustrates the table scan logic for the tables addressed by the i-code.

The "Update P-table: second stage" operation is initiated by the signal on the line of FIG. 23 labelled "P-table first stage completed." The line of FIG. 23 labelled "Select scan code" carries a signal which is applied to OR-gate 2401 of FIG. 24, thus opening multiple AND network 2403 and placing the contents of Scan counter 2402 on "i-code" bus 93. Scan counter 2402 of FIG. 24 is initially set to its zero state by a signal passing through AND-gate 2404. Following this, the Scan counter 2404 is stepped to state 1 and the lead labelled "Start arithmetic subcycle" is energized. At a subsequent time, the structure of FIG. 24 receives a signal over the lead labelled "Arithmetic subcycle completed." This signal goes through OR-gate 2405, resets flip-flop 2406, opens AND-gate 2407 at the next clock [pplse] *pulse*, and thus steps Scan counter 2402 to its state 2. The stepping of Scan counter 2402 resulting from generation of signals on the leads labelled "Start arithmetic subcycle" and "Arithmetic subcycle completed" continues until the Scan counter reaches state (I+1). At this point further stepping ceases and a signal appears through decoder 2408 on the line labelled "Table scan completed."

Figure 25:
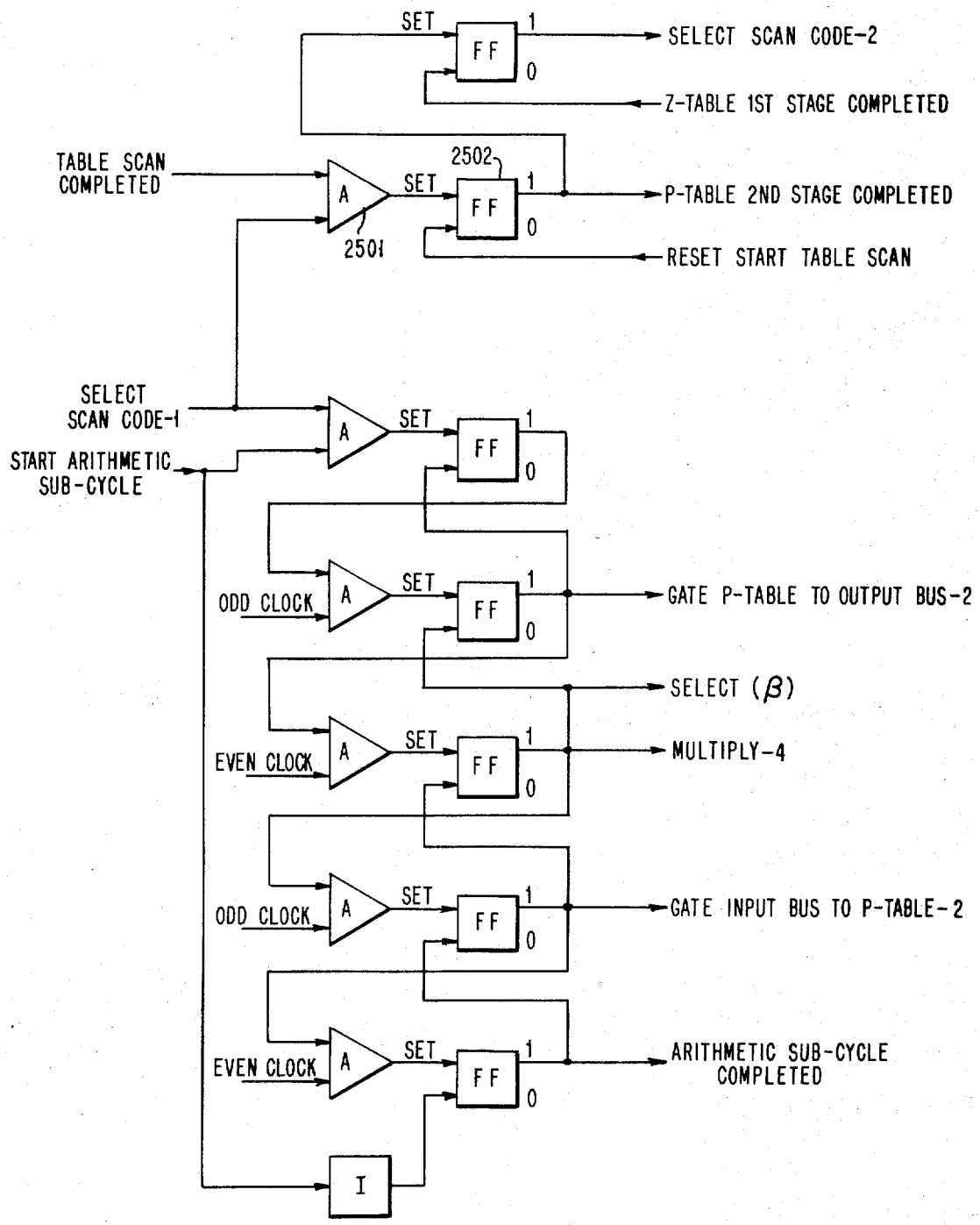
FIG. 25 shows the sequence control logic for the second stage of updating the P-table.

FIG. 25 shows the sequence control logic structure for the arithmetic subcycles which are performed during "Update P-table: second stage" operation. A signal on the line labelled "Gate P-table to output bus" causes the contents of the previously selected register of the P-table to be transferred to Arithmetic unit 210 of FIG. 21. A signal on the line labelled "Select $\beta$" causes the predetermined constant $\beta$, as stored in the Constants table of FIG. 13, to be placed on the constants bus 100. A signal on the line labelled "Multiply −4" causes Arithmetic unit 210 to multiply the contents of its Accumulator by $\beta$. A signal on the line labelled "Gate input bus to P-table —2" is applied to the structure of FIG. 10 and causes the product of the multiplication to be transferred back to the originally selected register of the P-table.

The appearance of a signal on the line labelled "Table scan completed" opens AND-gate 2501 and sets flip-flop 2502 to its 1 state, thus indicating that the second of the two stages making up the routine for updating the P-table is completed.

(10) Update Z-table routine.—As indicated in Chart 1, Z refers to an estimate of the number of A-parts which have been ordered from A-manufacturing apparatus 1. $Z_i$ defines an estimate of the number of A-parts which have been ordered and which are expected to fall into the ith subclass when manufactured. The Z-table has a total of I registers each containing the value of $Z_i$ for one of the subclasses.

There are a number of alternative ways of obtaining a value for $Z_i$. The method used in the preferred embodiment described in this specification is expressed by the following algorithm:

$$\text{new } Z_i = \alpha^{\frac{-N_o}{2}}\left[(\text{old } Z_i)\alpha^{\left(1+\frac{N_o}{2}\left[\frac{N_o}{1}\right]\right)} + G_i - (H_i)\alpha^{N_o}\right]$$

The quantities $$\left[\alpha^{\left(1+\frac{N_o}{2}\right)}\right]$$

and $\alpha^{N_o}$ have been defined in Chart 1 and are stored in individual registers as illustrated in FIG. 13. It is noted that $\alpha$ is a parameter in the range of 0 to 1, which indicates the weighting of the information for the dimensional subclass of the most recent A-part that has passed through the A-gauge. A typical value for $\alpha$ used in this system is $$\alpha = 0.25^{\left[\frac{N_o}{1}\right]\frac{1}{N_o}}$$

Again, as indicated in Chart 1, the quantity $G_i$ appearing in the algorithm of Equation e–21 denotes the number of A-parts of the ith subclass which are expected to reach A-gauge as the result of commands delivered to the A-manufacturing apparatus since the most recent completion of the "update Z-table" routine. Similarly, $H_i$ denotes the number of A-parts of the ith subclass which have passed through the A-gauge since the most recent completion of the "update Z-table" routine.

The "update Z-table" routine is performed in five stages, numbered first through fifth.

The "update Z-table: first stage" operation is initiated by the signal "P-table: second stage completed" as discussed above (see FIG. 25 and the set output of flip-flop 2502). Referring to FIG. 24, the lead from flip-flop 2502 labeled "Select scan code —2" now goes into OR-gate 2401 and carries a signal which causes the "i-code" generated by scan counter 2402 to be placed on the "i-code" bus 93.

Again with reference to FIG. 24, the signal on the lead labeled "P-table: second stage completed" and going into OR-gate 2409 is present and causes the table scan logic structure of FIG. 24 to step scan counter 2402 starting from state 0 and going through state (I+1). At each state of the scan counter, a signal is applied to the lead labeled "start arithmetic subcycle," at the set output of flip-flop 2406 and a signal is received over the head labeled "arithmetic subcycle completed" at OR-gate 2405. At state (I+1), stepping ceases and a signal is applied to the lead labeled "table scan completed."

Figure 26:
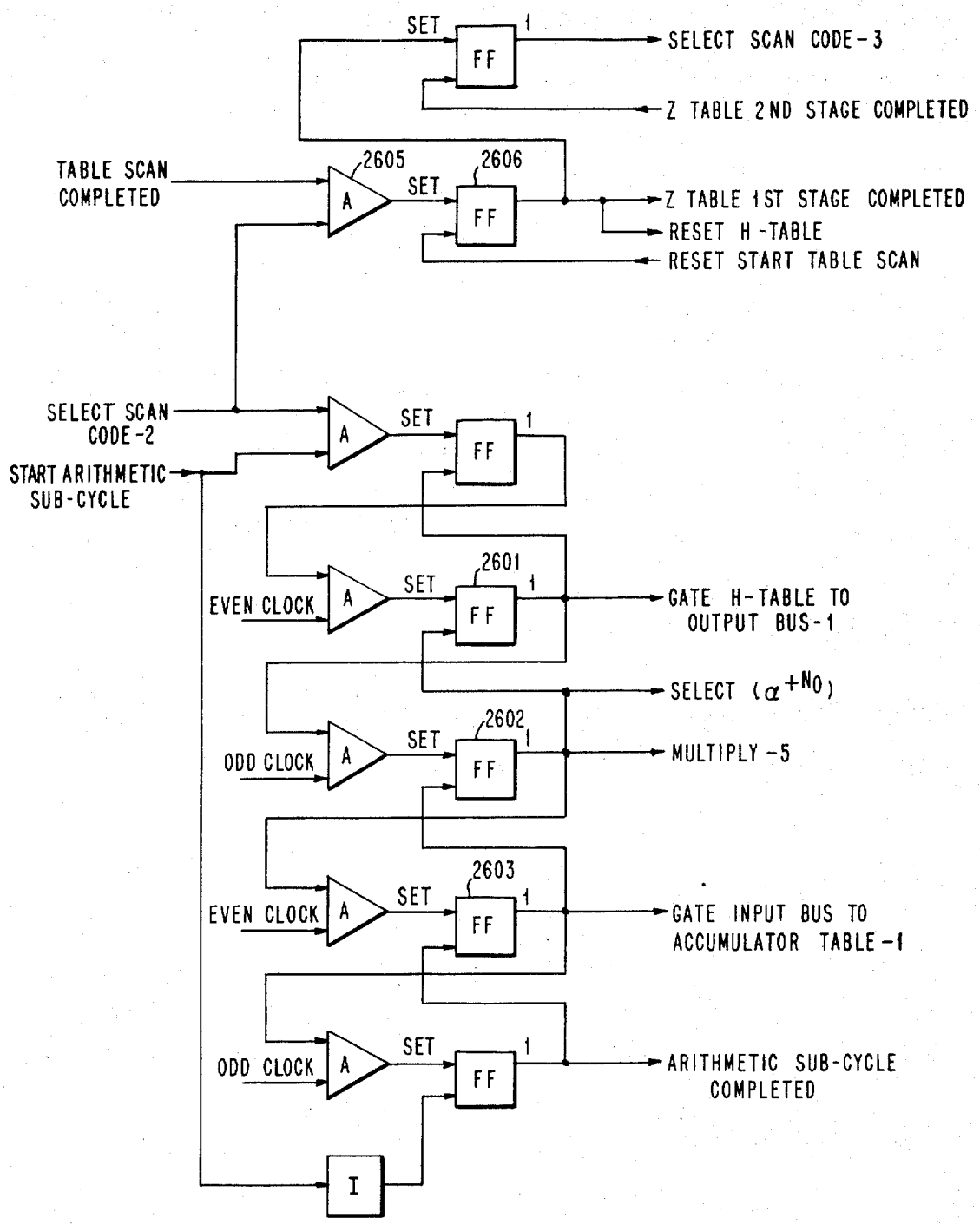
FIGS. 26 through 30 show the sequence control logic for updating the Z-table during stages 1 through 5.

FIG. 26 illustrates the sequence control logic for the arithmetic subcycles performed during the first stage of this routine. The "gate H-table to output bus —1" signal emerging from the set output of flip-flop 2601 causes the contents of a selected register from the H-table illustrated in FIG. 10, as selected by the contents of counter 2402 placed on the "i-code" bus 93, to be transferred to the arithmetic unit 210 of FIG. 21 and placed in its accumulator. A signal on the lead labeled "select $\alpha^{N_o}$," as applied by the 1 output of flip-flop 2602 of FIG. 26, causes the predetermined constant $\alpha^{N_o}$ to be read out of the appropriate constants register of FIG. 13 and placed on the constants bus 100. The output of flip-flop 2602 also applies a signal on the lead labeled "multiply —5" and causes arithmetic unit 210 to multiply the contents of its accumulator by $\alpha^{N_o}$. At the next even clock pulse flip-flop 2603 of FIG. 26 is set, thus placing a signal on the lead labeled "gate input bus to accumulator table —1." This signal is applied to the OR-gate 10AC2 of FIG. 10 and causes the product of the multiplication performed by arithmetic unit 210 to be read into the register of the accumulator table of FIG. 10 selected by the "i-code" still present on the i-code bus 93.

When counter 2402 of FIG. 24 reaches its I+1 state, a signal appears on the lead labeled "Table scan completed" which is applied to the AND-gate 2605 of FIG. 26, producing in turn a "Z-table: first stage completed" signal at the set output of flip-flop 2606. At this point, the first stage of the routine is completed.

The "Z-table: first stage completed" signal at the output of flip-flop 2606 causes the following two events: (a) a signal is applied to the "reset H-table" lead of FIG. 10, causing each of the registers of the H-table to contain the value 0; and (b) the "update Z-table: second stage" operation is initiated. At thsi time, the accumulator table of FIG. 10 stores $$[(H_i)\cdot(\alpha^{N_o})]$$

the value of this quantity for each subclass i being stored in a separate register of the accumulator table.

Figure 27:
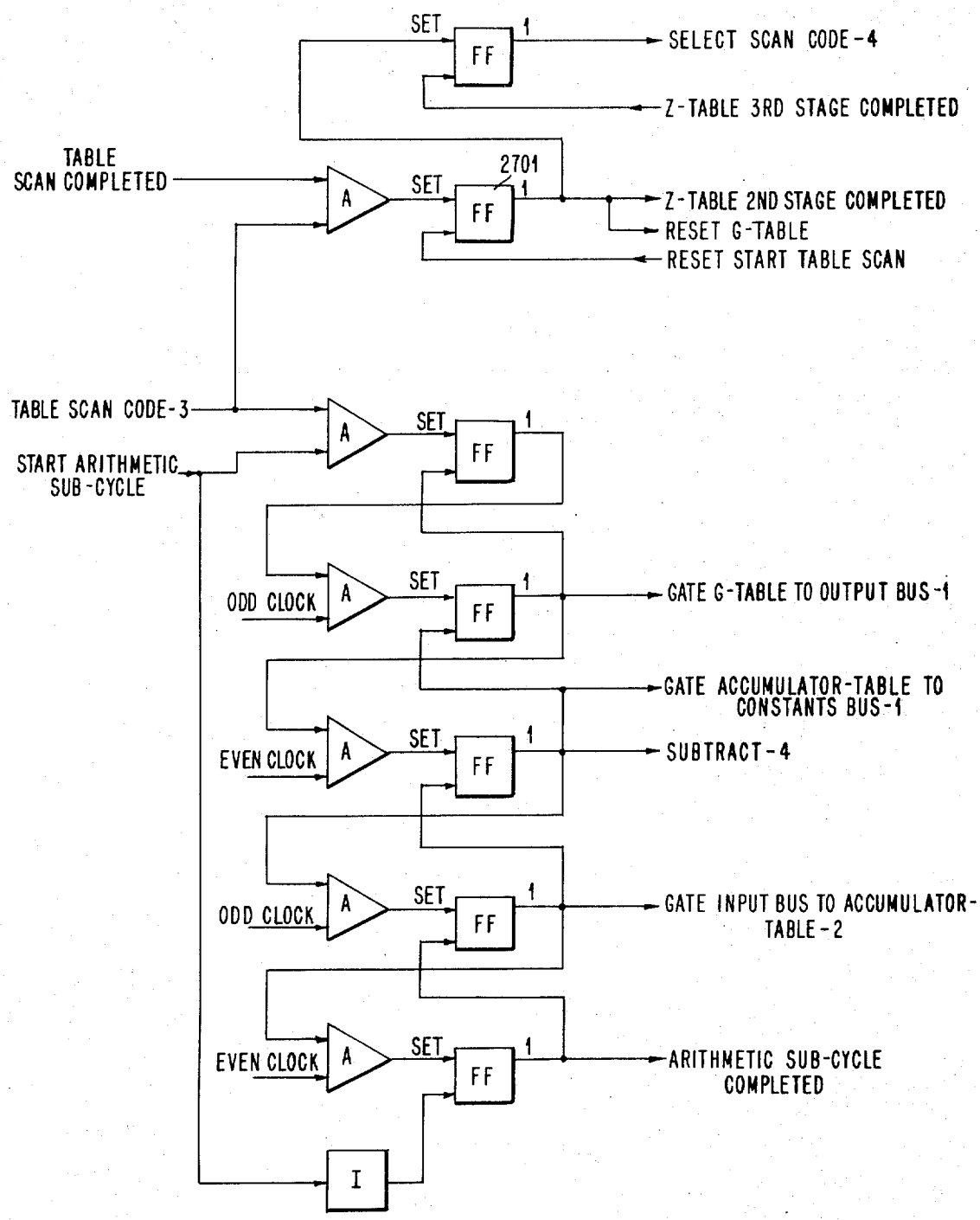

During the "update to Z-table: second stage" operation, the table scan logic of FIG. 24 is again used to develop a sequence of i-code values. FIG. 27 illustrates the logic structure for the arithmetic subcycles of this routine. During this stage, the lead labelled "subtract —4" which goes to the arithmetic unit 210 is set to its "on" state. Each of the values of i generated by scan counter 2404 selects a register i from the G-table of FIG. 10, and causes the contents of the selected register to be transmitted to arithmetic unit 210 over output bus 92. At each such step, the value of i generated by counter 2402 causes the selection of a register i from the accumulator table of FIG. 10 and causes the contents of the selected register to be transmitted to the arithmetic unit 210 over the constants bus 100. In the arithmetic unit, as illustrated in FIG. 21, the value received from the accumulator table is subtracted from the value received from the G-table. The result of the subtraction is fed over input bus 91, back into the selected register i of the accumulator table of FIG. 10, as selected by the "i-code" present on "i-code" bus 93. The arithmetic subcycle is thus completed. The table scan logic of FIG. 24 now steps counter 2402, generates a subsequent i-code and initiates another arithmetic subcycle. This process continues until scan counter 2402 of FIG. 24 reaches state I+1. At this point the second stage of the routine is completed and a signal appears on the output of the lead labelled "Z-table: second stage completed" at the output of flip-flop 2701 of FIG. 27. This signal causes energization of lead 101 of FIG. 10 labelled "reset G-table" and all registers of the G-table are set to 0. The same signal initiates the third stage of the routine for updating the Z-table. At this time the accumulator table of FIG. 10 stores the quantity $$[G_i - (H_i)(\alpha^{N_o})]$$

for each value of i.

Figure 28:
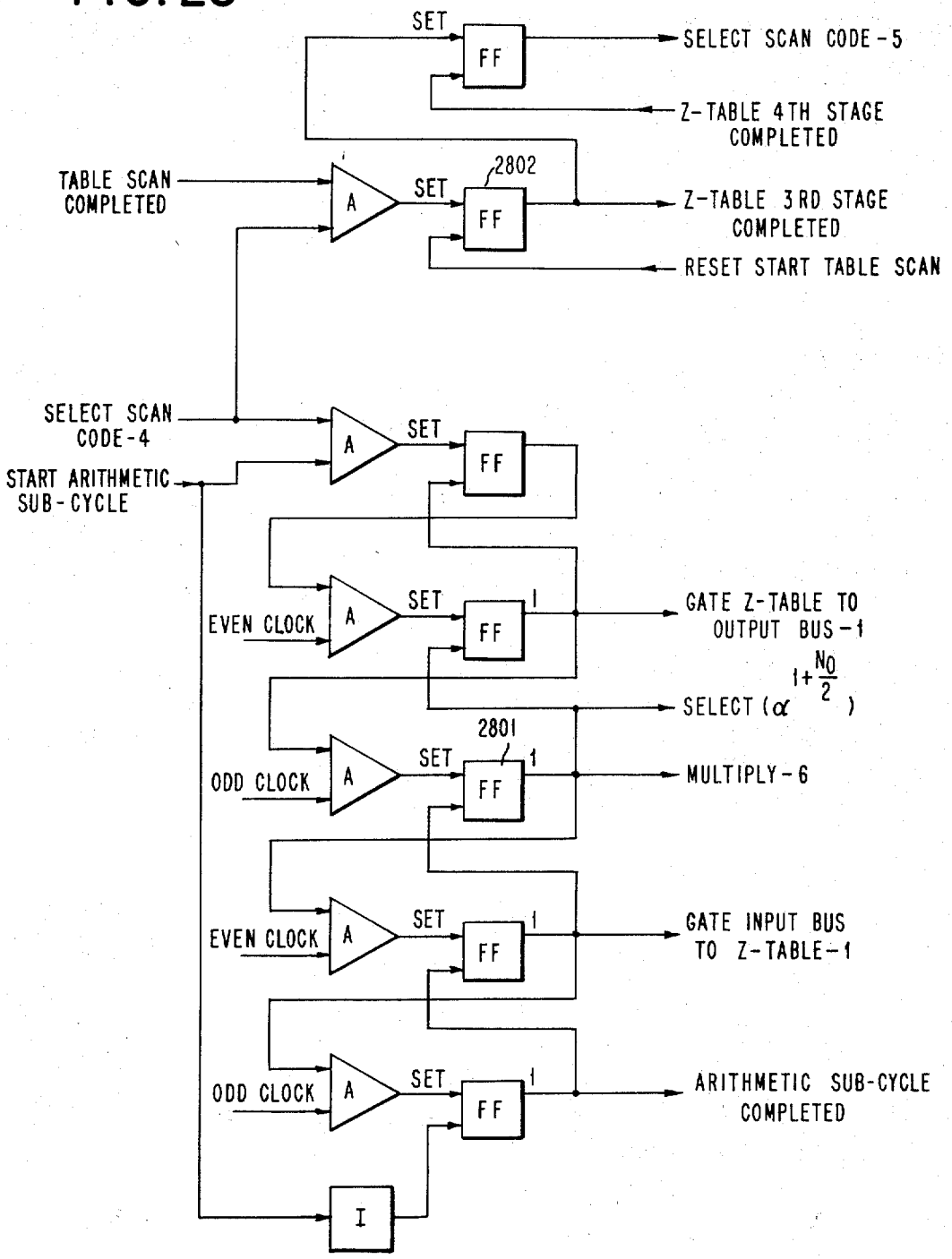

During the "update Z-table" third stage["] operation, the table scan logic of FIG. 24 again develops a sequence of i-code values. FIG. 28 illustrates the logic structure for the arithmetic subcycles of this stage. During this stage, the "multiply" lead going from flip-flop 2801 of FIG. 28 into OR-gate 213 of FIG. 21 is set to its "on" state. Each of the values of i generated by scan counter 402 selects a register i from the Z-table of FIG. 10 nd causes the contents of the selected register to be transitted to the arithmetic unit 210 of FIG. 21 over the utput bus 91. At the same time, the value $$\alpha^{\left(1+\frac{N_o}{2}\right)}$$

s selected from the constants table of FIG. 13 and is aplied to the arithmetic unit of FIG. 21 via the constants us 100. Under the control of the output of OR-gate 13, the arithmetic unit performs the multiplication of he values supplied over output bus 92 and over constants us 100, and transmits the product of the multiplication ack to the selected register i of the Z-table of FIG. 10 ver the input bus 91. The current arithmetic subcycle s thus completed, and the table scan logic of FIG. 24 teps to the next i-code and imitiates another arithmetic ubcycle. This process continues until scan counter 2404 eaches state (I+). At this point the stage is completed nd a "Z-table; third stage completed" signal appears at he output of flip-flop 2802. At this time, the Z-table tores the quantity.

$$\left[(\text{old } Z_i)\alpha^{\left(1+\frac{N_o}{2}\right)}\right]$$

or each value of i.

Figure 29:
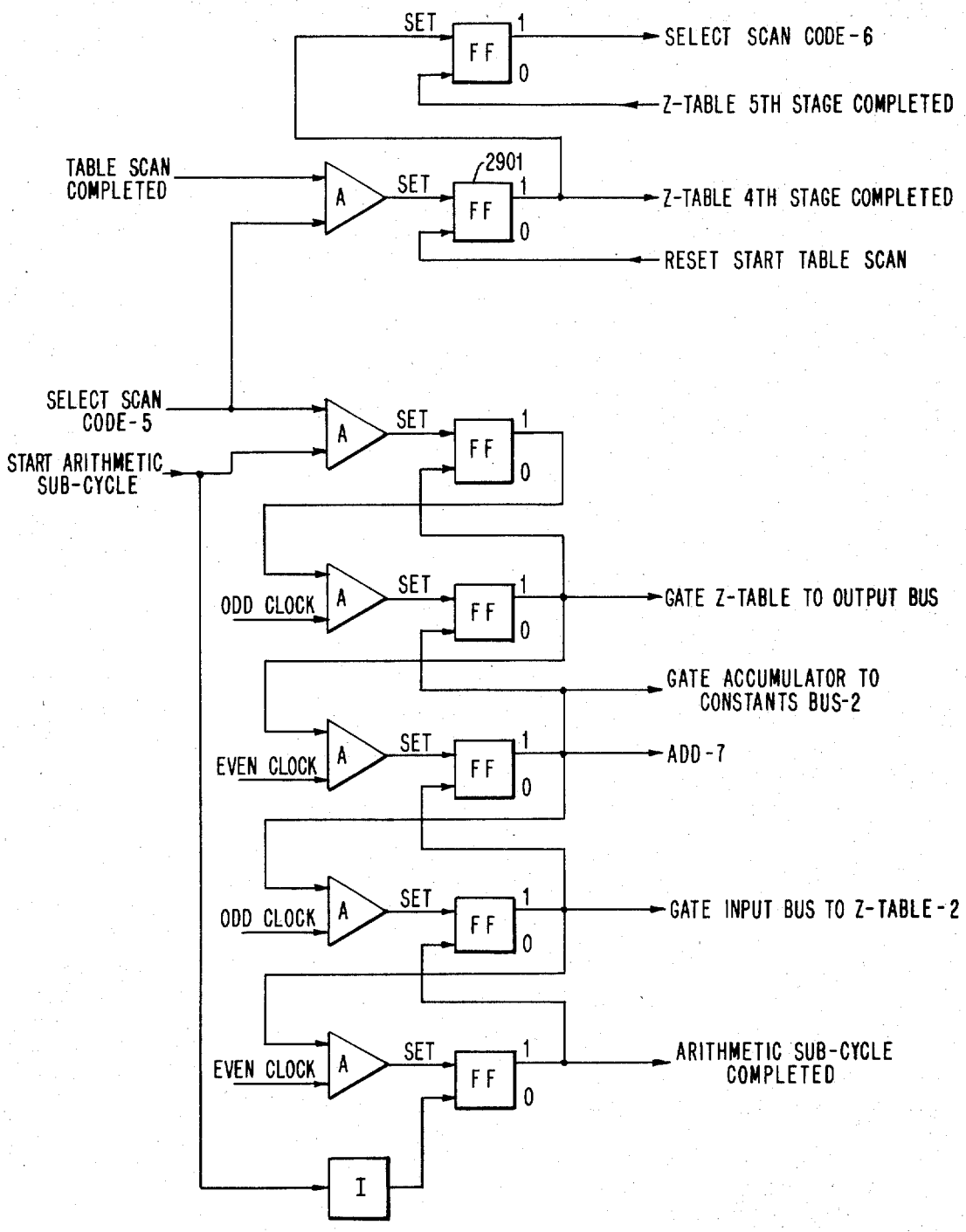

The "update Z-table: fourth stage" operation is initiated y the signal indicating completion of the third stage. During this stage the table scan logic of FIG. 24 is also sed to generate a sequence of i-code values. FIG. 29 llustrates the logic structure for the arithmetic subcycles f this stage. Each of the values of i generated by scan ounter 2404 is used to select a register i from the Zable of FIG. 10, and to cause its contents to be transitted to arithmetic unit 210 over the output bus 92.

The same value of i is used to select a register i from he accumulator table, also of FIG. 10, and to cause its ontents to be transmitted to the arithmetic unit over the onstants bus 100. Under the control of the "add −7" ead going into OR-gate 211, arithmetic unit 210 performs he addition and transmits the sum back to the selected egister i of the Z-table over input bus 92, thus comleting the arithmetic subcycle. The table scan logic of IG. 24 now steps to the next i-code, and initiates another rithmetic subcycle. This process continues until the scan ounter 2402 reaches state (I+1). At this point the stage s completed and a signal is applied to the line emerging rom the set output of flip-flop 2901 of FIG. 29 labeled Z-table: fourth stage completed." The Z-table is now toring the quantity $$\left[(\text{old } Z_i)\alpha^{\left(1+\frac{N_o}{2}\right)}+G_i-(H_i)\alpha^{N_o}\right]$$

or each value of i.

Figure 30:
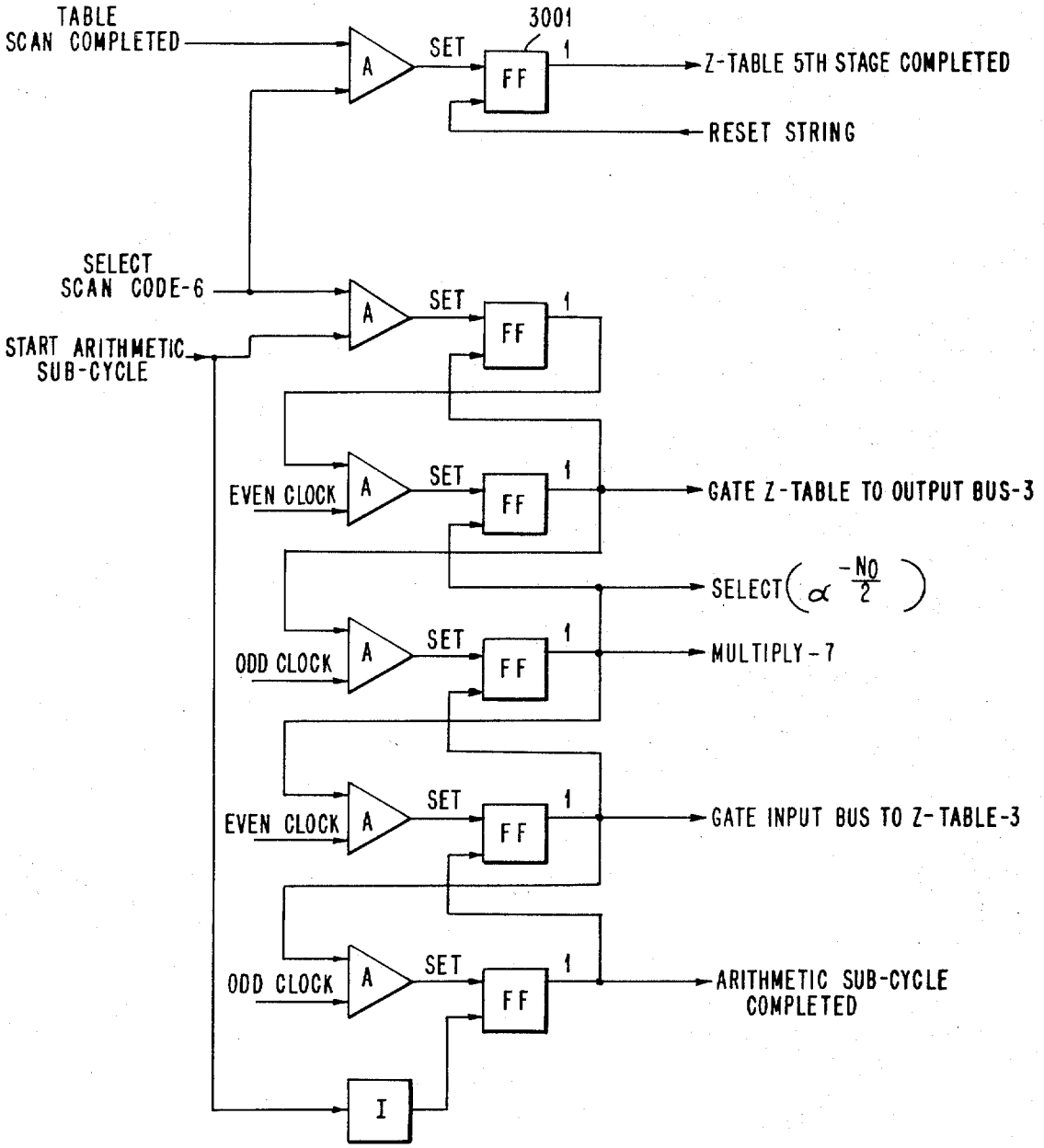

The last-mentioned signal initiates the "update Z-table: ifth stage" operation. The table scan logic of FIG. 24 gain develops a sequence of i-code values. FIG. 30 illusrates the logic structure for the arithmetic subcycles of his stage. During the stage, the "multiply −7" lead oing to arithmetic unit 210 is energized. Individual regisers of the Z-table of FIG. 10 are selected sequentially s determined by the i-code and their contents are transnitted to arithmetic unit 210 via the output bus 92. At he same time the value $$\alpha^{-\frac{N_o}{2}}$$

s selected from the constants table of FIG. 13 and aplied to the arithmetic unit over the constants bus 100. The arithmetic unit performs the indicated multiplication nd transmits the product back to the selected register of the Z-table over the input bus 91. The current arithetic subcycle is thus completed and the table scan logic f FIG. 24 now steps scan counter 2402 and initiates nother arithmetic suubcycle. This process continues until he scan counter reaches state (I+1). The firth stage is hen completed and a "Z-table: fifth stage completed" signal appears at the set output of flip-flop 3001 of FIG. 30. The Z-table is now storing the updated values of $Z_1$.

At this point the string of routines which was initiated by the signal on the line labeled "B-part received" originating at the B-gauge is completed. Control is now returned to the priority logic of FIG. 15 so that the next string of highest priority may be serviced.

(11) Compute $F_i$.—As indicated in Chart 1, $F_i$ denotes a figure of merit which measures the desirability of ordering a new batch of A-parts with a target dimension in the ith subclass.

When the A-manufacturing apparatus control element 25 is about to order a new batch of A-parts, it sends to Computing element 4 a signal requesting that the Computing element determine the value of the figure of merit for a particular subclass. The particular subclass is identified by an "i-code" sent from the A-manufacturing apparatus control element 25 to Computing element 4, together with the request for a computation of $F_i$.

Note that during the performance of this routine the "i-code" designating the subclass for which a figure of merit is to be computed is not carried by the i-code bus 93, but by a bus designated "value-of-i," and shown in some detail in FIG. 6 When describing this routine, the information which is carried by i-code bus 93 is designated the "j-code."

Figure 31:
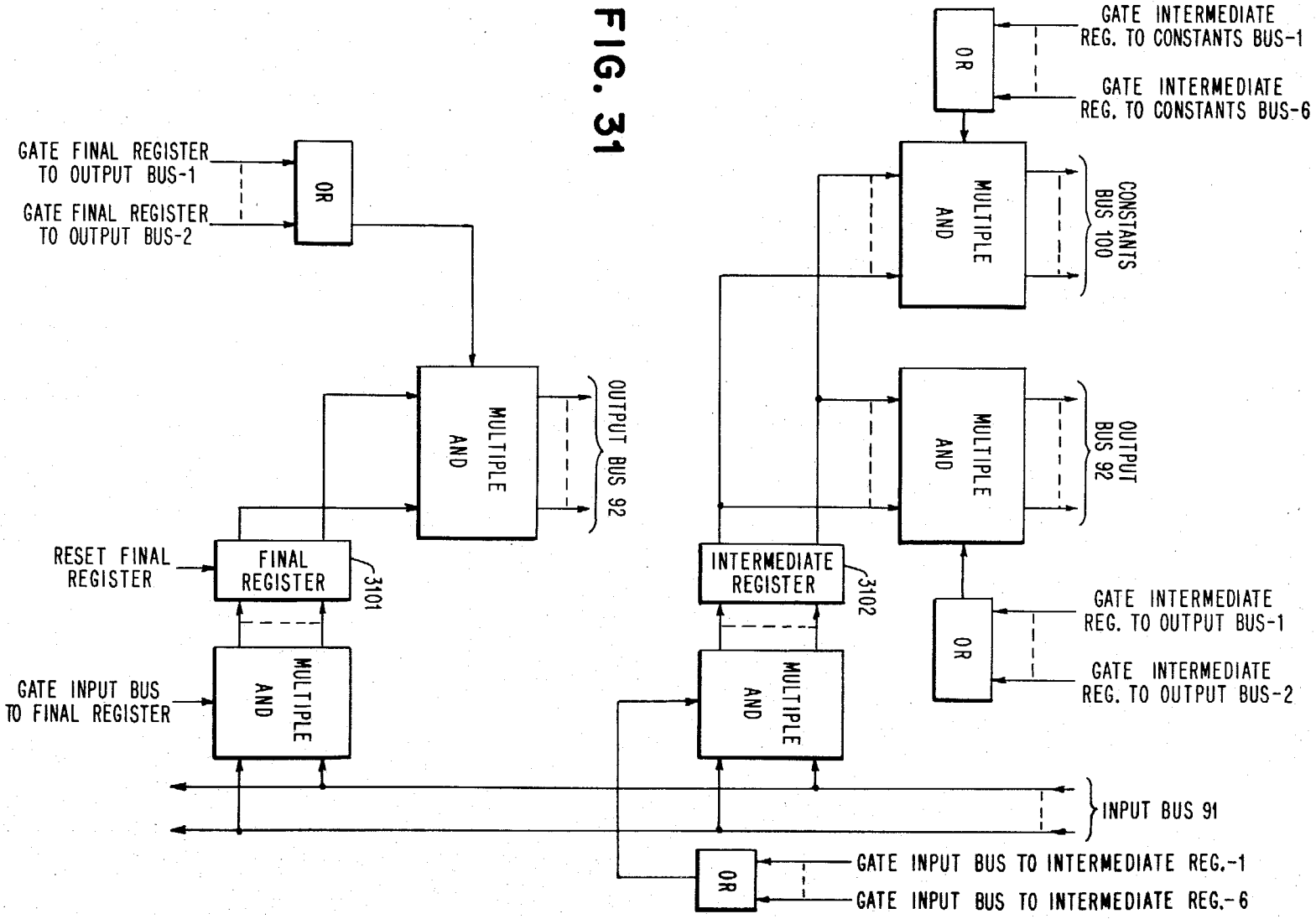
FIGS. 31 through 35, with FIG. 33 consisting of FIGS. 33a and 33b, show the logical structure used in the computation of the figure of merit.

The algorithm for computing the figure of merit was defined in Equation e–1. FIG. 31 shows some of the logic structure used in this routine.

In carrying out this routine, the value of $$A_k[(N_a+N_o)P_j-X_j+Y_j-Z_j] \qquad \text{(e–22)}$$

for a given value of j is first computed, and the computed quantity is stored in the Intermediate register 3102. The contents of the Intermediate register are then added to the contents of the Final register 3101. The preceding cycle is repeated I times, each time for a different value of j. At the end of this series of cycles, the value stored in the final register 3101 will be.

$$\sum_{j=1}^{j=I} A_k[(N_a+N_o)P_j-X_j+Y_j-Z_j] \qquad \text{(e–23)}$$

At this point the contents of the L register of FIG. 13 are subtracted from the contents of the final register.

The subtraction will result in a number for the figure of merit which is either positive or negative. If the sign of the number resulting from the subtraction is negative, the string of routines which was initiated by the "request computation of $F_i$" signal is terminated and control is returned to the priority logic of FIG. 15. If the sign is positive, then A-manufacturing apparatus control element 25 will use the value of i for which the figure of merit was found to be positive to order a batch of A-parts of target subclass i.

A detailed description of the steps of this routine, with reference to the pertinent figures is given in Chart 4 below.

CHART 4

Figure 32:
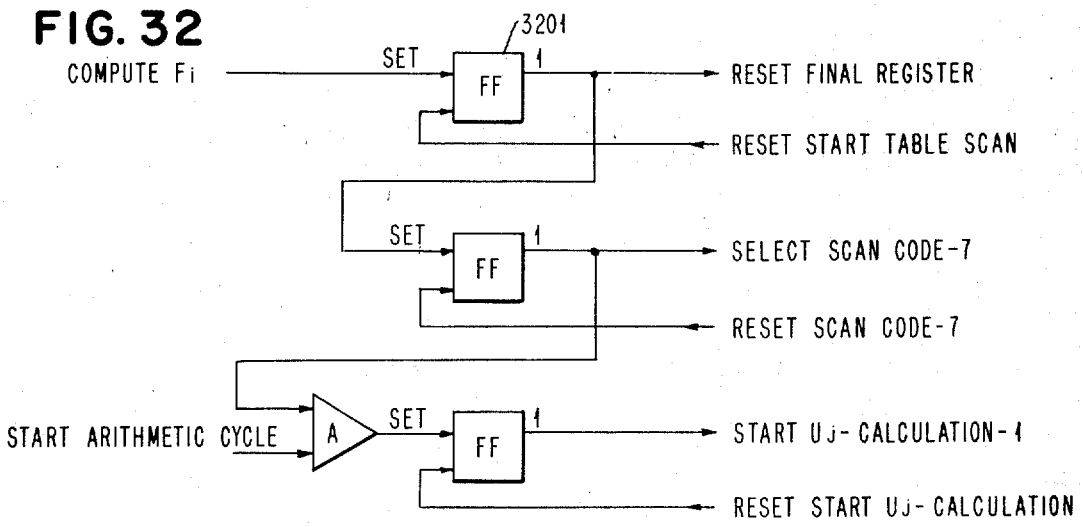

| Step | Description of step |
|---|---|
| 1 | Referring to FIG. 7, the "Request computation of $F_i$" signal is generated by the A-manufacturing apparatus control element 25 and transmitted to Computing element 4 over lead 38. The "Request computation of $F_i$" signal is applied to AND-gate 1524 of FIG. 15, resulting in a "Compute $F_i$" signal at the output of flip-flop 1510, provided no request for the execution of a higher priority routine has been made. The last mentioned signal is applied to the set input of flip-flop 3201 of FIG. 32 and thus the output of flip-flop 3201 is directed to the Final register 3101 of FIG. 31, re-setting its contents to zero. |
| 2 | The "Reset Final register" signal is also applied to OR-gate 2409 of FIG. 24, thus initiating the sequence of the Table scan logic structure illustrated therein. It is noted here that in the course of computing $F_i$, the output of Scan counter 2402 of FIG. 24 will be termed the "j-code" rather than the "i-code" as it has been termed heretofore. It should be also noted that "i-code" bus 91 will carry the "j-code" so far as the computation of $F_i$ is discussed. |
| 3 | Scan counter 2404 of FIG. 24 is stepped to its next state. |
| 4 | If the "j-code", as the output of the Scan counter is now termed, is equal to I+1, then the "table scan completed" lead of FIG. 24 is energized and a branch will be made to step 13 of this Chart. Otherwise (in other words, if the output of the Scan counter is not equal to I+1) the sequence is continued on to step 5 of this Chart. |

CHART 4—Continued

Figure 33B:
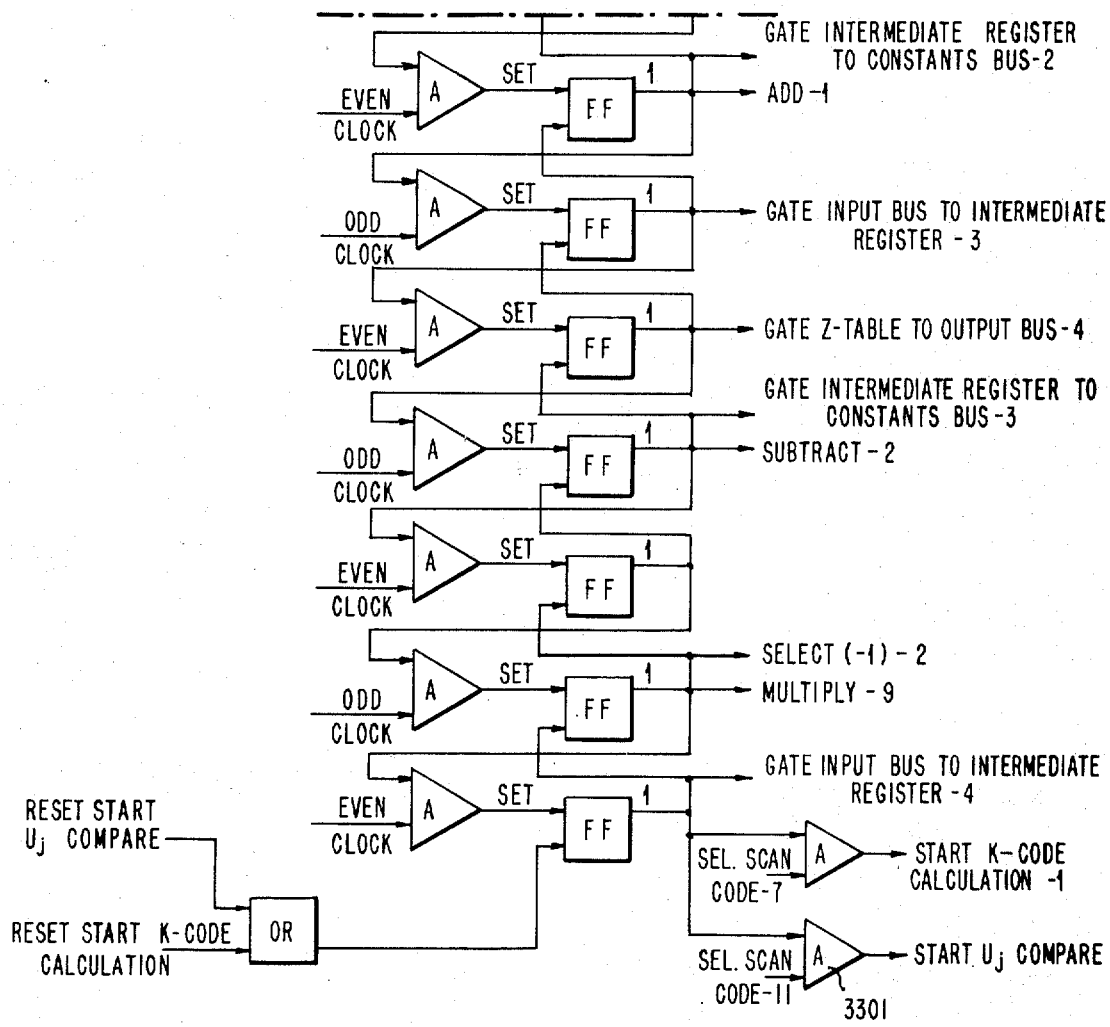
Figure 33:
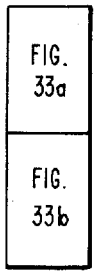
Figure 33A:
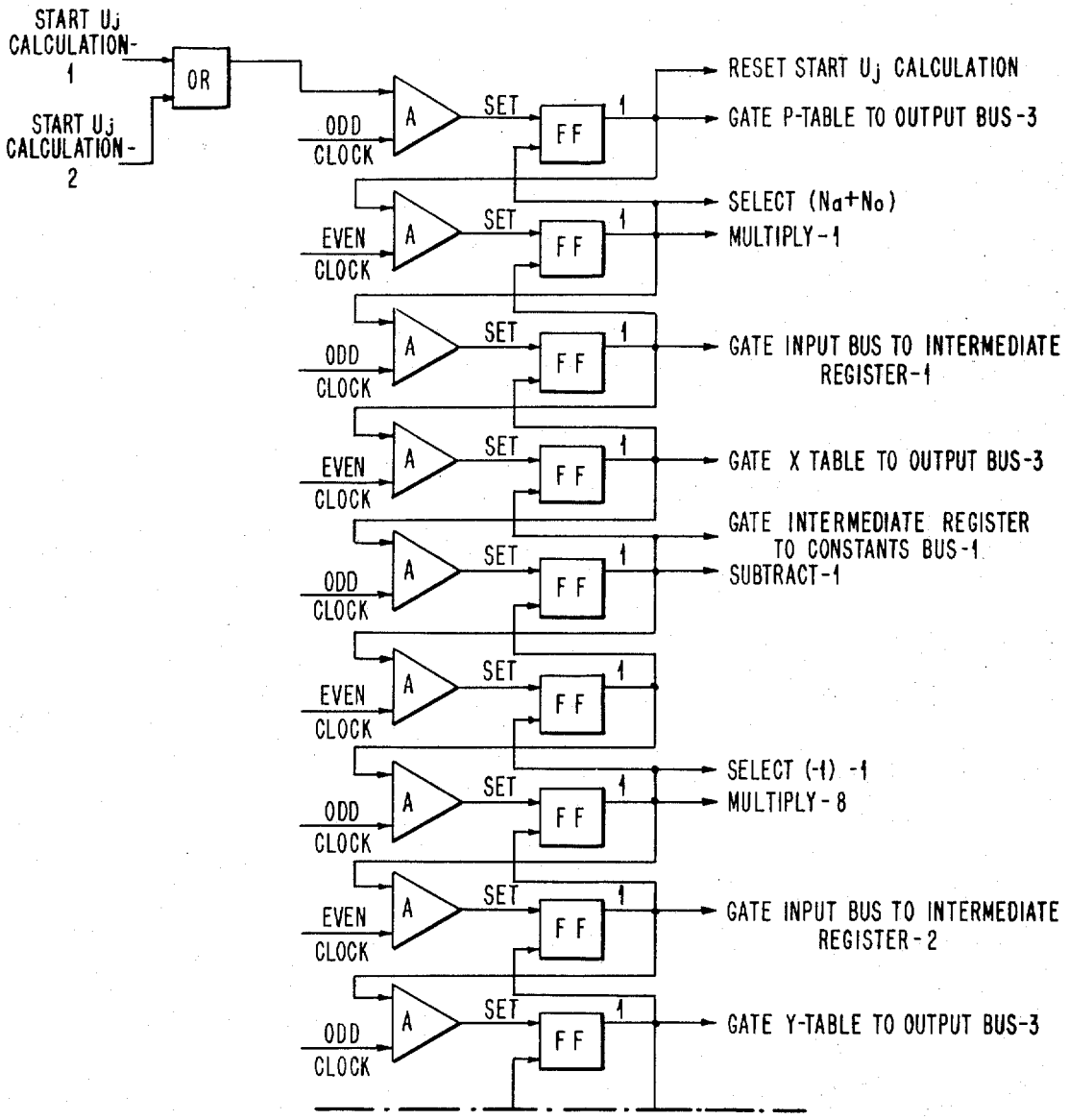
Figure 34:
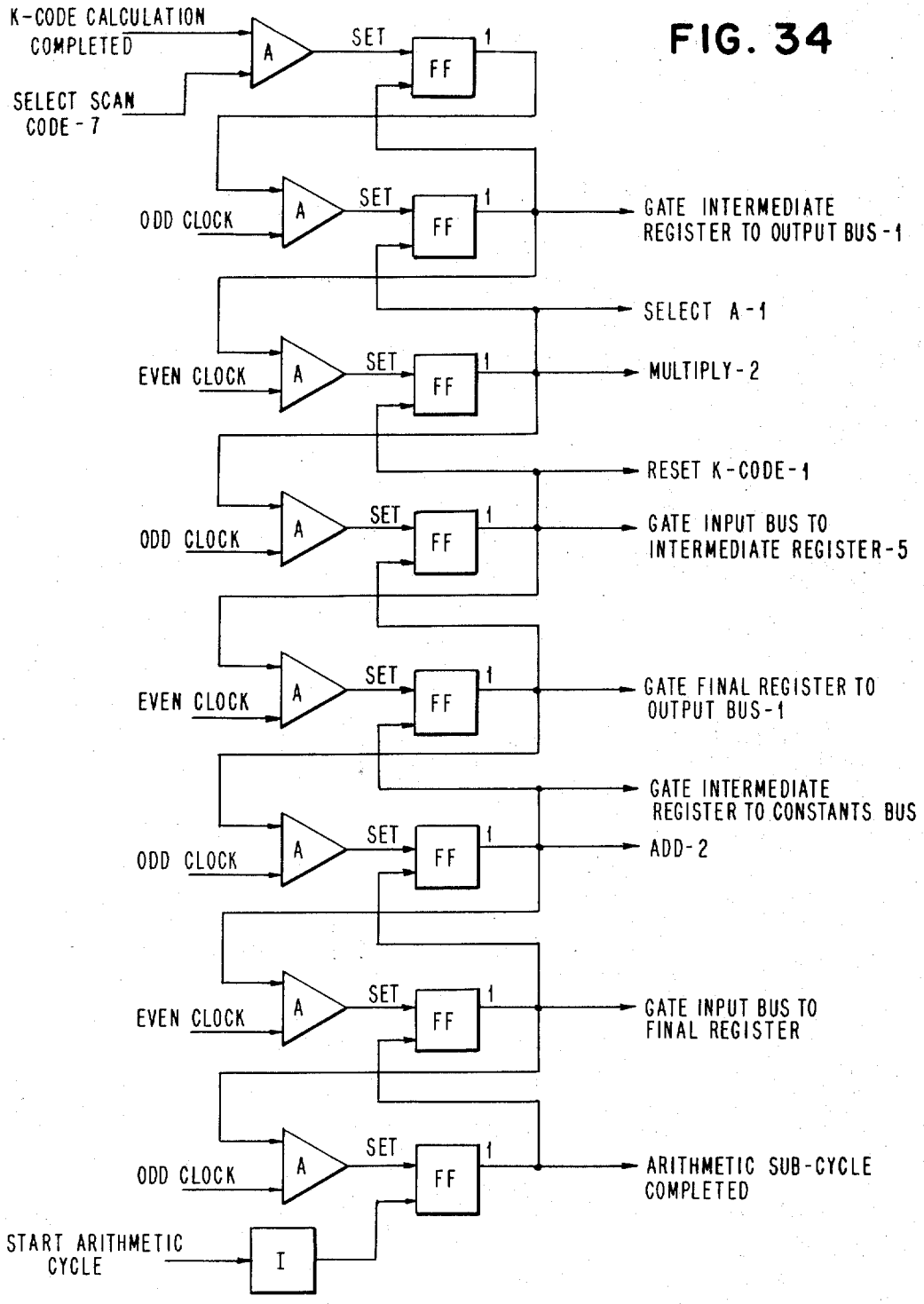
Figures 36, 36A:
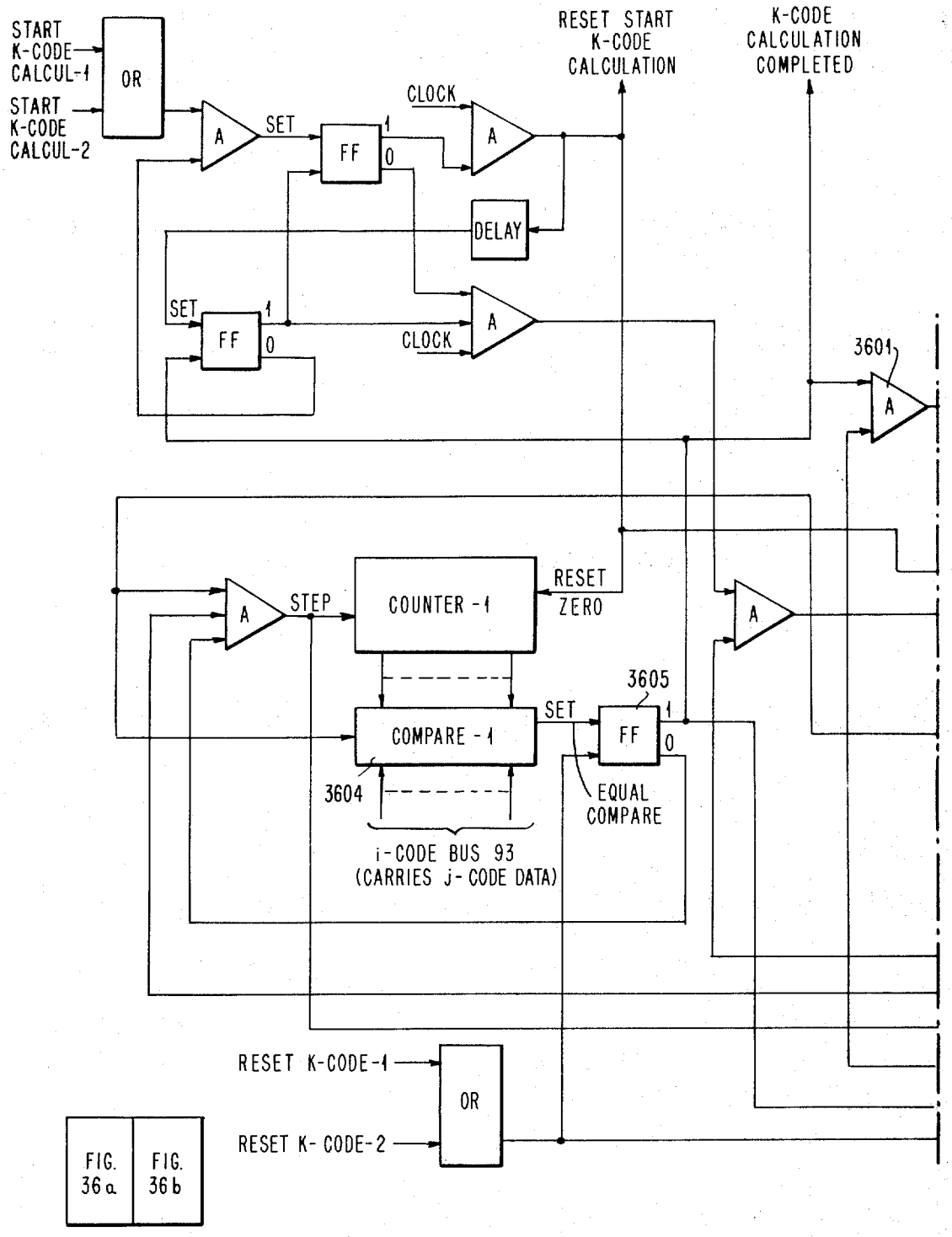
FIG. 36, consisting of FIGS. 36a and 36b, shows the scanning and computation logic elements used in connection with the k-code.
Figure 36B:
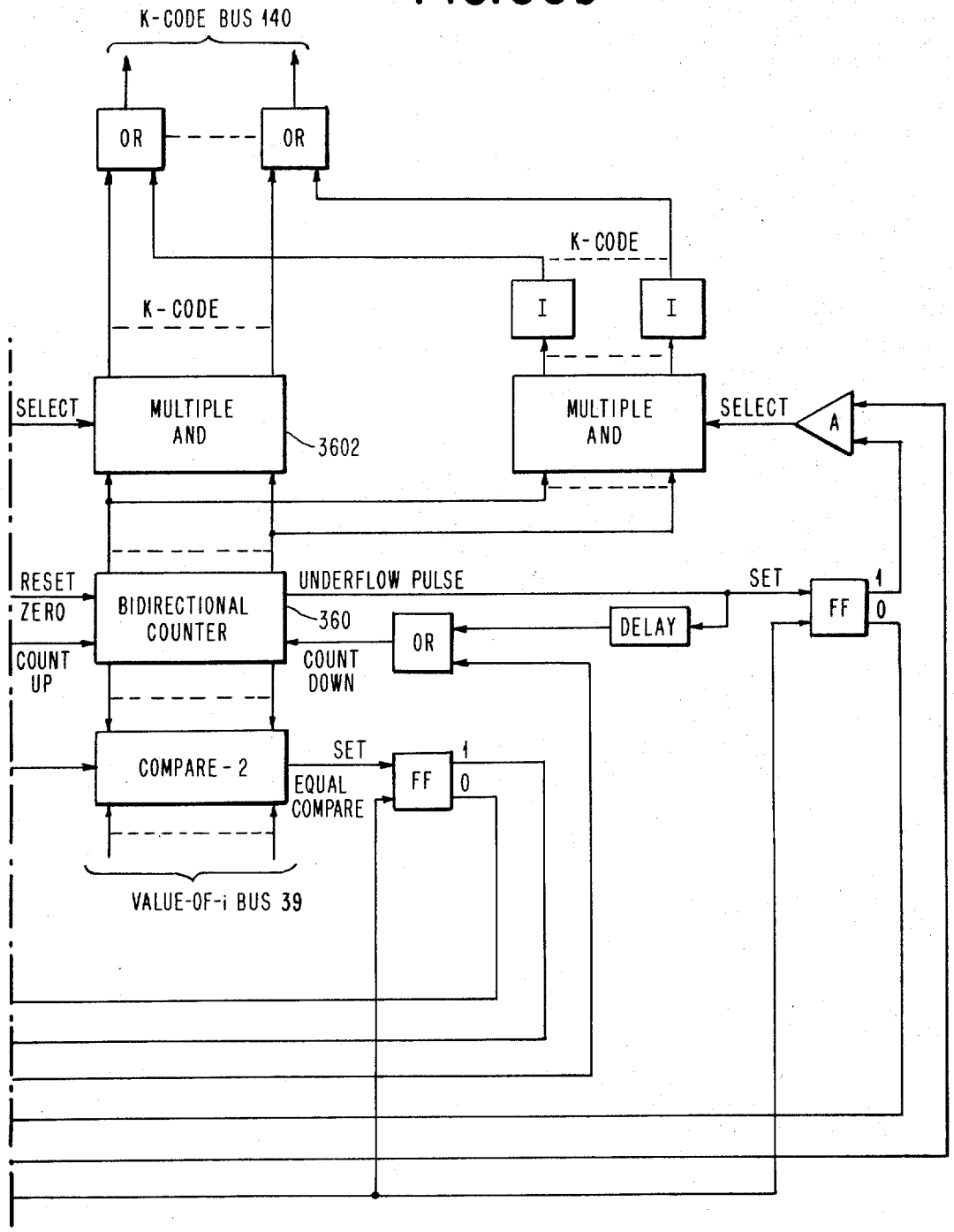

| Step | Description of step |
|---|---|
| 5 | Referring to the logic structure of FIG. 33, based on the value of "j," as carried by "i-code" bus 93, a register $P_j$ is selected from the P-table of FIG. 10, and the selected register is coupled to the Arithmetic unit 210 of FIG. 21 via the output bus 92. The constant $(N_a+N_o)$ is then selected from the Constants table of FIG. 13 and is also fed to the Arithmetic unit 210 via the constants bus 100. The output of OR-gate 213 of FIG. 21 is now active and the Arithmetic unit 210 performs the multiplication of the values supplied to it over the output bus and over the constants bus. The product of the multiplication is fed to the Intermediate register 3102 of Figure 31 via the input bus 92. The Intermediate register is now storing the quantity $(N_a+N_o)$ [$P_i$] *Pj* for the value of "j" carried by "i-code" bus 93. |
| 6 | Referring again to the logic structure of FIG. 33, based on the value of "j," a register $X_j$ is [slected] *selected* from the X-table of FIG. 10 and the contents of the selected register are then fed to the Arithmetic unit 210 of FIG. 21 via the output bus 92. The contents of the Intermediate register 3102 of FIG. 31 are also fed to the Arithmetic unit via the constants bus 100. The output of OR-gate 212 of FIG. 21 is now active, thus causing the Arithmetic unit to subtract the value supplied to it by the constants bus from the value supplied to it over the output bus. The result of the subtraction is multiplied by (−1) as supplied by the Constants table of FIG. 13 and is then transmitted to the Intermediate register 3102 of FIG. 31 via the input bus 91. The Intermediate register is now storing the quantity $[(N_a+N_o)-P_j-X_j]$ for the same value of "j." |
| 7 | Still referring to FIG. 33, based on the value of "j" again, a register $Y_j$ is selected from the Y-table of Figure 10 and its contents are fed to the Arithmetic unit 210 via the output bus 92. The contents of the Intermediate register 3102 of FIG. 31 are also transmitted to the Arithmetic unit via the constants bus 100. The output of OR-gate 211 of FIG. 21 is now active, thus causing the Arithmetic unit to add the values supplied to it. The result of the addition is fed to the Intermediate register 3102 via the input bus 91. The Intermediate register now contains the value of $[N_a+N_o)Pj-Xj+Yj]$. |
| 8 | Again based on the value of j, a register $Z_j$ is selected from the Z-table, and its contents are fed to the Arithmetic unit 210 via the output bus 92. The contents of the Intermediate register 3102 are then fed to the Arithmetic unit via the constants bus 100. The output of OR-gate 212 of FIG. 21 is now active and Arithmetic unit to subtract the value supplied to it over the constants bus from the value supplied to it over the output bus. The result of the substraction is multiplied by the constant (−1) and the product is again fed to the Intermediate register 3102 via the input bus 91. At this point the Intermediate register 3001 stores the value of $U_j$ as defined in Equation e-17, but for subscript "j." |
| 9 | Fig. 36 illustrates the logic structure for step 9. During this step, the value of the "k-code", as defined in Chart 1, is computed. The computation proceeds along the following essential points. The Bidirectional counter 360 is initially set to its zero state. The capacity of counter 360 is I, the number of acceptable subclasses. Counter 360 can be stepped up to its next state by means of pulses appearing on the input to it marked "count up," and it can be stepped to its next lower state by pulses appearing on its input marked "count down." Counter 360 is operated in such a manner that when Compare unit 3604 indicates true comparison and sets flip-flop 3605 to its one state, a "k-code calculation completed" appears on the lead of Fig. 36 so labeled and at the input of AND-gate 3601. Then multiple AND-network 3602 is opened and Bidirectional counter 360 places on the "k-code" bus the absolute value of the quantity (i-j). |
| 10 | Fig. 34 illustrates the logic structure for step 10. During this step, based on the value of "k," register A from the A-table of FIG. 14 is selected and its contents are fed to Arithmetic unit 210 by the constants bus 100. The contents of the Intermediate register 3102 of FIG. 31 are then also fed to the Arithmetic unit via the output bus 92. The multiply control of the Arithmetic unit is now energized and the Arithmetic unit multiplies the two quantities supplied to it. The result of the multiplication is fed back to the Intermediate register 3102 of FIG. 31 via the input bus 91. The Intermediate register is now storing the quantity $[A_k. U_j]$ for the same value of "j" and for the value of "k" as specified by the contents of Bidirectional counter 360 of FIG. 36. |
| 11 | The contents of the Final register 3103 of FIG. 31, which at this time may *be* zero—if it is the first run through the steps up to now, or it may be the quantity $$\sum_{j=1}^{j=(\text{present } j)-1} A_k U_j$$ if this is not the first run through the steps of this routine up to now, are transmitted to the Arithmetic unit 210 via the output bus 92. The contents of the Intermediate register 3102 are also transmitted to the Arithmetic unit via the constants bus 100. Now the add control of the Arithmetic unit is energized and the Arithmetic unit adds the two quantities supplied to it. The result of the addition is transmitted to Final register 3101 via the input bus 91. At this time the Final register stores the quantity $$\sum_{j=1}^{j=(\text{present})} A_k U_j$$ |
| 12 | When the step is reached the procedure is again repeated from step 3 through step 11. Note that step 4 is such that if one result is reached, continuation of step 5 is indicated; if another result is reached, a jump to step 13 is indicated. |

CHART 4—Continued

Figure 35:
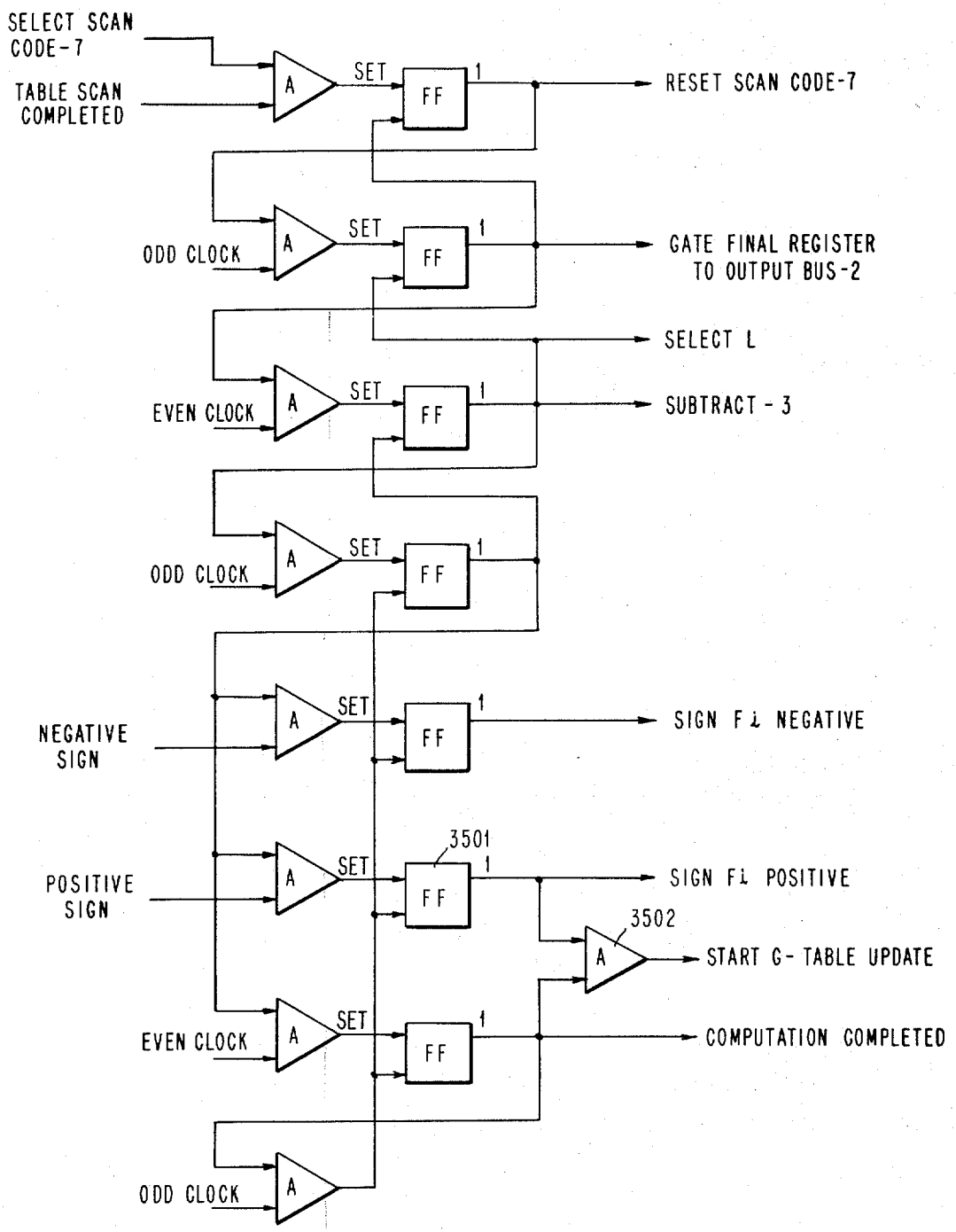

| Step | Description of step |
|---|---|
| 13 | FIG. 35 illustrates the logic structure for step 13. During this step, the contents of the Final register 3101 of FIG. 31 are fed to the Arithmetic unit 210 of FIG. 21 via the output bus 92. The contents of the L-register from the constants table illustrated in FIG. 13 are then transmitted to Arithmetic unit 210 via the constants bus 100. The subtract control of FIG. 21 is now active and the Arithmetic unit subtracts the constant L from the contents of the Final register. If the sign of the difference of the two quantities is negative, a signal appears on the lead of FIG. 35 labeled "sign $F_i$ negative." If the sign of the difference is positive, a signal appears on the lead of FIG. 35 labeled "sign $F_i$ positive." When the "sign $F_i$ positive" lead is energized, a signal also appears on the lead of FIG. 35 labeled "start G-table up-date." Again referring to FIG. 35, the lead labeled "computation completed" is then energized, and thus completion of the routine for computation of the figure of merit is indicated. |

(12) Update G-table.—As indicated in Chart 1, G refers to the number of A-parts which are expected to reach the A-gauge as a result of commands delivered to the A-manufacturing apparatus since the most recent completion of the "update Z-table" routine. $G_i$ denotes that number of expected A-parts which will fall in the ith subclass.

The G-table contains the value of $G_i$ for each of the I subclasses, the value of each subclass being stored in a separate register. As indicated in FIG. 10, each of the registers of the G-table is provided with a means for resetting is contents to zero. At the conclusion of the "update Z-table: second stage" routine, a "re-set G-table" signal is generated, as indicated in FIG. 27, which causes each of the registers of the G-table of FIG. 10, to contain the number zero.

As an example of updating the G-table, assume that the routine labeled "compute $F_i$" has terminated such that a "sign $F_i$ positive" signal is generated at the set output of flip-flop 3501 of FIG. 35. This signal is applied to AND-gate 3502, of the same figure, and from there proceeds to trigger off the routine for updating the G-table when applied to the set input of flip-flop 3701 of FIG. 37. At this time, the value of the "i-code" which specifies the target subclass for the order which is to be given to the A-manufacturing apparatus 1, is available to the Computing element 4 over the "value-of-i" bus 39 of FIG. 7.

The routine for updating the G-table is based on the following algorithm:

$$\text{new } G_j = \text{old } G_j + A_k \cdot m \qquad \text{(e-24)}$$

The quantities of the above expression have been defined in Chart 1.

Figure 37:
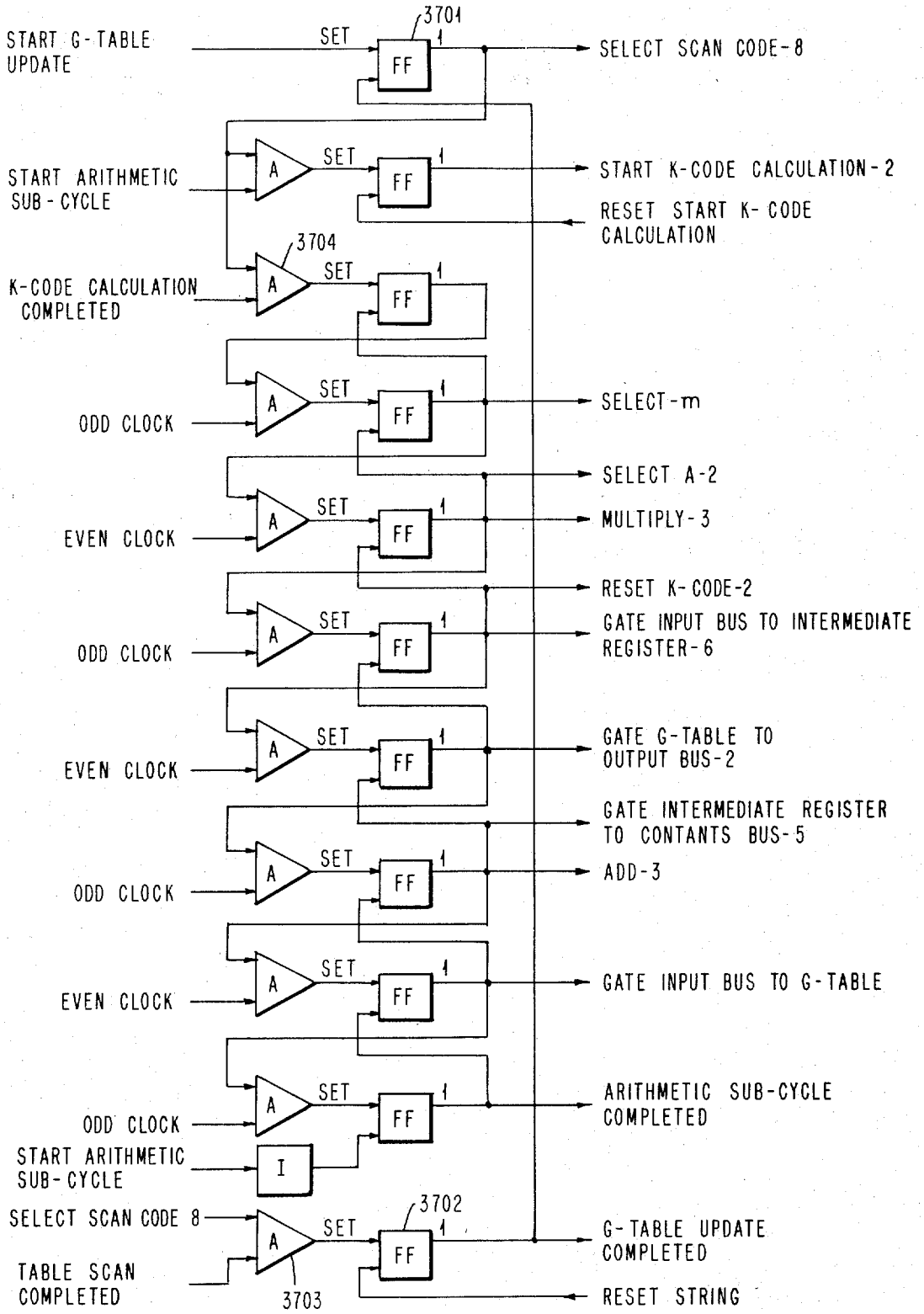
FIG. 37 shows the sequence control logic for updating the G-table.

The sequence control logic illustrated in FIG. 37 is the structure which controls the steps of this routine. At the completion of the routine a "G-table update completed" signal is generated at the output of flip-flop 3702. This signal also signifies that the string which was started by the "request computation of $F_i$" signal is terminated and control is returned to the priority logic structure of FIG. 15.

A description of each step of the routine for updating the G-table will be given in Chart 5 which follows.

CHART 5

| Step | Operation |
|---|---|
| ----- | The "start G-table update" signal is generated at the output fo AND-gate 3502 of FIG. 35 following the generation of a "sign $F_i$ positive" signal at the set output of flip-flop 3501 of the same figure. The Table scan logic of FIG. 24 is started by means of the "start G-Table update" signal applied to OR-gate 2409. Note that for the purpose of updating the G-table, the output of the Scan counter 2402 will be termed the "j-code" rather than the "i-code." |
| 2 | The Scan counter 2402 is stepped to the next state. |
| 3 | If the "j-code" equals (I+1), a "table scan completed" signal appears at the (I+1) output of Decoder 2404 of FIG. 24 and is applied to AND-gate 3703 of FIG. 37, thus causing a branch to step 8 of the steps of this Chart. Otherwise, the Logic control of FIG. 37 continues on to the following step 4 of this Chart. |

CHART 5—Continued

| tep | Operation |
|---|---|
| ..... | The value of the "k-code" is computed. Essentially, the Bidirectional counter 360 of FIG. 36, which has a total of I states, is first set to its zero state. This counter can have its count stepped up by means of "i" pulses applied to the "count up" input, illustrated in FIG. 36, and it can have its count stepped down by means of "j" pulses applied to the "count down" input also illustrated. If the counter is stepped down past the zero state, it is fed an extra pulse on the "count down" input. The results of the manipulation of the contents of the Bidirectional counter 360 are such that when the "k-code calculation completed" signal appears at the input of AND-gate 3704 of FIG. 37, there is present, on the "k-code" bus 140 of FIG. 36, the absolute value of the term (i-j). |
| ..... | Based on the value of "k," a value $A_k$ is selected from the A-table of FIG. 14, which at this time stores a line of the matrix of Chart 2, and fed to the Arithmetic unit 210 via the constants bus 100. Also, the value of "m" is fed from the Constants table of FIG. 13 to the Arithmetic unit 210 via the output bus 92. The "multiply" lead of the Arithmetic unit 210 is now in its "1" state and a multiplication of the quanties supplied is performed. The product of the multiplication is transmitted to the Intermediate register 3102 of FIG. 31 via the input bus 91. The Intermediate register is now storing the quantity ($A_k$.m) for the value of k carried by the "k-code" bus 140. |
| ..... | Based on the value of "j," a register $G_j$ is selected from the G-table, and its contents are fed to the Arithmetic unit 210 via the output bus 92. The contents of the Intermediate register 3102 are then fed to the Arithmetic unit 210 via the constants bus 100. The "add" lead of the Arithmetic unit is in its "1" state and an addition is performed. The resulting sum is transmitted from the Arithmetic unit 210 to the originally selected register $G_j$ of the G-table via the input bus 91. |
| ..... | The appearance of a signal on the lead labeled "arithmetic subcycle completed," of FIG. 37, now causes a return to step 2 of the steps of this Chart. |
| ..... | A "G-table update completed" signal is generated at the set out put of flip-flop 3702 of FIG. 37. |

(13) Update H-table.—As indicated in Chart 1, H efers to the number of A-parts which have passed through he A-gauge since the most recent completion of the "upate Z-table" routine. $H_i$ then denotes the number of such arts which fall into the ith subclass.

The H-table illustrated in FIG. 10 consists of a set of ndividual registers, as the ones shown in FIG. 9, the total umber of registers being equal to I, the number of sublasses within the acceptance band of A-parts. As indiated in FIG. 10, each register of the H-table is provided vith a means for resetting its contents to zero.

The routine for updating the H-table is initiated by the ppearance of a signal at the lead of FIG. 22 labeled X-table update completed" and emerging from the output f flip-flop 2208. At this time the "i-code" corresponding o the subclass into which the most recently received Aart has been placed is made available to the computing lement 4 via the i-code bus 93, at FIG. 16, by enabling nultiple AND network 1611.

At the conclusion of the "update the Z-table: first stage" peration, a pulse is generated at the output of flip-flop 606 of FIG. 26 which resets the register of the H-table f FIG. 10 to their zero state. Note that the routine for pdating the Z-table is initiated following the arrival of a -part at the B-gauge.

Figure 38:
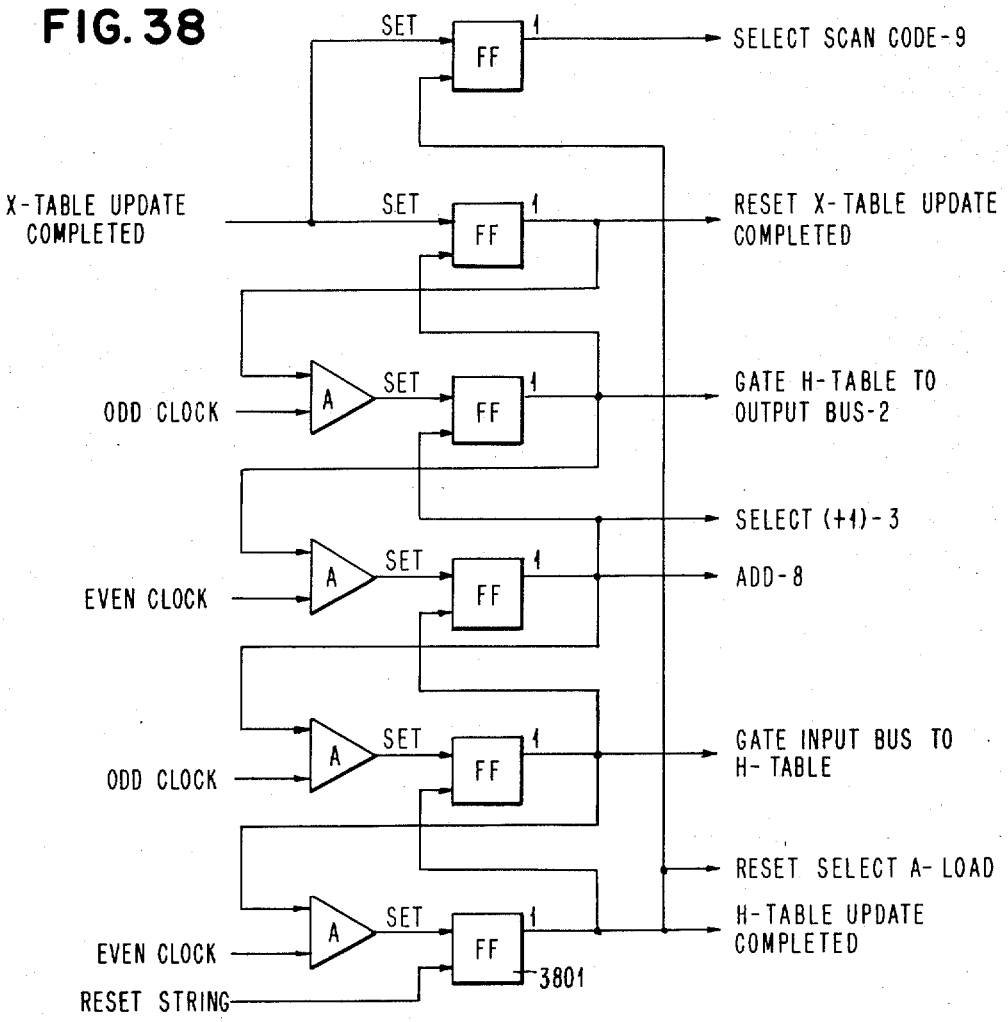
FIG. 38 shows the sequence control logic for updating the H-table.

The updating of the H-table is controlled by the seuence control logic structure illustrated in FIG. 38. The outine proceeds essentially as follows. A register $H_i$ is elected from the H-table based on the value of i carried y "i-code" bus 93. The register selected from the H-table f FIG. 10 is read out and its contents are fed to the rithmetic unit 210 via the output bus 92. The constant 1 s read out from the appropriate register of the constants able of FIG. 13 and is fed to the arithmetic unit 210 via he constants bus 100. The lead labeled "add," at the outut of OR-gate 211 of FIG. 21 is active and the arithmetic nit 210 thus adds 1 to the contents of the selected register $H_i$. The sum resulting from the addition is transmitted ack to the selected register $H_i$ of the H-table via the inut bus 91. This sets flip-flop 3801 of FIG. 38 to its one tate and thus the routine for updating the H-stable is comleted. This signal also terminates the string which was tarted by the signal "A-part received." Control is now eturned to the priority logic of FIG. 15.

(14) Disburse A and B pair.—This routine is initiated vhen the assembler 24 illustrated in the block diagram of FIG. 1 is ready to receive a pair of parts which are to be mated. The initiating signal appears on the lead labeled "disburse A and B pair: first stage," and, in FIG. 39, at the set input of flip-flop 3901, and from there—at the input of OR-gate 2409 of FIG. 24.

Figure 39:
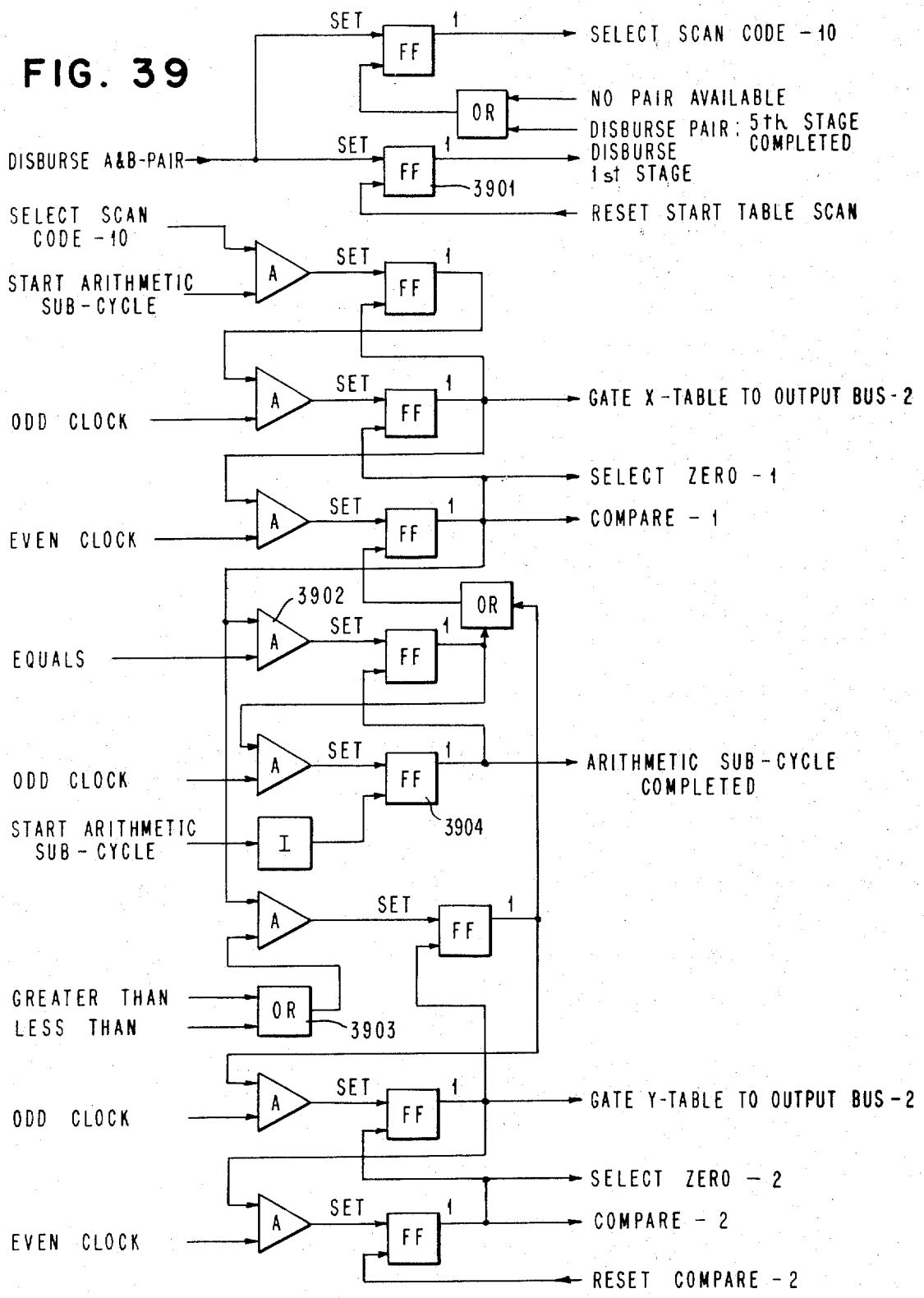
FIGS. 39 through 44 show the logical structure used in disbursing a matching pair of A and B parts.
Figure 40:
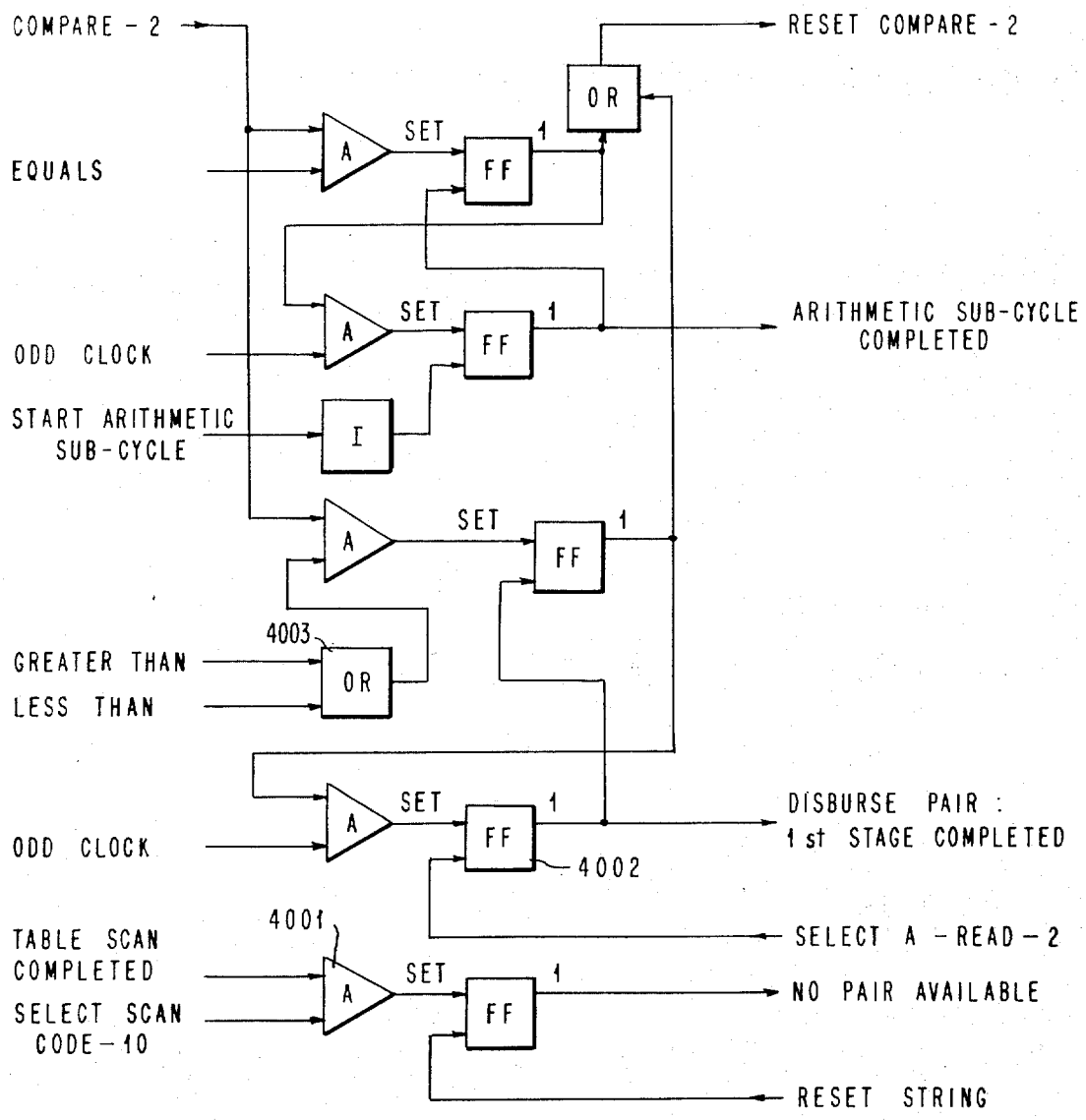

The routine consists of five stages. During the first stage a scan is made on a subclass-by-subclass basis of the X-table and the Y-table of FIG. 10. FIGS. 39 and 40 illustrate the logic structure used during this stage. The registers from the X-table and the corresponding registers of the Y-table are examined in order to determine if their contents exceed zero. The X-table and the Y-table are scanned by the use of the structure illustrated in FIG. 24. Scan counter 2402 addresses each of the registers of the X and Y tables, causing their contents to appear sequentially on output bus 92. The information carried by the output bus is directed to arithmetic unit 210 of FIG. 21. As the contents of one of the registers of the X and Y tables are placed on the output bus, the contents of the zero register, all zeros, of the constants table of FIG. 13 are placed on the constants bus and also transmitted to the arithmetic unit of FIG. 21. At that time the output of OR-gate 214 of FIG. 21 is energized and arithmetic unit 210 compares the contents of the selected register from the X or Y table against the zero appearing on the constants bus. If the selected register from the X or Y table contains zero, then the output of arithmetic unit 210 labeled "equals" is activated and the signal appears as one of the inputs of AND-gate 3902 of FIG. 39. If either or both the X-register or the Y-register associated with a particular subclass i contains zero, then the scan logic structure of FIG. 24 is stepped to the next state of scan counter 2402 by the signal from the set output of flip-flop 3904 of FIG. 39 applied to OR-gate 2405 of FIG. 24. If scan counter 2402 reaches its state (I+1) without finding any subclass i, for which both the X and Y registers contain quantities different from zero, then the lead of FIG. 24 labeled "table scan completed" is activated and the signal carried by it is applied to AND-gate 4001 thus activating the lead of FIG. 40 labeled "no pair available." The last-mentioned signal indicates that the routine for disbursing an A and B pair is ended. The signal is then applied to OR-gate 1501 of FIG. 15, thus returning control to the priority logic of FIG. 15.

If, however, at the same state i of the scan counter 2402, both the registers of the X-table and of the Y-table associated with subclass i contained quantities different from zero, then the comparisons performed by the arithmetic unit 210 will result in "greater than" or "less than" signals, which will be applied to OR-gates 3903 of FIG. 39 and 4003 of FIG. 40, resulting in a signal at the set output of flip-flop 4002 of FIG. 40 and indicating that the first stage of the routine for disbursing A and B parts is completed. It is noted that scan counter 2402 of FIG. 24 is not returned to an initial state at this point but remains in the state at which the two registers of the X and Y tables contained values different from zero.

Figure 41:
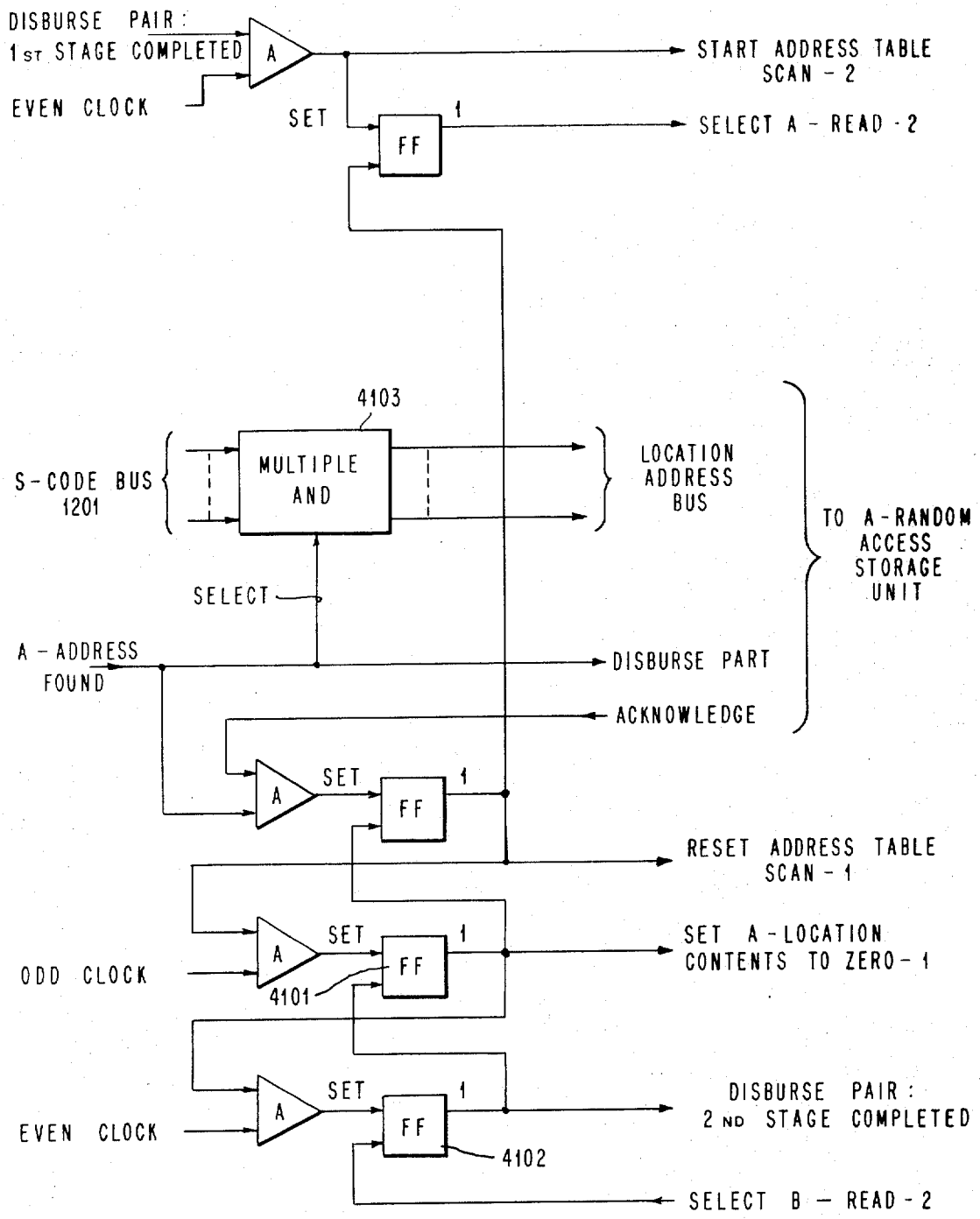

During the second stage of the routine for disbursing A and B parts, a sequential scan is made of the registers of the A-location address table until a location address is found whose register contains the i-code determined during the first stage of this routine. FIG. 41 illustrates the logical structure for this stage. In reference to FIG. 12, the value of the i-code at which scan counter 2402 has been halted is supplied to the compare unit 120 of FIG. 12 over the "i-code" bus 93 and the A-location table is scanned by supplying sequentially A-location addresses over the "s-code" bus 1201, as generated by counter 1904 of the structure of FIG. 19. When the compare unit 120 of FIG. 12 indicates that the values supplied over the i-code bus 93 and the compare bus 1201 are equal, the data carried by the s-code bus at the time is supplied to the A-random access storage unit over the location address bus shown in FIG. 7. The interface between computing element 4 and the A-random access storage unit is illustrated with more detail in FIG. 41. The "equal compare" signal from compare unit 120 of FIG. 12 is applied to mulitple AND-gate 4103 to place the s-code on the location address bus. Two additional events take place at that time. Flip-flop 4101 of FIG. 41 is activated and its output applied to OR-gate 1202 of FIG. 12, thus setting the contents of the register from the A-location address table selected by the s-code to zero. Also, the signal indicating completion of the second stage of the routine for disbursing a pair of A and B parts is generated at the output of flip-flop 4102 of FIG. 41.

Figure 42:
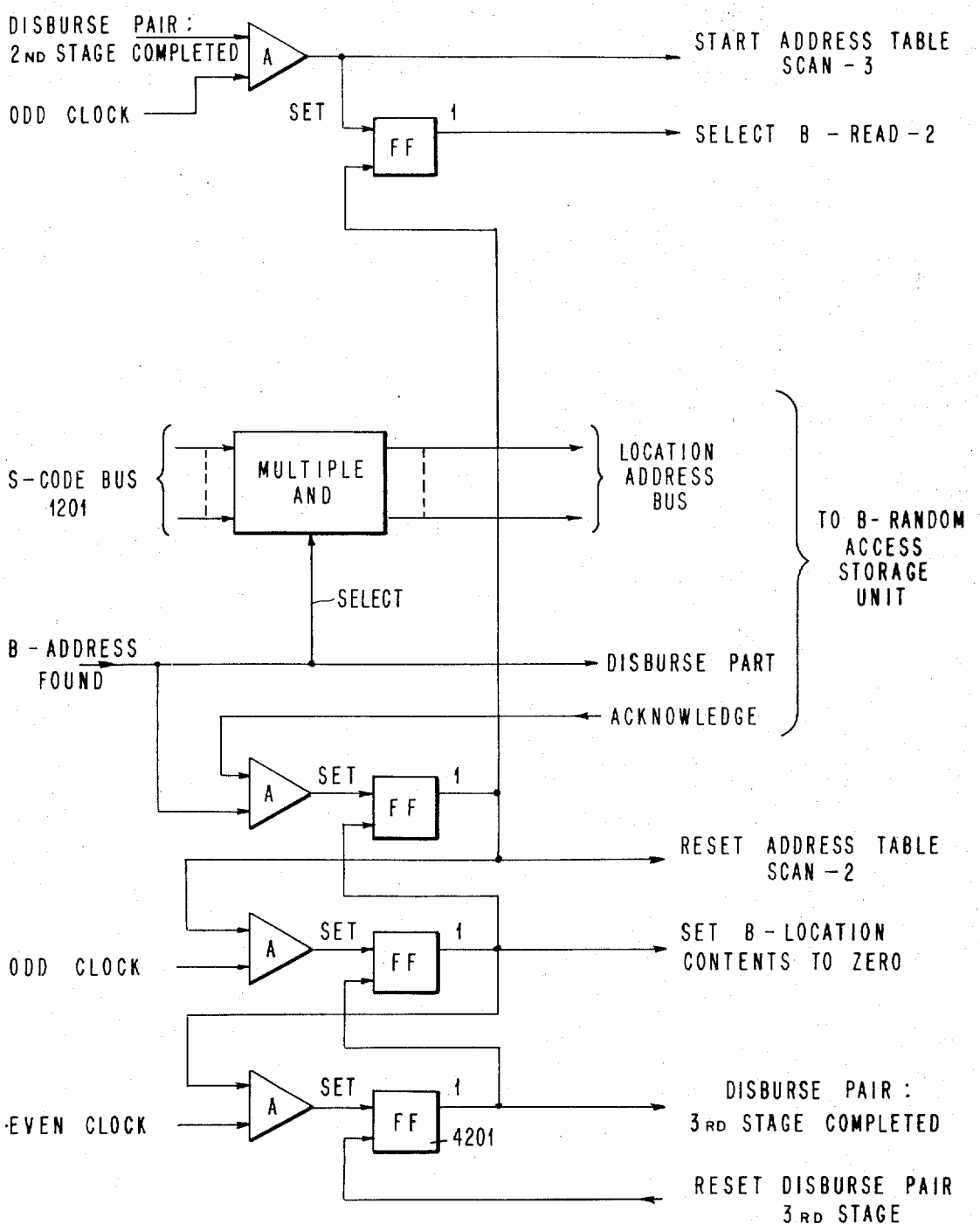

During the third stage of the rotuine for disbursing a pair of matching parts, a sequential scan, controlled by the structure of FIG. 19, is made of the registers of the B-location address table, as illustrated in FIG. 12, until a location address is found whose register contains the "i-code" determined during the first stage of this routine. FIG. 42 illustrates the logic structure used for this stage. Again, the comparison is made in the compare unit 120 of FIG. 12. When the location address corresponding to the "i-code" is found, the following three events take place. As in the case of the A-random access storage unit, the location address data is furnished to the B-random access storage unit as illustrated in FIGS. 7 and 42, together with a signal indicating that the B-random access storage unit is to disburse the part identified by the location address, as shown specifically in FIG. 42. At the same time, in reference to FIG. 12, the lead labeled "set the location contents to zero" is activated and the register from the V-location address table which was selected is filled with zeros. Also, the set output flip-flop 4201 of FIG. 42 is activated, thus indicating that the third stage of the routine for disbursing a pair of matching parts is completed.

Figure 43:
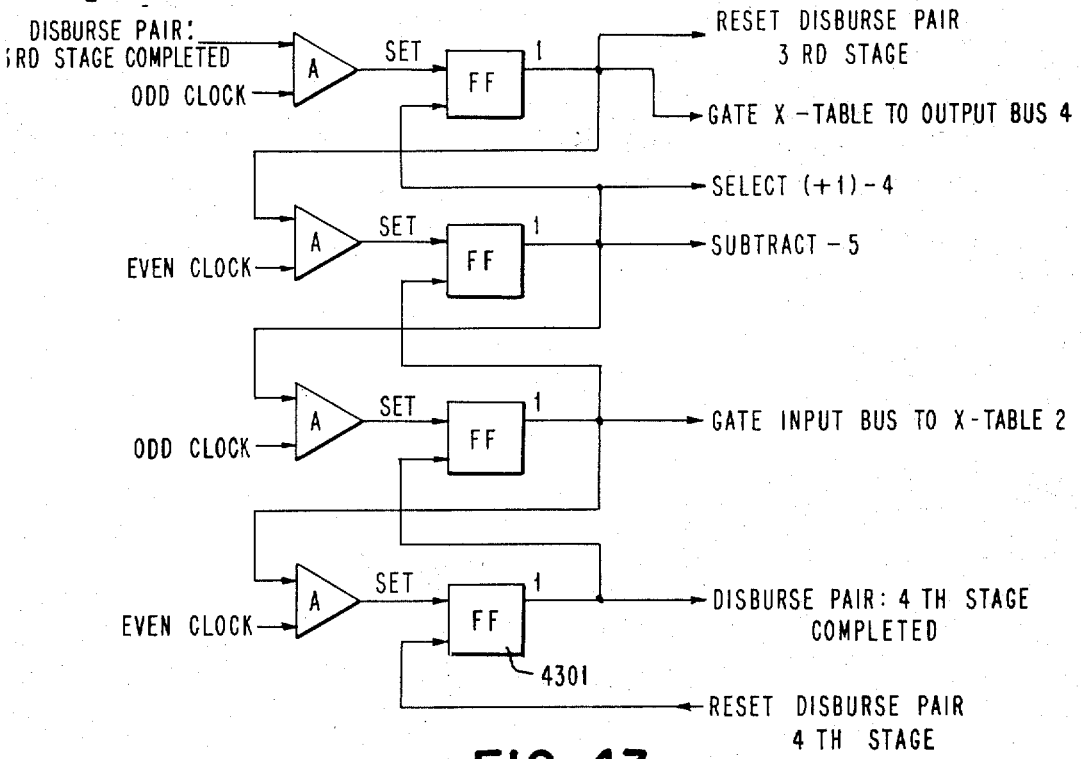

During the fourth stage of the routine the i-code determined during the first stage is used to select the register corresponding to the selected subclass i from the X-table. FIG. 43 illustrates the logic structure used for this stage. The following events now take place. The contents of the selected register of the X-table are fed via the output bus 92 to the arithmetic unit 210. The constant 1 is selected from the constants table illustrated in FIG. 13 and fed to the arithmetic unit 210 via the constants bus 100. The lead going to the arithmetic unit performs the subtraction, thus decrementing the constants of the selected X-register by one, and transmits the result thereof to the originally selected register from the X-table via the input bus 91. Also, the set output of flip-flop 4301 of FIG. 43 is activated, thus indicating that the fourth stage of the routine for disbursing a pair of matching parts has been completed.

Figure 44:
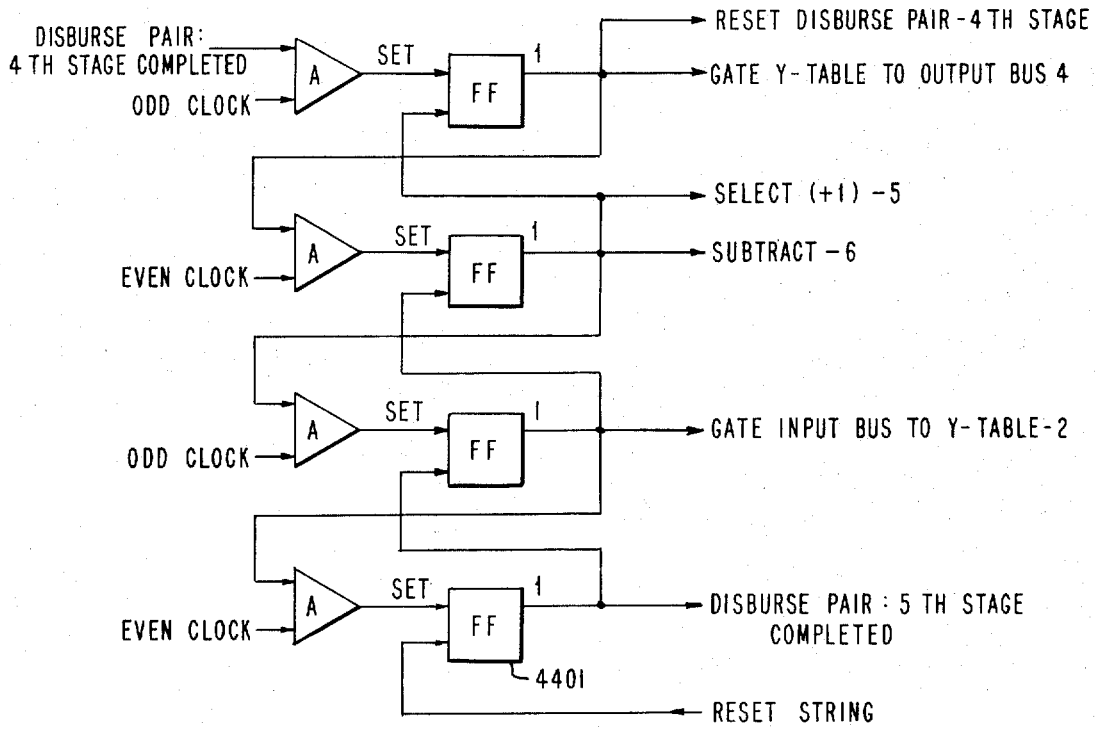

FIG. 44 illustrates the logic structure used for the fifth stage. During the fifth stage of this routine, the "i-code" determined during the first stage is used to select the register associated with the subclass i from the Y-table. The following events now take place. The contents of the selected register of the Y-table are fed via the output bus 92 to the arithmetic unit 210 of FIG. 21. The constant 1 is selected from the constants table of FIG. 13 and is fed to the arithmetic unit 210 via the constants bus 100. The lead of FIG. 21 labeled "subtract" is activated. The arithmetic unit performs a subtraction, thus decrementing the value originally stored in the selected Y-register. The result of this subtraction is fed back to the originally selected register of the Y-table via the input bus 91. The set output of flip-flop 4401 is activated, thus indicating that the fifth stage of the routine is completed.

At this point, the string which was started by the signal "ready for parts" from the assembler is terminated and control is returned to [th] *the* priority logic of FIG. 15.

(15) Locate surplus A-subclass.—The objective of this routine is to determine the "i-code" identifying the subclass of A-parts which appear to be in least demand. [One] *Once* located, the "i-code" will be used to identify the A-part which will be removed from the A-random access storage unit and placed in the bin 6 for surplus A-parts.

This routine is based on a previously derived algorithm expressing the need for A-parts of a certain subclass. ([Shee] *see* Equation e–17). When written in terms of the "j-code," the algorithm is:

$$U_j=[(N_a+N_o)P_j-X_j+Y_j-Z_j] \qquad \text{(e–25)}$$

In attempting to locate the least desirable subclass, the value of $U_j$ is examined for each of the j-code between 1 and I. When the value of $U_j$ is positive and high, the subclass identified by the subscript "j" is in great demand The more negative the value of j, the less the need for parts of the subclass identified by j.

The individual steps of the routine are listed in Chart 6 below.

CHART 6

Figure 45A:
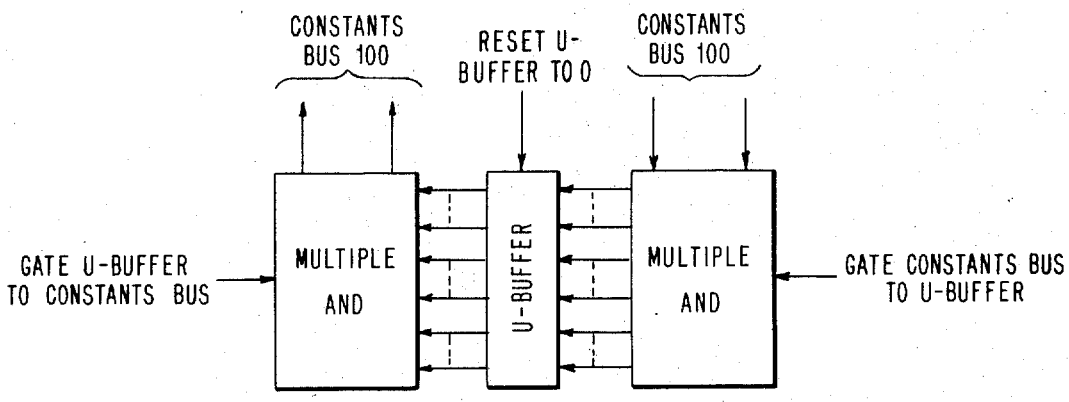
FIG. 45, consisting of FIGS. 45a and 45b, shows the buffer registers used in finding the code of a surplus A-part.

| Step | Operation |
|---|---|
| 1 | A signal on the lead labeled "No A Vacancy" emerging from AND-gate 1914 of FIG. 19 sets flip-flop 1702 of FIG. 17 to the "one" state. The resulting "reset U-buffer to zero" signal sets the contents of the U-buffer of FIG. 45a to zero. |
| 2 | The table scan logic of FIG. 24 is put into operation by a signal on the lead labeled "reset U-buffer to zero" and applied to OR-gate 2409. Scan counter 2402 will now step through the values of j and "i-code" bus 93 will, for the purpose of this routine, carry the values of j. |
| 3 | Scan counter 2402 is now stepped to its next state. |
| 4 | If the j-code now contained in the scan counter equals (I+1), the lead of FIG. 24 labeled "table scan completed" is energized and a branch is made to step 9 of this chart when the signal on said lead is applied to AND-gate 1702 of FIG. 17. If the value contained in the scan counter is not equal to (I+0), then step 5 of this chart is performed next. |
| 5 | The value of $U_j$ is computed and the computed value is stored in the intermediate register 3102 of FIG. 31. The computation, as directed by the logic structure of FIG. 33 is performed as follows: |
| 5a | Based on the value of j contained in the scan counter of FIG. 24 and placed on the "i-code" bus 93, a register $P_j$ from the P table of FIG. 10 is selected and its contents are read over the output bus 92 and transmitted to arithmetic unit 210 of FIG. 21. The contents of the register labeled $(N_a+N_o)$ from the constants table of FIG. 13 are fed to the arithmetic unit 210 over the constants bus 100. The "multiply" lead at the output of OR-gate 213 of FIG. 21 is now active and arithmetic unit 210 multiplies the two quantities supplied to it. The product of the multiplication is transmitted to the intermediate register 3102 of FIG. 31 over the input bus 91. The intermediate register is now storing the quantity $[(N_a+N_o)P_j]$ for the value of j carried by the "i-code" bus 93. |
| 5b | Based on the same value of j, a register $X_j$ is selected from the X-table of FIG. 10, and its contents are transmitted to the arithmetic unit 210 over the output bus 92. The present contents of the intermediate register 3102 are now transmitted to the arithmetic unit over the constants bus 100. The arithmetic unit is now under the control of the output of OR-gate 212 and performs a subtraction operation. The result of the subtraction is now multiplied by (−1) and the product is transmitted back to the intermediate register 3102 and stored there for further use. The intermediate register now conatins the quantity $[(N_a+N_o)P_j-X_j]$ for the same value of j. |
| 5c | Still based on the same value of j as stored in scan counter 2402, a register $Y_j$ is selected from the Y-table of FIG. 10 and its contents are transmitted to arithmetic unit 210 over the output bus 92. The contents of the intermediate register 3102 are placed on the constants bus 100 and transmitted to arithmetic unit 210. The add lead, from OR-gate 211 of FIG. 21 is now active and the arithmetic unit adds the two quantities supplied to it. The result of the addition is again transmitted to the intermediate register 3102 via the input bus 91 for futher use. The intermediate register is now storing $[(N_a+N_o)P_j-X_j+Y_j]$. |
| d | Once again based on the same value of j, a register $Z_j$ is selected from the Z-table of FIG. 10 and its contents are transmitted to the arithmetic unit over the output bus 92. The contents of the intermediate register 3102 are sent to the arithmetic unit via the constants bus 100. The subtract lead, from OR-gate 212 of FIG. 21 is now active. The arithmetic unit performs the subtraction, then multiplies the result by (−1) and feeds the product to the intermediate register 3102. Note that at this point the intermediate register 3102 stores the computed value of $U_j$, and that a "start $U_j$ compare" signal now appears at the output of AND-gate 3301 of FIG. 33. |
| 6 | The value of $U_j$ stored in the intermediate register 3102 is now compared with the value stored in the U-buffer. This step is controlled by the logic structure illustrated in FIG. 17. Note that the value stored in the U-buffer at this time would be zero if this is the first run through this routine. If it is not the first run, the U-buffer would be storing a previously computed value for $U_j$. The comparison is performed by the arithmetic unit 210, the value in the intermediate register being supplied to the arithmetic unit over output bus 92 and the value in the U-buffer being supplied to the arithmetic unit over the constants bus 100. If the number in the intermediate register is larger, the "less then" lead from arithmetic unit 210 is energized, AND-gate 1703 passes a signal which causes flip-flop 1704 of FIG. 17 to be set at the next odd clock pulse, and a return to Step 3 of this chart is made. |

CHART 6—Continued

| Step | Operation |
|---|---|
| | If the number of intermediate register is either equal or smaller than the number present in the U-buffer, then OR-gate 1705 passes a signal which causes flip-flop 1706 to be set at the next odd clock pulse and this routine continues on to Step 7 of this chart. |
| 7 | FIG. 17 illustrates the logic structure for this step. The number stored in the intermediate register is transmitted to the U-buffer over the constants bus 100 and stored in the U-buffer, thus replacing the number previously stored there. Also, the current value of the j-code stored in scan counter 2402 of FIG. 24 is transmitted over the i-code bus 93 to the j-buffer of FIG. 45b and stored there. |
| 8 | Now the control logic of FIG. 17 returns the present sequence of steps to Step 3 of this chart. |
| 9 | This step is reached directly from Step 4, provided one of the conditions of Step 4 is met. During this step flip-flop 1701 of FIG. 17 is set to its "one" state and the lead labeled "surplus category found" is energized. This signal signifies the end of the routine and also serves to initiate the routine for disbursing surplus A-parts. |

(16) Disburse surplus A-part.—In reference to FIG. 1, when the A-random access storage unit is completely filled and an incoming A-part is of a subclass more desirable than the subclass of a stored A-part, then one of the surplus A-parts will be transferred to a bin for surplus parts, thus vacating a storage location for the incoming A-part.

This routine is triggered off by a signal signifying successful completion of the previously described routine for locating a surplus subclass of A-parts. The initiating signal is generated at the output of flip-flop 1701 of FIG. 17, on the lead labeled "Surplus Category Found." The initiating signal is applied to the set input of flip-flop 801 of FIG. 8, and the routine is performed in two stages.

Figure 45B:
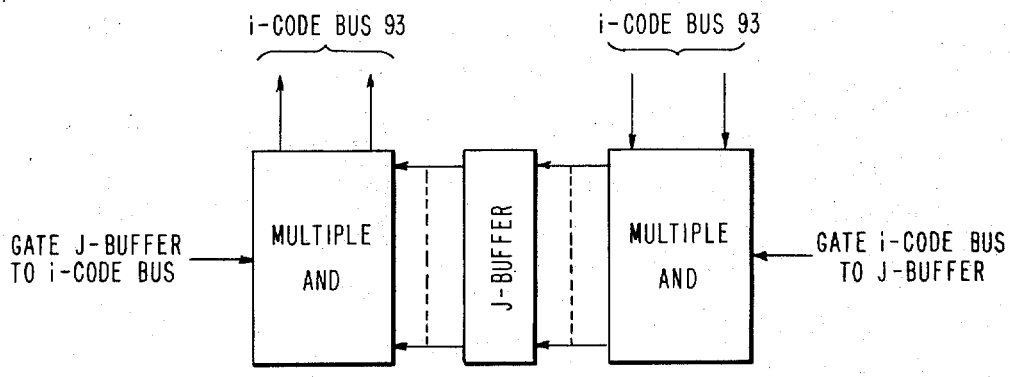

During the first stage of this routine, a sequential scan is made of the registers of the A-location address table illustrated in FIGS. 11 and 12. The scan is controlled by the structure illustrated in FIG. 19 and is initiated by the "start address table scan —4" signal applied to OR-gate 1925. At this time the j-buffer of FIG. 45b is storing the j-code identifying the subclass of a surplus A-part. The value stored in the j-buffer of FIG. 45b is placed on "i-code" bus 93 and applied to the compare unit 120 of FIG. 12. The other input to the compare unit is the data being read out of the registers of the A-location address table, as addressed by the s-code generated by the structure of FIG. 19. The value carried by the "s-code" bus is being incremented each time the compare unit 120 indicates unequal compare. When the compare unit indiactes that the values supplied to it over the "i-code" bus, from the j-buffer of FIG. 45b, and over the compare bus, from the A-location address table, are equal, a "surplus address found" signal is generated by AND-gate 1926 of FIG. 19. The "s-code" bus now carries the address of the location in the A-random access storage unit from which a surplus part is to be removed. In reference to FIG. 8, the location address data is accompanied by a signal on the lead labeled "surplus part." When the A-random access storage unit responds with the "acknowledge" signal, flip-flop 804 of FIG. 8 is set to its "one" state and the contents of the selected register of the A-location address table are set to zero.

Figure 8:
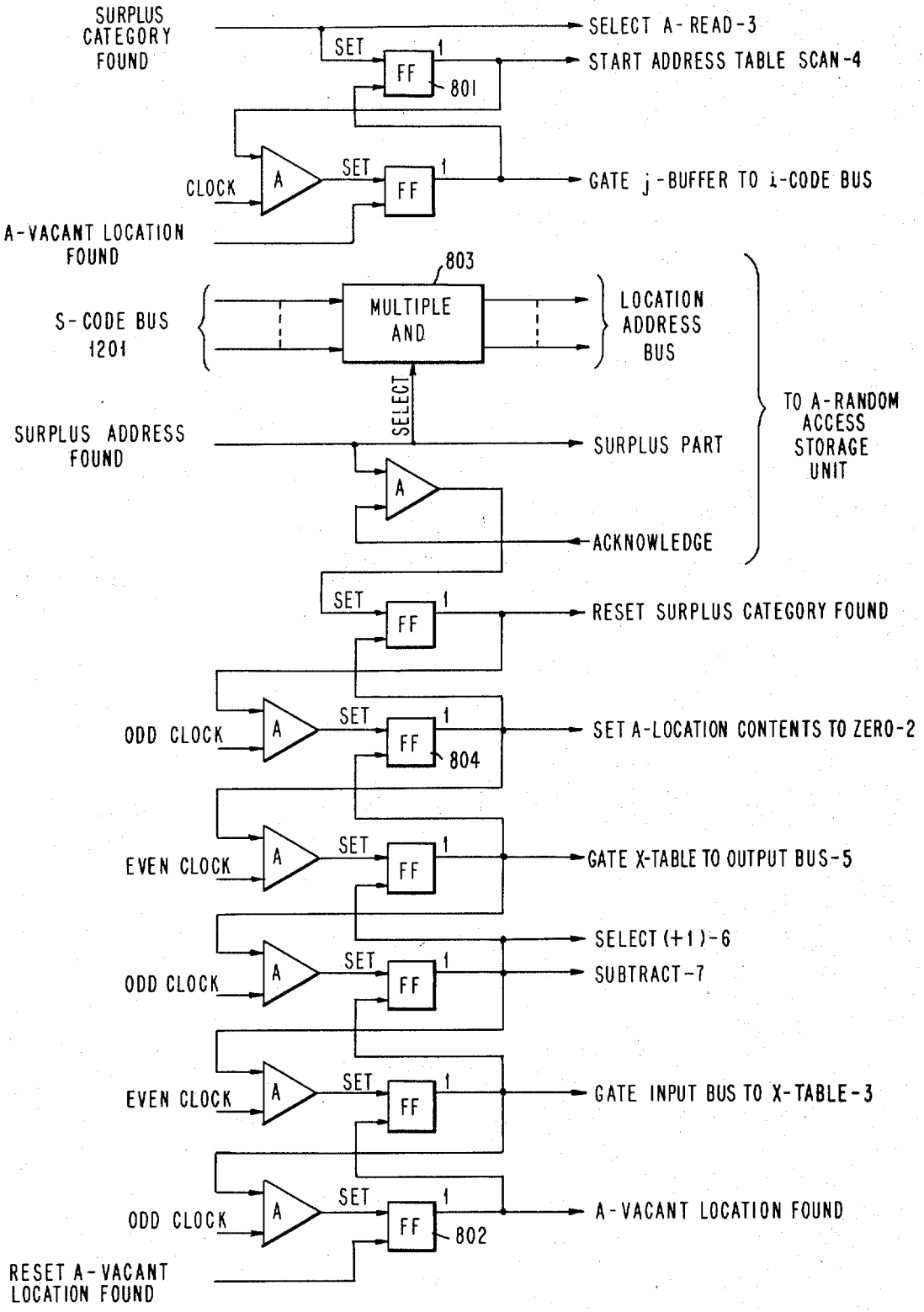
FIG. 8 shows the sequence control logic for disbursing a surplus A-part.

FIG. 8 shows the logic structure for the second stage of this routine. The X-table of FIG. 10 is addressed by the value present on the "i-code bus" 93 (i.e., the contents of the j-buffer) and the contents of the addressed register $X_j$ are fed over the output bus 92 to arithmetic unit 210 of FIG. 21. The constant (+1) is selected from the constants table of FIG. 13 and is transmitted to arithmetic unit 210 over the constants bus 100. The subtract lead at the output of OR-gate 212 is now active and the arithmetic unit performs a subtraction operation, thus decrementing the contents of the selected register of the X-table. The result of the subtraction is transmitted back to the originally selected register of the X-table over the input bus 191.

At this time the "A-vacant location found" signal is generated at the output of flip-flop 802 of FIG. 8, indicating that the routine is completed. Note that at this time the "s-code" bus carries information identifying the address of the vacant location and that this information is available within the computing element 4.

The description heretofore has been limited to the preferred embodiment of the invented apparatus and to the best mode of operation contemplated by the inventors. No specific structure has been designated for some of the elements of the invented combination, such as some electronic elements and some mechanical elements such as conveyors, bins for rejected parts, storage units for parts, etc. It is understood that in such cases prior art structure is to be used in the invented combination. Any number of prior art devices may be used for a particular element of the invented combination, therefore, the scope of the invention is to be limited only by the following claims.

What is claimed is:

1. Apparatus for [assembling] *selecting* pairs of parts having interfitting surfaces, each pair consisting of:

one part from a first class of parts having dimensions of the interfitting surfaces within a relatively wide first manufacturing tolerance band and one part from a second class of parts having dimensions of the interfitting surfaces within a relatively wide second manufacturing tolerance band;

wherein the improvement comprises the combination of:

(a) means to classify parts of the first class into a plurality of subclasses, each subclass to consist of parts of the first class with dimenions of their interfitting surfaces within a tolerance band narrower than said first manufacturing tolerance band, (b) means to classify parts of the second class into a plurality of subclasses, each subclass to consist of parts of the second class with dimensions of their interfitting surfaces within a tolerance band narrower than said second manufacturing tolerance band, and (c) means to select a subclass for parts of the first class into which parts the first class have been classified, and a subclass for parts of the second class, into which parts of the second class have been classified, such that two selected parts, each from one of the classes, will have interfitting surfaces *capable of* producing a fit within a tolerance range substantially narrower than either one of said first and second manufacturing tolerance bands.

2. Apparatus [for assembling pairs of parts] as [defined] in claim 1 [, and further] including:

(a) means to measure the interfitting dimensions of parts of the first class and to supply the measurement information to said means for classifying parts of the first class, and (b) means to measure the interfitting dimensions of parts of the second class and to supply the measurement information to said means for classifying parts of the second class.

3. Apparatus [for assembling pairs of parts,] as [defined] in claim 1 [, and further] including:

(a) means to store classified parts of the second class such that each stored part can be selectively retrieved.

4. Apparatus [for assembling pairs of parts,] as [defined] in claim 3 [, and further] including:

(a) means to store classified parts of the first class of such that each stored part can be selectively retrieved.

5. Apparatus for [assembling] *selecting* pairs of parts *having interfitting surfaces, each pair consisting of:*

*one part from a first class of parts having dimensions of the interfitting surfaces within a relatively wide first manufacturing tolerance band and,*

*one part from a second class of parts having dimensions of the interfitting surfaces within a relatively*

*wide second manufacturing tolerance band,* [as defined in claim 1 wherein:]

the parts of the first class [arrive] *arriving* from a source outside the control of the apparatus the parts of the second class [arrive] *arriving* from a source within the control of the apparatus, and wherein the improvement [further] comprises *the combination of*:

(*a*) *means to classify parts of the first class into a plurality of subclasses, each subclass to consist of parts of the first class with dimensions of their interfitting surfaces within a tolerance band narrower than said first manufacturing tolerance band, to generate classification information and to convey said information to a means to control;*

(*b*) *means to classify parts of the second class into a plurality of subclasses, each subclass to consist of parts of the second class with dimensions of their interfitting surfaces within a tolerance band narrower than said second manufacturing tolerance band, to generate classification information, and to convey said information to a means to control;*

(*c*) *means to select a subclass for parts of the first class into which parts the first class have been classified, and a subclass for parts of the second class, into which parts of the second class have been classified, such that two selected parts, each from one of the classes, will have interfitting surfaces producing a fit within a tolerance range substantially narrower than either one of said first and second manufacturing tolerance bands, to generate information defining the selection, and to convey said information to a means to control; and*

[(a)] (*d*) means to control the source for parts of the second class on the basis of information supplied by the means to classify parts of the first class, the means to classify parts of the second class, and the means to select a pair of parts.

6. Apparatus [for assembling pairs of parts,] as [defined] in claim 5, wherein:

(a) said means to control the source for parts of the second class exercises control by ordering batches of parts of the second class and by specifying the desired subclass of the parts of the ordered batch.

7. Apparatus for *selecting* [assembling] pairs of parts as [defined] in claim 1 wherein:

(a) at least one of said means to classify parts of the first class and said means to classify parts of the second class classifies parts into a number of acceptable subclasses and into one unacceptable subclass, and (b) means is provided to prevent said means to select from selecting parts that have been classified into said unacceptable subclass.

8. Apparatus for [assembling pairs] *selecting* of parts having interfitting surfaces, each pair consisting of:

one part from a first class of parts having dimensions of the interfitting surface within a relatively wide first manufacturing tolerance band and, one part from a second class of parts having dimensions of the interfitting surfaces within a relatively wide second manufacturing tolerance band, wherein the improvement comprises the combination of:

(a) means to manufacture parts of the second class responsive to orders to manufacture batches of parts with a specified mean dimension of the interfitting surface, (b) means to provide parts of the first class, (c) means to measure the dimensions of the interfitting surfaces of parts of each class, (d) means to classify the measured parts of each class into pluralities of subclasses, each subclass of a narrower tolerance band than the manufacturing tolerance band of the respective class, (e) means to store classified parts of the second class such that each stored part is individually and selectively retrievable, (f) means to store information designating the classification of individual parts of the first and second class and information designating the storage location of each part of the second class that has been stored in said means to store, *and*

(g) means to select, on the basis of the information in said means to store information, a part of each subclass such that the two selected parts can be fitted to a clearance in a tolerance range substantially lower than the manufacturing tolerance bands of either class.

9. Apparatus [for assembling a pair of parts,] as [defined] in claim 8 [, and additionally comprising] *including:*

(a) means to control said means to manufacture parts of the second class.

10. Apparatus [for assembling a pair of parts,] as [defined] in claim 9, wherein:

(a) said means to control periodically orders from said means to manufacture parts of the second class batches of parts of the second class and specifices the desired subclass of the ordered batch on the basis of computed expected need for parts of the second class.

11. Apparatus [for assembling pairs of parts,] as [defined] in claim 8, [and further comprising] *including:*

(a) means to store parts of the first class such that each stored part is individually and selectively retrievable.

12. Apparatus [for assembling pairs of parts,] as [defined] in claim 9, wherein:

(a) said means to classify classifies the measured parts of each class into a plurality of acceptable subclasses and into one unacceptable subclass and, (b) means is provided for diverting the parts which have been measured and classified into unacceptable subclasses to repositories for unacceptable parts.

13. Apparatus [for assembling pairs of parts,] as [defined] in claim 12, [and additionally comprising] *including:*

(a) means to compute a figure of merit represented by the following expression, the terms of which are defined in Chart 1 of this specification: Figure of merit $$=-L+\sum_{i=1}^{i=I} A_k[(N_a+N_o)P_i-X_i+Y_i-Z_i]$$

(b) means, in said means to control, connected to said means to compute and requesting from it periodic computation of the figure of merit and responsive to an indication from the means to compute that the figure of merit is positive, to order a batch of parts of that subclass of the second class of parts for which the figure of merit determined by the above expression is positive.

14. Apparatus for [assembling] *selecting* pairs of parts having interfitting surfaces, each pair consisting of:

one part from a first class of parts having dimensions of the interfitting surface within a relatively wide first manufacturing tolerance band, and one part from a second class of parts having dimensions of the interfitting surfaces within a relatively wide second manufacturing tolerance band, wherein the improvement comprises the combination of:

(a) means to provide parts of the first class, (b) means to manufacture parts of the second class, said means being responsive to orders to manufacture batches of parts of the second class with a specified means dimension of the interfitting surfaces, (c) means to classify [the] parts of the first class into a plurality of subclasses, each subclass having parts with dimensions of the interfitting surfaces within a tolerance band narrower than said first manufacturing tolerance band, (d) means to classify [the] parts of said second class into a plurality of subclasses, each subclass having parts with dimensions of the interfitting surfaces within a tolerance band narrower than said second manufacturing tolerance band, (e) means to store classified parts of the second class such that each stored part is individually and selectively retrievable, (f) means to store, for each part location in said means to store classified parts of the second class, information identifying the subclass of the part stored in that location, or information indicating that there is no part stored in that location;

(g) means to update the information stored in the means of sub-paragraph (f) each time a part is added to or removed from said means to store classified parts of the second class, (h) means to store, for each subclass of parts of the second class, information representing the number of parts of that subclass which are presently in said means to store classified parts of the second class, and means to update the stored information each time a part is added to or removed from said means to store parts of the second class, (i) means to store, for each subclass of the parts of the first class, information representing the probability that the next part of the first class to be classified will be in that subclass, and means to update the stored information each time a part of the first class if classified, (j) means to store, for each subclass of parts of the second class, information representing an estimate of the number of parts of that subclass which have been ordered from the means to manufacture parts of the second class but which have not been received in the means to store parts of the second class, and means to update the stored information with each updating of the means of sub-paragraph (i), (k) means to store, for each subclass of parts of the second class, information representing the number of parts of that subclass which have been received in said means to store parts of the second class since the most recent updating of the means of sub-paragraph (j), and means to update said information with each part received at said means to store parts of the second class, (l) means to store, for each subclass of parts of the second class, information representing the number of parts of that subclass which are expected to be received in said means to store parts of the second class as a result of orders to said means to manufacture parts of the second class since the most recent updating of the means of sub-paragraph (j), and means to update said information each time a new order is issued, (m) means to compute a figure of merit expressing the desirability of ordering a batch of parts of the second class with a mean dimension of the interfitting surfaces in a specified subclass, and, (n) means to order batches of parts of the second class with a specified mean dimension of the interfitting surfaces on the basis of said figure of merit.

15. Apparatus [for assembling pairs of parts having interfitting surfaces,] as [defined] in claim 14, [and additionally comprising] *including*:

[(a)] means to select a classified part from each class of parts such that the resulting pair of parts [will] *can* fit to a tolerance of the interfitting surfaces substantially narrower than the manufacturing tolerance bands of either of the two classes.

16. Apparatus [for assembling pairs of parts having interfitting surfaces,] as [defined] in claim 14, [and additionally comprising] *including*:

(a) means to locate a part of the second class stored in the means to store parts of the second class which is of a less desirable subclass than the subclass of a part which is about to be stored in said means to store parts of the second class, and, (b) means to remove a part of the second class of said less desirable subclass so as to vacate a storage space for the incoming part of the second class.

17. Apparatus [for assembling pairs of parts having interfitting surfaces,] as [defined] in claim 14, [and additionally comprising] *including*:

(a) means to store classified parts of the first class such that each stored part is individually and selectively retrievable, (b) means to store, for each storage location of said means to store parts of the first class, information identifying the subclass of the part stored in that storage location or information indicating that no part is stored in that storage location, and means to update said information each time a part is added to or removed from said means to store parts of the first class, (c) means to store, for each subclass of parts of the first class, information representing the number of parts of that subclass which are present in said means to store parts of the first class.

18. Apparatus [for assembling pairs of parts having interfitting surfaces,] as [defined] in claim 17, wherein:

[(a)] the figure of merit ($F_i$) is computed according to the following expression, the terms of which are defined in Chart 1 of the specification:

$$F_i = -L + \sum_{i=1}^{i=1} A_k[(N_s + N_o)P_i - X_i + Y_i - Z_i]$$

[19. A method for assembling pairs of parts having interfitting surfaces, each pair consisting of:

one part from a first class of parts having dimensions of the interfitting surfaces within a relatively wide first manufacturing tolerance band, and one part from a second class of parts having dimensions of the interfitting surfaces within a relatively wide second manufacturing tolerance band, wherein the improvement comprises the steps of:

(a) classifying parts of the first class into a plurality of subclasses, each subclass to consist of parts of the first class with dimensions of their interfitting surfaces within a tolerance band narrower than said first manufacturing tolerance band, (b) classifying parts of the second class into a plurality of subclasses, each subclass to consist of parts of the second class with dimensions of their interfitting surfaces within a tolerance band narrower than said second manufacturing tolerance band, and (c) selecting a subclass for parts of the first class into which parts the first class have been classified, and a subclass for parts of the second class into which parts of the second class have been classified, such that two selected parts, each from one of the classes, will have interfitting surfaces producing a fit within a tolerance range substantially narrower than either one of said first and second manufacturing tolerance bands.]

20. [The] *A* method for [assembling] *selecting* pairs of parts having interfitting surfaces, [as defined in claim 19, and additionally comprising the steps of:] each pair consisting of:

one part from a first class of parts having dimensions of the interfitting surfaces within a relatively wide first manufacturing tolerance band and, one part from a second class of parts having dimensions of the interfitting surfaces within a relatively wide second manufacturing tolerance band, wherein the improvement comprises the steps of:

(a) classifying parts of the first class into a plurality of subclasses, each subclass to consist of parts of the first class with dimensions of their interfitting surfaces within a tolerance band narrower than said first manufacturing tolerance band;

(*b*) *classifying parts of the second class into a plurality of subclasses, each subclass to consist of parts of the second class with dimensions of their interfitting surfaces within a tolerance band narrower than said second manufacturing tolerance band;*

(*c*) [(a)] manufacturing parts of the second class in response to orders to manufacture batches of parts with specified mean dimension of the interfitting surface, (*d*) [(b)] providing parts of the first class, (*e*) [(c)] measuring the dimensions of the interfitting surfaces of parts of each class, (*f*) [(d)] storing classified parts of the second class such that each stored part is individually and selectively retrievable, (*g*) [(e)] storing information designating the classification of individual parts of the first and second classes, and information designating the storage location of each part of the second class that has been stored during the step of sub-paragraph (*f*) [(d)], (*h*) [(f)] selecting on the basis of the information stored during the step of sub-paragraph (*h*) [(e)], a subclass of each class of parts such that two selected parts, one of each class of parts, can be fitted to a clearance in a tolerance range substantially narrower than the manufacturing tolerance bands of either class.

21. [The method for assembling pairs of parts having interfitting surfaces,] Method as [defined] in claim 20, [and additionally comprising the steps of] *including*:

(*i*) [(a)] storing, for each part location in said means to store classified parts of the second class, information identifying the subclass of the part stored in that location, or information indicating that there is no part stored in that location, (*j*) [(b)] updating the information stored in the step of sub-paragraph (*i*) [(a)] each time a part is added to or removed from said means to store classified parts of the second class, (*k*) [(c)] storing, for each subclass of parts of the second class, information representing the number of parts of that subclass which are presently stored, and updating the stored information each time a part is added to or removed from storage, (*l*) [(d)] storing, for each subclass of the parts of the first class, information representing the probability that the next part of the first class to be classified will be in that subclass, and updating the stored information each time a part of the first class is classified, (*m*) [(e)] storing, for each subclass of parts of the second class, information representing an estimate of the number of parts of that subclass which have been ordered to be manufactured but which have not been received in storage, and updating the stored information with each updating in the step of subparagraph (*l*) [(d)], (*n*) [(f)] storing, for each subclass of parts of the second class, information representing the number of parts of that subclass which have been received in storage since the most recent updating in the step of subparagraph (*m*) [(e)], and [means to update] *updating* said information with each part received in storage;

(*o*) [(g)] storing, for each subclass of parts of the second class, information representing the number of parts of that subclass which are expected to be received in storage as a result of orders to manufacture parts since the most recent updating in the step of subparagraph (*m*) [(e)], and [means to update] *updating* said information each time a new order is issued;

(*p*) [(h)] computing a figure of merit expressing the desirability of ordering a batch of parts of the second class with a mean dimension of the interfitting surfaces in a specified subclass; and (*q*) [(i)] ordering batches of parts of the second class with a specified mean dimension of the interfitting surfaces on the basis of said figure of merit.

22. Apparatus for selecting [for assembly] pairs of parts having interfitting surfaces, each pair consisting of:

(i) one part from a first class having a dimension of an interfitting surface within a first relatively wide manufacturing tolerance range; and (ii) one part from a second class having a dimension of a counterpart interfitting surface within a second manufacturing tolerance range of the same order of magnitude as the first tolerance range;

so that the clearance between the interfitting surfaces on each assembled pair of parts is within a clearance range substantially smaller than either of said tolerance ranges; wherein the improvement comprises:

(a) means for measuring the dimension of the interfitting surface on each part of said first class, and classifying said parts in a first plurality of subclasses, each characterized by a dimension of said interfitting surface within a range equal to a [small] fraction of said first tolerance range;

(b) means for supplying said parts of the second class;

(c) means in said supplying means for controlling the dimension of said counterpart interfitting surfaces;

(d) means for measuring the dimension of the interfitting surface on each part of the second class and classifying said parts in a second plurality of subclasses, each characterized by a dimension of said interfitting surface within a range equal to a [small] fraction of said second tolerance range;

(e) means for ordering from said supply means a batch of parts having a mean counterpart interfitting surface dimension within a selected subclass of said second plurality, including means for selecting said mean dimension in accordance with the distribution of said parts in the various subclasses;

(f) means for storing classified parts of at least one of said classes;

(g) means to disburse a part of the other class after measurement and classification thereof; and (h) means operative concomitantly with said last-mentioned means to select and disburse from said storing means a part of said one class classified in a subclass determined by the classification of said part of the other class, so that the clearance between the interfitting surfaces of two disbursed parts is within said clearance range.

23. Apparatus as defined in claim 22, in which:

(a) said storage means is operable to store parts of said second class; and (b) means for maintaining an inventory of the parts stored in said storage means.

24. Apparatus as defined in claim 22, including:

(a) means for storing parts of the other of said two classes; and (b) means for maintaining inventory of the stored parts of said other class.

25. Apparatus as defined in claim 22, including means for compensating said ordering means for the number and classification of parts of said second class previously ordered and undelivered.

26. Apparatus as defined in claim 25, in which said compensating means includes means for compensating for the time required for travel of the parts of said second class between said dimension controlling means and the measuring means.

27. Apparatus as defined in claim 22, including:

(a) means operable when said storage means is full to determine which of said subclasses is stored in the greatest number in said storage means;

(b) surplus storage means; and (c) means for selectively moving parts of said determined subclass from the storage means to the surplus storage means.

28. A method of selecting pairs of parts having interfitting surfaces [for assembly], each pair consisting of:

(i) one part from a first class having a dimension of an interfitting surface within a first relatively wide manufacturing tolerance range; and (ii) one part from a second class having a dimension of a counterpart interfitting surface within a second manufacturing tolerance range of the same order of magnitude as the first tolerance range;

so that the clearance between the interfitting surfaces on each assembled pair of parts is within a clearance range substantially smaller than either of said tolerance ranges; wherein the improvement comprises:

(a) measuring the dimension of the interfitting surface on each part of said first class;

(b) classifying said parts *of the first class* in a first plurality of subclasses, each subclass characterized by a dimenion of said interfitting surface within a range equal to a [small] fraction of said first tolerance range;

(c) [means for] measuring the dimension of the interfitting surface on each part of the second class;

(d) classifying said parts of the second class in a second plurality of subclasses, each subclass characterized by a dimension of said interfitting surface within a range equal to a [small] fraction of said second tolerance range;

(e) controlling the mean dimension of said counterpart interfitting surfaces of the parts of the second class;

(f) selecting said mean dimension in accordance with the distribution of said parts in the various subclasses;

(g) storing classified parts of *the second class and maintaining an inventory of the stored parts* [at least one of said classes];

(h) disbursing a part of the *first* [other] class after measurement and classification thereof; and (i) concomitantly with said last-mentioned step selecting and disbursing from said storing means a part of *the second* [said one] class classified in a subclass determined by the classification of said part of the [other] *first* class so that the clearance between the interfitting surfaces of the two disbursed parts is within said clearance range.

[29. A method as defined in claim 28, in which:

(a) said storing step is effective to store parts of said second class; and (b) maintaining an inventory of the stored parts.]

30. A method as defined in claim 28, including the steps of:

(a) storing parts of the [other] *first* of said two classes; and (b) maintaining an inventory of the stored parts of said [other] *first* class.

31. Method as defined in claim 28, in which the step of controlling the mean dimension of parts of the second class includes ordering for delivery parts of the second class with a specified mean dimension, and in which the step of selecting said mean dimension takes into account the number and classification of parts of said second class previously ordered but undelivered.

32. Method as defined in claim 31, in which said selecting step takes into account the time required for the parts of said second class between the executions of said dimension controlling step and the measuring step.

33. A method as defined in claim 28, including the steps of:

(a) if the storing capacity is full, determining which of said subclass is stored in the greatest number; and (b) selectively moving parts of said determined subclass to a surplus storage locality.

34. Apparatus for selecting [for assembly] pairs of parts having correlated values of cooperating parameters, each pair consisting of:

(i) one part from a first class having a value of a first parameter within a first relatively wide tolerance range; and (ii) one part from a second class having a value of a cooperating parameter within a second tolerance range so that the respective parameter values of each [assembled] *selected* pair of parts are correlated within an acceptance range substantially narrower than the respective tolerance ranges of the parts; wherein the improvement comprises:

(a) means for measuring the value of the first parameter of each part of said one class, and classifying said parts in a first plurality of subclasses, each characterized by a value of the first parameter withing a range [equal to a small fraction of] *narrower than* said first tolerance range;

(b) means for supplying said parts of the second class;

(c) means in said supplying means for controlling the value of the cooperating parameter;

(d) means for measuring the value of the cooperating parameter on each part of the second class and classifying said parts in a second plurality of subclasses, each characterized by a value of the cooperating parameter within a range [equal to a small fraction of] *narrower than* said second tolerance range;

(e) means for ordering from said supply means a batch of parts having a mean value of said cooperating parameter within a selected subclass of said second plurality, including means for selecting said mean value in accordance with the distribution of said parts in the various subclasses;

(f) means for storing classified parts of at least one of said classes;

(g) *means for disbursing a classified part of one of said classes; and*

(h) means operative concomitantly with said last-mentioned means to select and disburse from said storing means a part of [said one] *the other* class classified in a subclass determined by the classification of said part [of the other class] *disbursed in step* (g), so that the correlation between the *correlated* parameters values of the two disbursed parts is within said acceptance range.

35. A method of selecting [for assembly] pairs of parts having correlated values of cooperating parameters, each pair consisting of:

(i) one part from a first class having a value of a first parameter within a first relatively wide tolerance range; and (ii) one part from a second class having a value of a cooperating parameter within a second tolerance range so that the cooperating parameter values of each [assembled] *selected* pair of parts are correlated within an acceptance range substantially narrower than the respective tolerance ranges; wherein the improvement comprises:

(a) measuring the value of the first parameter of each part of said [one] *first* class;

(b) classifying said *measured* parts in a first plurality of subclasses, each subclass characterized by a value of said first parameter within a range *narrower than* [equal to a small fraction of] said first tolerance range;

(c) means for *supplying parts of the second class and for* measuring the value of the cooperating parameter of each part of the second class;

(d) classifying said *measured* parts of the second class in a second plurality of subclasses, each subclass characterized by a value of the cooperating parameter within a range [equal to a small fraction of] *narrower than* said second tolerance range;

(e) controlling the *supplying step to provide parts with a specified* mean value of said cooperating parameter of the parts of the second class;

(f) selecting said mean value in accordance with the distribution of said parts in the various subclasses;

(g) storing classified parts of at least one of said classes;

(h) disbursing a part of the other class after measurement and classification thereof; and (i) concomitantly with said last-mentioned step selecting and disbursing from said storing means a part of said one class classified in a subclass determined by the classification of said part of the other class so that the correlation between the parameter values of the two disbursed parts is within said acceptance range.

*36. Method as in claim 35 including storing information indicative of the number and subclasses of the stored parts.*

*37. Method as in claim 36 including storing information indicative of the number and subclasses of parts of the second class ordered to be supplied but not yet stored.*

*38. Method as in claim 37 including utilizing the stored information to predict expected need for parts of the second class.*

*39. Method as in claim 35 including monitoring at least some of the steps to derive inventory information, storing said information, and deriving on the basis of said information an indication of expected need for supplying parts of the second class of specified mean value of the cooperating parameter.*

*40. Apparatus as in claim 34 including means for storing information indicative of the number and subclasses of parts stored by the means for storing parts.*

*41. Apparatus as in claim 40 including means for storing information indicative of the number and subclasses of parts of the second class ordered to be supplied but not yet stored.*

*42. Apparatus as in claim 41 including means for utilizing the stored information to predict expected need for parts of the second class.*

*43. Apparatus as in claim 34 including means for monitoring at least some of the means of subparagraphs (a) through (h) to derive inventory information, means for storing said information, and means for deriving on the basis of said information an indication of expected need for supplying parts of the second class of specified mean value of the cooperating parameter.*

References Cited

The following references, cited by the Examiner, are of record in the patented file of this patent or the original patent.

UNITED STATES PATENTS

| | | | |
|---|---|---|---|
| 2,796,658 | 6/1957 | Aller | 29—148.4 A |
| 3,151,237 | 9/1964 | Hrabak | 235—151 |
| 3,225,179 | 12/1965 | Chesnut et al. | 235—151 |
| 3,252,212 | 5/1966 | Bell | 29—407 |
| 3,440,531 | 4/1969 | Jasorka et al. | 324—66 |
| 3,490,689 | 1/1970 | Hart et al. | 235—151.1 |
| 3,526,836 | 9/1970 | Deger et al. | 324—158 |
| 2,969,587 | 1/1961 | Dixon | 29—200 |
| 3,052,974 | 9/1962 | Williams | 29—407 |
| 3,120,053 | 2/1964 | Lewis | 29—407 |
| 3,127,669 | 4/1964 | Reber et al. | 29—211 X |

THOMAS H. EAGER, Primary Examiner

U.S. Cl. X.R.

29—208 C, 211 R